(12) United States Patent
Miyamoto et al.

(10) Patent No.: US 9,465,492 B2
(45) Date of Patent: Oct. 11, 2016

(54) TOUCH PANEL SYSTEM AND ELECTRONIC DEVICE

(75) Inventors: Masayuki Miyamoto, Osaka (JP); Manabu Yumoto, Osaka (JP); Shunsuke Nagasawa, Osaka (JP); Shinichi Yoshida, Osaka (JP); Kengo Takahama, Osaka (JP); Masayuki Ehiro, Osaka (JP); Shinsuke Anzai, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 271 days.

(21) Appl. No.: 14/127,925

(22) PCT Filed: Jun. 4, 2012

(86) PCT No.: PCT/JP2012/064858
§ 371 (c)(1),
(2), (4) Date: Dec. 19, 2013

(87) PCT Pub. No.: WO2012/176639
PCT Pub. Date: Dec. 27, 2012

(65) Prior Publication Data
US 2014/0160070 A1    Jun. 12, 2014

(30) Foreign Application Priority Data

Jun. 22, 2011  (JP) .................................. 2011-138938
Jul. 12, 2011  (WO) .................. PCT/JP2011/066288
Jan. 6, 2012   (JP) .................................. 2012-001448
Apr. 9, 2012   (WO) .................. PCT/JP2012/060195

(51) Int. Cl.
*G06F 3/044*    (2006.01)
*G06F 3/041*    (2006.01)

(52) U.S. Cl.
CPC ............. *G06F 3/044* (2013.01); *G06F 3/0416* (2013.01); *G06F 3/0418* (2013.01)

(58) Field of Classification Search
CPC ................... G06F 3/041; G06F 3/044; G06F 2203/04111; G06F 2203/04112
USPC ..................... 345/173, 174; 178/18.03, 18.06
See application file for complete search history.

(56) References Cited

U.S. PATENT DOCUMENTS 4,639,720 A    1/1987  Rympalski et al.
7,102,364 B2   9/2006  Umeda et al.
(Continued)

FOREIGN PATENT DOCUMENTS

CN    101770320 A    7/2010
JP    5-298027 A     11/1993
(Continued)

OTHER PUBLICATIONS

English translation of JP 2011-175412 A.
(Continued)

*Primary Examiner* — Stephen Sherman
(74) *Attorney, Agent, or Firm* — Birch, Stewart, Kolasch & Birch, LLP

(57) ABSTRACT

A touch panel system prevents an incorrect operation caused by an unintended contact of an object with a touch panel while suppressing a decline in sensitivity of detection of presence or absence of a touch on the touch panel. The touch panel system includes a touch invalidating section which, in a case where a specific point of a touch panel is continuously touched for a predetermined period of time, invalidates an instruction that is given, in accordance with the touch, to an electronic device including the touch panel.

21 Claims, 36 Drawing Sheets

(56) References Cited

U.S. PATENT DOCUMENTS

| | | |
|---|---|---|
| 7,812,827 B2 | 10/2010 | Hotelling et al. |
| 7,812,828 B2 | 10/2010 | Westerman et al. |
| 8,094,132 B1 | 1/2012 | Frischling et al. |
| 8,278,571 B2 | 10/2012 | Orsley |
| 8,330,733 B2 | 12/2012 | Petschnigg et al. |
| 8,493,359 B2 | 7/2013 | Wright et al. |
| 2005/0073324 A1 | 4/2005 | Umeda et al. |
| 2005/0122785 A1 | 6/2005 | Umeda et al. |
| 2005/0141263 A1 | 6/2005 | Umeda et al. |
| 2005/0156912 A1 | 7/2005 | Taylor et al. |
| 2006/0017709 A1 | 1/2006 | Okano |
| 2006/0158202 A1 | 7/2006 | Umeda et al. |
| 2006/0256091 A1 | 11/2006 | Hino |
| 2007/0109274 A1 | 5/2007 | Reynolds |
| 2007/0242053 A1 | 10/2007 | Muranaka |
| 2009/0315858 A1 | 12/2009 | Sato et al. |
| 2009/0327886 A1 | 12/2009 | Whytock et al. |
| 2010/0026655 A1 | 2/2010 | Harley |
| 2010/0060610 A1 | 3/2010 | Wu |
| 2010/0085322 A1 | 4/2010 | Mamba et al. |
| 2010/0085324 A1 | 4/2010 | Noguchi et al. |
| 2010/0085325 A1 | 4/2010 | King-Smith et al. |
| 2010/0258361 A1 | 10/2010 | Yamauchi et al. |
| 2010/0300771 A1 | 12/2010 | Miyazaki |
| 2010/0307840 A1 | 12/2010 | Kobayashi et al. |
| 2010/0309162 A1 | 12/2010 | Nakanishi et al. |
| 2010/0321331 A1 | 12/2010 | Oda et al. |
| 2010/0321332 A1 | 12/2010 | Oda et al. |
| 2010/0321333 A1 | 12/2010 | Oda et al. |
| 2010/0321334 A1 | 12/2010 | Oda et al. |
| 2011/0037724 A1 | 2/2011 | Paulsen et al. |
| 2011/0043478 A1 | 2/2011 | Matsushima |
| 2011/0084927 A1 | 4/2011 | Chang et al. |
| 2011/0084936 A1 | 4/2011 | Chang et al. |
| 2011/0102370 A1 | 5/2011 | Kono et al. |
| 2011/0148785 A1 | 6/2011 | Oda et al. |
| 2011/0148806 A1 | 6/2011 | Oda et al. |
| 2011/0153263 A1 | 6/2011 | Oda et al. |
| 2012/0146929 A1 | 6/2012 | Oyama |
| 2012/0223906 A1 | 9/2012 | Zhou |
| 2013/0271426 A1 | 10/2013 | Yumoto et al. |
| 2014/0375608 A1 | 12/2014 | Yumoto et al. |

FOREIGN PATENT DOCUMENTS

| | | |
|---|---|---|
| JP | 10-20992 A | 1/1998 |
| JP | 2001-125744 A | 5/2001 |
| JP | 2004-518188 A | 6/2004 |
| JP | 2005-114362 A | 4/2005 |
| JP | 2005-134240 A | 5/2005 |
| JP | 2005-152223 A | 6/2005 |
| JP | 2005-157643 A | 6/2005 |
| JP | 2006-318393 A | 11/2006 |
| JP | 2007-286814 A | 11/2007 |
| JP | 4364609 B2 | 11/2009 |
| JP | 4387773 B2 | 12/2009 |
| JP | 2010-3048 A | 1/2010 |
| JP | 2010-39537 A | 2/2010 |
| JP | 2010-92152 A | 4/2010 |
| JP | 2010-92275 A | 4/2010 |
| JP | 2010-170267 A | 8/2010 |
| JP | 2010-277198 A | 12/2010 |
| JP | 2010-282501 A | 12/2010 |
| JP | 2010-282539 A | 12/2010 |
| JP | 2011-3036 A | 1/2011 |
| JP | 2011-28603 A | 2/2011 |
| JP | 2011-39990 A | 2/2011 |
| JP | 2011-113149 A | 6/2011 |
| JP | 2011-128982 A | 6/2011 |
| JP | 2011-175412 A | 9/2011 |
| JP | 2012-150819 A | 8/2012 |
| TW | 201011620 A | 3/2010 |
| WO | WO 02/35461 A1 | 5/2002 |
| WO | WO 2009/107415 A1 | 9/2009 |
| WO | WO 2011/065249 A1 | 4/2010 |
| WO | WO 2012/090537 A1 | 7/2012 |

OTHER PUBLICATIONS

US Office Action mailed Apr. 17, 2014 for related U.S. Appl. No. 14/127,455.

US Quayle Action mailed May 14, 2014 for related U.S. Appl. No. 14/127,391.

U.S. Final Office Action for related U.S. Appl. No. 14/368,694, mailed Apr. 21, 2015.

US Final Office Action mailed Jul. 31, 2014 for related U.S. Appl. No. 14/127,455.

US Office Action mailed Aug. 18, 2014 for related U.S. Appl No. 14/350,510.

US Quayle Action mailed Aug. 22, 2014 for related U.S. Appl. No. 14/127,932.

US Office Action mailed Oct. 10, 2014 for related U.S. Appl. No. 13/992,204.

US Office Action mailed Oct. 9, 2014 for related U.S. Appl. No. 14/127,455.

US Office Action mailed Dec. 26, 2014 for related U.S. Appl. No. 14/368,694.

U.S. Non-Final Office Action mailed Mar. 27, 2015 for related U.S. Appl. No. 14/128,910.

U.S. Advisory Action dated Jan. 21, 2016 for related U.S. Appl. No. 14/128,910.

US Final Office Action mailed Oct. 8, 2015 for related U.S. Appl. No. 14/128,910.

U.S. Office Action mailed Jun. 2, 2016 for related U.S. Appl. No. 14/128,910.

|  | S1 | S2 | S3 | S4 | S5 | S6 | S7 |
|---|---|---|---|---|---|---|---|
| D1 | 0 | + | − | 0 | 0 | 0 | 0 |
| D2 | 0 | 0 | 0 | + | 0 | − | 0 |
| D3 | 0 | 0 | + | − | 0 | 0 | 0 |
| D4 | − | 0 | 0 | 0 | + | + | 0 |
| D5 | 0 | − | 0 | 0 | 0 | + | 0 |

(b)

|  | S1 | S2 | S3 | S4 | S5 | S6 | S7 |
|---|---|---|---|---|---|---|---|
| D1 | 0 | 1 | 1 | 0 | 0 | 0 | 0 |
| D2 | 0 | 0 | 0 | 1 | 1 | 1 | 0 |
| D3 | 0 | 0 | 1 | 1 | 0 | 0 | 0 |
| D4 | 1 | 0 | 0 | 0 | 1 | 1 | 1 |
| D5 | 1 | 1 | 0 | 0 | 0 | 1 | 1 |

(c)

|  | S1 | S2 | S3 | S4 | S5 | S6 | S7 |
|---|---|---|---|---|---|---|---|
| D1 | 0 | 1 | 1 | 0 | 0 | 0 | 0 |
| D2 | 0 | 0 | 0 | 1 | 1 | 1 | 0 |
| D3 | 0 | 0 | 1 | 1 | 0 | 0 | 0 |
| D4 | 1 | 0 | 0 | 0 | 1 | 1 | 1 |
| D5 | 1 | 1 | 0 | 0 | 0 | 1 | 1 |

TOUCH PANEL SYSTEM AND ELECTRONIC DEVICE

TECHNICAL FIELD

The present invention relates to a touch panel system and an electronic device including the touch panel system. Particularly, the present invention relates to a touch panel system and an electronic device each of which is capable of reliably and effectively removing (canceling) a noise generated by a display device, etc. and preventing an incorrect operation caused by an unintended contact of an object with a touch panel.

BACKGROUND ART

Recently, introduction of touch panel systems to various kinds of electronic devices has been growing rapidly. For example, the touch panel systems are introduced to portable information devices such as smartphones and automatic vending machines such as automatic ticket machines.

The touch panel system is typically configured to include (i) a display device and (ii) a touch panel stacked on an upper side (front surface) of the display device. Therefore, a sensor provided on the touch panel is likely to be affected not only by a noise such as a clock generated in the display device but also by other noises coming from the outside. Such the noises lead to impairment in detection sensitivity for a touch operation.

Patent Literature 1 describes a touch panel system (coordinates input device) including a countermeasure against such noises. The touch panel system of Patent Literature 1 includes a noise processing section for removing a noise. FIG. 19 is a block diagram illustrating a noise processing section 100 included in the touch panel system of Patent Literature 1. As shown in FIG. 19, the noise processing section 100 includes a filter section 101, a logical inversion section 102, and an adding section 103. The filter section 101 receives an output signal (analog signal) from a sensor provided in a touch panel (not illustrated). The filter section 101 extracts, as a noise signal, an AC signal component included in the input signal. The logical inversion section 102 inverts by 180° the phase of the noise signal thus extracted. The adding section 103 adds, to the input signal which is supplied to the filter section 101 and which includes the noise signal, the noise signal whose phase has been inverted by 180°.

Thus, according to the touch panel system of Patent Literature 1, the noise signal extracted by the filter section 101 is inverted, and the signal thus inverted is added to the input signal (analog signal) supplied from the sensor. Namely, to the noise component included in the input signal supplied from the sensor, such a signal is added which has the same level as the noise component and whose phase has been inverted. This cancels the noise superimposed on the input signal supplied from the sensor. This makes it possible to reduce effects given by the noise included in the input signal supplied from the sensor.

Meanwhile, currently, introduction of a touch panel system into various kinds of electronic device including portable information devices such as smartphones and automatic vending machines such as automatic ticket vending machines is rapidly progressing.

In such electronic devices, there is a demand for a technique for preventing an incorrect operation caused by an unintended contact of an object with a touch panel.

For example, in a case where a user operates such an electronic device while carrying it in a user's hand, contact of the hand holding the electronic device with a touch panel is judged as a touch on the touch panel. Based on this judgment, an incorrect operation would occur in the electronic device. The incorrect operation caused by such a mechanism is expected to occur in a case where the electronic device is a portable apparatus such as a smartphone, a tablet-type terminal, notebook computer, or the like. This reduces convenience of a user.

FIG. 36 is a diagram explaining this mechanism. As illustrated in FIG. 36, when a hand (object) 73 holding a tablet-type terminal 71 makes contact with a touch panel 72 of the tablet-type terminal 71, the contact is judged as a touch on the touch panel 72. This reduces convenience of a user as mentioned above.

The problem of an incorrect operation caused by such a mechanism is expected to more frequently occur as a width of a frame with respect to a display screen in which a touch panel is provided becomes narrower.

Patent Literature 2 discloses a technique for preventing an incorrect operation of continuously detecting a specific coordinate position although no touch is made to a touch panel.

According to an input device disclosed in Patent Literature 2, in a case where detection of a specific coordinate position continues for a predetermined period of time, it is determined whether or not a difference between a detection value based on a change of an electrostatic field between electrodes and a reference value falls in a predetermined update detection range. In a case where the difference falls in the predetermined update detection range, the reference value is updated to the detection value. Note that the reference value is a value which serves as a standard by which presence or absence of a touch is judged based on the detection value. In a case where the detection value in a specific coordinate position is not less than the reference value or in a case where the detection value in a specific coordinate position is above the reference value, it is determined that a touch has been made to the coordinate position.

In this way, according to the input device disclosed in Patent Literature 2, it is possible to prevent an incorrect operation of continuously detecting a specific coordinate position although no touch is made to a touch panel. Moreover, sensitivity of detection may be improved by detecting presence or absence of a touch on the basis of the updated reference value.

CITATION LIST

Patent Literature

Patent Literature 1
Japanese Patent Application Publication, Tokukai, No. 2001-125744 A (Publication Date: May 11, 2001)
Patent Literature 2
Japanese Patent Application Publication, Tokukai, No. 2007-286814 A (Publication Date: Nov. 1, 2007)

SUMMARY OF INVENTION

Technical Problem

However, the touch panel system of Patent Literature 1 has a problem of being incapable of removing noises other than an AC signal component.

Specifically, as described above, with respect to an input signal supplied from the sensor, the touch panel system of Patent Literature 1 regards as a noise an AC signal component included in the input signal. The filter section 101 extracts the AC signal, and thereafter the logical inversion section 102 inverts the phase of the AC signal by 180°. Further, the adding section 103 adds the inverted signal to the input signal which includes the AC signal component. Thus, for the noise processing according to Patent Literature 1, the process performed by the filter section 101 for extracting the AC signal component is the most important.

However, Patent Literature 1 fails to disclose details of the configuration of the filter section 101. Therefore, it is unknown how much noise the touch panel system of Patent Literature 1 can remove. Furthermore, Patent Literature 1 regards as a noise an AC signal component included in an analog signal. Namely, the touch panel system of Patent Literature 1 basically assumes removal of an impulse noise only, and does not assume, as the subject of removal, noises other than the impulse noise. Therefore, the touch panel system of Patent Literature 1 cannot reliably cancel a wide variety of noises other than the impulse noise.

According to the input device disclosed in Patent Literature 2, a reference value is updated to a detection value which exceeds the reference value. Accordingly, there arise cases where a detection value which is not less than the reference value or above the reference value before the update is deemed as a value which is below the reference value or not more than the reference value after the update.

That is, in the input device disclosed in Patent Literature 2, a standard by which presence or absence of a touch is judged changes before and after the update of the reference value. Accordingly, there is a possibility that a touch on the touch panel is not judged as a touch. That is, there arises a problem that sensitivity of detection of presence or absence of a touch declines.

The present invention was made in view of the foregoing problem of the conventional technique, and an object of the present invention is to provide a touch panel system and an electronic device each of which is capable of reliably removing a wide variety of noises.

Another object of the present invention is to provide a touch panel system which is capable of preventing an incorrect operation caused by an unintended contact of an object with a touch panel while suppressing a decline in sensitivity of detection of presence or absence of a touch on the touch panel. Another object of the present invention is to provide an electronic device including the touch panel system.

Solution to Problem

In order to attain the foregoing object, a touch panel system of the present invention includes: a touch panel; and a touch panel controller for processing a signal supplied from the touch panel, the touch panel including (i) a main sensor section for detecting a touch operation performed with respect to the touch panel and (ii) a sub sensor section provided in a surface of the touch panel in which surface the main sensor section is provided, the touch panel controller including a subtracting section for (i) receiving a signal supplied from the main sensor section and a signal supplied from the sub sensor section and (ii) subtracting, from the signal supplied from the main sensor section, the signal supplied from the sub sensor section, the main sensor section being provided with a plurality of sense lines, the sub sensor section being provided with a sub sense line extending along a direction in which the sense lines extend, the subtracting section finding a first difference which is expressed by (Sn+1)−Sn, the first difference corresponding to a difference between (i) a signal of a sense line Sn which is selected from the plurality of sense lines and (ii) a signal of a sense line Sn+1, which is one of two sense lines adjacent to the sense line Sn, the two sense lines being the sense line Sn+1 and a sense line Sn−1 each of which is included in the plurality of sense lines, the subtracting section finding a second difference which is expressed by Sn−(Sn−1), the second difference corresponding to a difference between (i) the signal of the sense line Sn and (ii) a signal of the sense line Sn−1, which is the other one of the two sense lines, the subtracting section finding a third difference, the third difference corresponding to a difference between (i) a signal of the sub sense line and (ii) a signal of a sense line adjacent to the sub sense line which sense line is included in the plurality of sense lines, the touch panel controller including an adding section for adding up the first difference, the second difference, and the third difference, the touch panel system further comprising a touch invalidating section which, in a case where a specific point of a touch panel is continuously touched for a predetermined period of time, invalidates an instruction that is given, in accordance with the touch, to an electronic device including the touch panel, the touch invalidating section judging whether or not the touch continues for a touch time threshold value which is a period of time corresponding to the predetermined period of time, and in a case where the point is continuously touched for the predetermined period of time, the touch invalidating section invalidating an instruction corresponding to a next touch on the point.

According to the above configuration, the main sensor section and the sub sensor section are provided in (on) the same surface of the touch panel. This allows both of (i) an output signal supplied from the main sensor section and (ii) an output signal supplied from the sub sensor section to include various kinds of noise signals reflected in the touch panel. Furthermore, the subtracting section finds a difference between (i) the output signal supplied from the main sensor section which signal includes a signal derived from the touch operation and the noise signals and (ii) the output signal supplied from the sub sensor section which signal includes the noise signals. This removes the noise components from the output signal supplied from the main sensor section, thereby extracting the signal derived from the touch operation itself. This makes it possible to reliably remove (cancel) a wide variety of noises reflected in the touch panel.

Further, according to the above configuration, the subtracting section obtains a difference signal value between sense lines adjacent to each other. Namely, a difference is found between the adjacent sense lines, which have a higher correlation in terms of noise. Furthermore, from an output signal supplied from each sense line, a signal (noise signal) of the sub sense line is removed. This makes it possible to remove a noise more reliably.

Further, according to the above configuration, in a case where a specific point of the touch panel is continuously touched for a predetermined period of time, the touch invalidating section invalidates an instruction that is given, in accordance with the touch, to the electronic device. Accordingly, in a case where an unintended contact of an object with the touch panel continues, such as a case where a hand holding the electronic device makes contact with the touch panel, an instruction corresponding to the contact is not executed. Consequently, it is possible to prevent an incorrect operation caused by an unintended contact of an object with the touch panel.

Further, according to the above configuration, it is unnecessary to change a standard by which presence or absence of a touch is judged for the purpose of preventing such an incorrect operation. It is therefore possible to suppress a decline in sensitivity of detection of presence or absence of a touch.

Further, according to the above configuration, it is possible to judge, with a simple configuration, whether or not the point is continuously touched for the predetermined period of time.

Further, according to the above configuration, even in a case where an unintended contact of an object with the touch panel frequently occurs in a short time, it is possible to prevent an incorrect operation, which can occur every time the contact is made, by causing the touch invalidating section to function just once.

In order to attain the foregoing object, another touch panel system of the present invention includes: a touch panel; and a touch panel controller for processing a signal supplied from the touch panel, the touch panel including a sensor section, the sensor section being provided with a plurality of sense lines and detecting a touch operation performed with respect to the touch panel, the touch panel controller including a subtracting section for (i) receiving signals from the sensor section and (ii) finding differences in signal between, among the sense lines, respective pairs of sense lines adjacent to each other, the touch panel system further comprising: drive lines provided so as to intersect the sense lines; a drive line driving circuit for driving the drive lines in parallel; and capacitances being formed between the sense lines and the drive lines, the subtracting section receiving output signals from the sense lines, and finding differences between the capacitances on each of the drive lines in a direction in which the each of the drive lines extends, the differences being found as the differences in signal between the respective pairs of the sense lines adjacent to each other, the touch panel system further including: a decoding section for decoding the values of the differences between the capacitances, which differences are found by the subtracting section, the decoding being carried out in such a manner that an inner product of each of code sequences for driving the drive lines in parallel and each of difference output sequences of the sense lines, which difference output sequences correspond to the code sequences, is calculated; and a switch for switching a signal to be supplied to the subtracting section so that the subtracting section finds a first difference which is expressed by (Sn+1)−Sn or a second difference which is expressed by Sn−(Sn−1), the first difference corresponding to a difference between (i) a signal of a sense line Sn which is selected from the plurality of sense lines and (ii) a signal of a sense line Sn+1, which is one of two sense lines adjacent to the sense line Sn, the two sense lines being the sense line Sn+1 and a sense line Sn−1 each of which is included in the plurality of sense lines, the second difference corresponding to a difference between (i) the signal of the sense line Sn and (ii) a signal of the sense line Sn−1, which is the other one of the two sense lines, the touch panel system further comprising a touch invalidating section which, in a case where a specific point of a touch panel is continuously touched for a predetermined period of time, invalidates an instruction that is given, in accordance with the touch, to an electronic device including the touch panel, the touch invalidating section judging whether or not the touch continues for a touch time threshold value which is a period of time corresponding to the predetermined period of time, and in a case where the point is continuously touched for the predetermined period of time, the touch invalidating section invalidating an instruction corresponding to a next touch on the point.

In order to attain the foregoing object, another touch panel system of the present invention includes: a touch panel; and a touch panel controller for processing a signal supplied from the touch panel, the touch panel including a sensor section, the sensor section being provided with a plurality of sense lines and detecting a touch operation performed with respect to the touch panel, the touch panel controller including a subtracting section for (i) receiving signals from the sensor section and (ii) finding differences in signal between, among the sense lines, respective pairs of sense lines adjacent to each other, the touch panel system further comprising: drive lines provided so as to intersect the sense lines; a drive line driving circuit for driving the drive lines in parallel; and capacitances being formed between the sense lines and the drive lines, the subtracting section receiving output signals from the sense lines, and finding differences between the capacitances on each of the drive lines in a direction in which the each of the drive lines extends, the differences being found as the differences in signal between the respective pairs of the sense lines adjacent to each other, the touch panel system further including: a decoding section for decoding the values of the differences between the capacitances, which differences are found by the subtracting section, the decoding being carried out in such a manner that an inner product of each of code sequences for driving the drive lines in parallel and each of difference output sequences of the sense lines, which difference output sequences correspond to the code sequences, is calculated, the touch panel system further comprising a touch invalidating section which, in a case where a specific point of a touch panel is continuously touched for a predetermined period of time, invalidates an instruction that is given, in accordance with the touch, to an electronic device including the touch panel, the touch invalidating section judging whether or not the touch continues for a touch time threshold value which is a period of time corresponding to the predetermined period of time, and in a case where the point is continuously touched for the predetermined period of time, the touch invalidating section invalidating an instruction corresponding to a next touch on the point.

According to the above configurations, the subtracting section obtains difference in signal values between the respective pairs of the sense lines adjacent to each other. Namely, each difference is found between the adjacent sense lines, which have a higher correlation in terms of noise. This removes a noise component from the output signal supplied from the main sensor, thereby extracting a signal derived from the touch operation itself. This makes it possible to reliably remove (cancel) a wide variety of noises reflected in the touch panel.

According to the above configurations, the touch panel is parallel driven, and the decoding section decodes the difference values of the capacitances which difference values are found by the subtracting section. Consequently, signals of the capacitances are multiplied by a code length (i.e., multiplied by N). Therefore, signal strengths of the capacitances are increased, regardless of the number of drive lines. Further, provided that necessary signal strengths are merely equal to those of a conventional method, it is possible to reduce the number of times that the drive lines should be driven. This makes it possible to reduce electric power consumption.

According to the above configurations, the subtracting section obtains a difference signal value between sense lines adjacent to each other. Namely, a difference is found between the adjacent sense lines, which have a higher correlation in terms of noise. Furthermore, from an output signal supplied from each sense line, a signal (noise signal) of the sub sense line is removed. This makes it possible to remove a noise more reliably.

According to the above configurations, in a case where a specific point of the touch panel is continuously touched for a predetermined period of time, the touch invalidating section invalidates an instruction that is given, in accordance with the touch, to the electronic device. Accordingly, in a case where an unintended contact of an object with the touch panel continues, such as a case where a hand holding the electronic device makes contact with the touch panel, an instruction corresponding to the contact is not executed. Consequently, it is possible to prevent an incorrect operation caused by an unintended contact of an object with the touch panel.

Further, according to the above configurations, it is unnecessary to change a standard by which presence or absence of a touch is judged for the purpose of preventing such an incorrect operation. It is therefore possible to suppress a decline in sensitivity of detection of presence or absence of a touch.

Further, according to the above configurations, it is possible to judge, with a simple configuration, whether or not the point is continuously touched for the predetermined period of time.

Further, according to the above configurations, even in a case where an unintended contact of an object with the touch panel frequently occurs in a short time, it is possible to prevent an incorrect operation, which can occur every time the contact is made, by causing the touch invalidating section to function just once.

In order to attain the foregoing object, an electronic device of the present invention includes a touch panel system of the present invention.

Accordingly, it is possible to provide an electronic device capable of reliably removing (canceling) a wide variety of noises reflected in a touch panel and preventing an incorrect operation caused by an unintended contact of an object with a touch panel.

Advantageous Effects of Invention

As described above, a touch panel system of the present invention is configured to include a touch invalidating section which, in a case where a specific point of a touch panel is continuously touched for a predetermined period of time, invalidates an instruction that is given, in accordance with the touch, to an electronic device including the touch panel, the touch invalidating section judging whether or not the touch continues for a touch time threshold value which is a period of time corresponding to the predetermined period of time, and in a case where the point is continuously touched for the predetermined period of time, the touch invalidating section invalidating an instruction corresponding to a next touch on the point. Accordingly, the present invention provides an effect of reliably removing (canceling) a wide variety of noises reflected in a touch panel. Further, the present invention produces an effect of preventing an incorrect operation caused by an unintended contact of an object with a touch panel while suppressing a decline in sensitivity of detection of presence or absence of a touch on the touch panel.

BRIEF DESCRIPTION OF DRAWINGS

FIG. 28 is a view schematically illustrating a method of recognizing touch information in the flow chart shown in FIG. 27.

Figure 35:
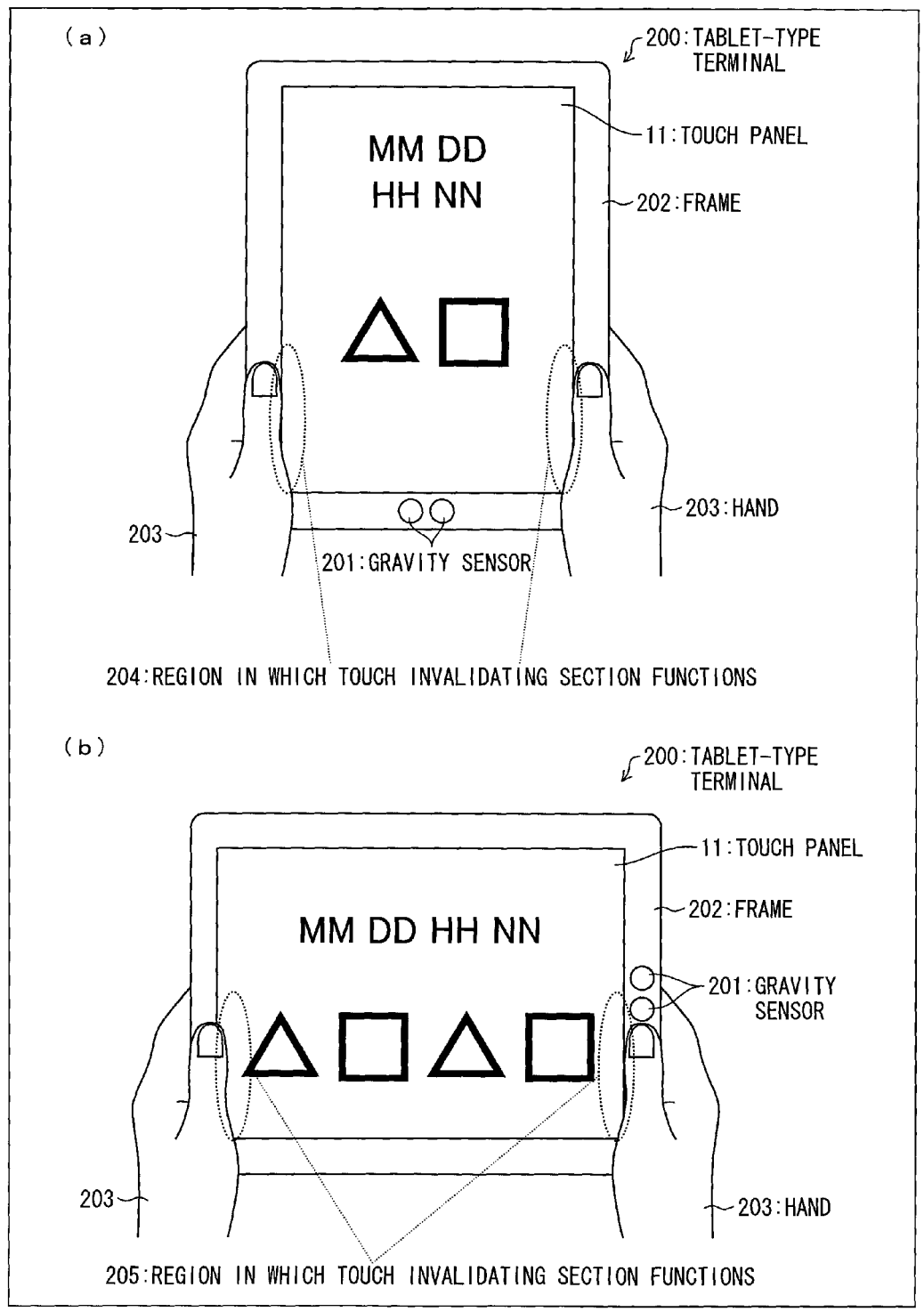

(a) and (b) of FIG. 35 are diagrams illustrating still another example in which a touch operation is invalidated by the touch invalidating section of the embodiment of the present invention.

Figure 36:
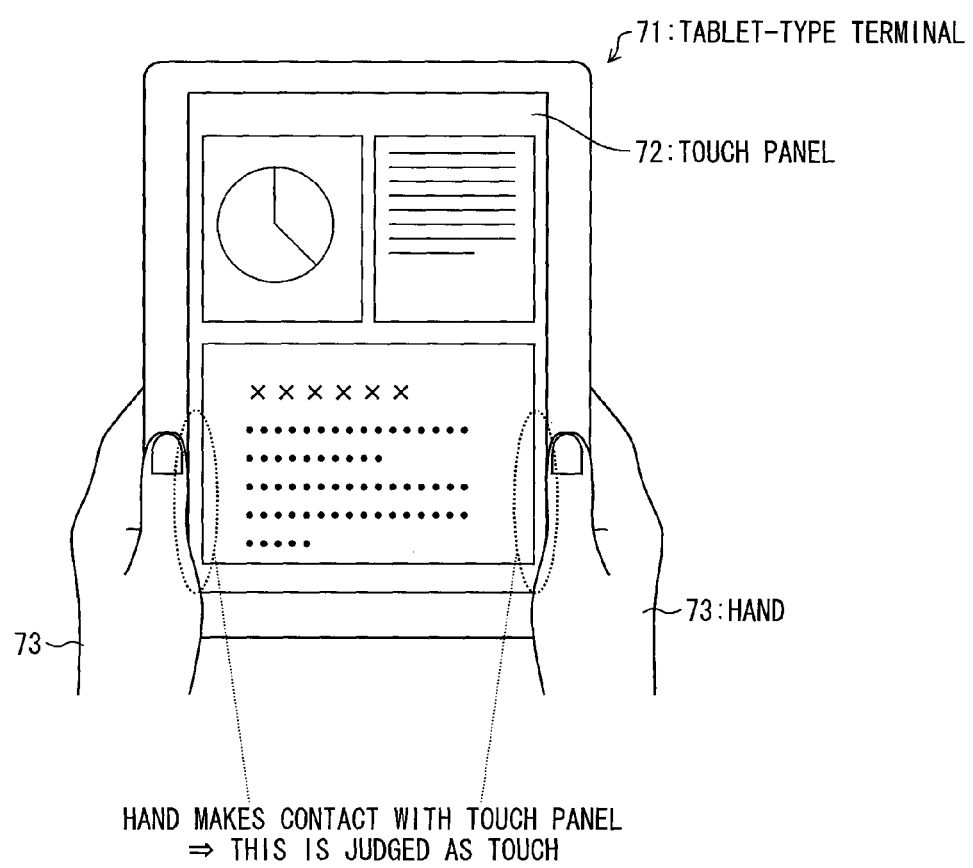

FIG. 36 is a diagram explaining an example of a mechanism of how an incorrect operation is caused by an unintended contact of an object with a conventional touch panel.

DESCRIPTION OF EMBODIMENTS

The following will describe embodiments of the present invention with reference to drawings.

Embodiment 1

(1) Configuration of Touch Panel System 1

Figure 1:
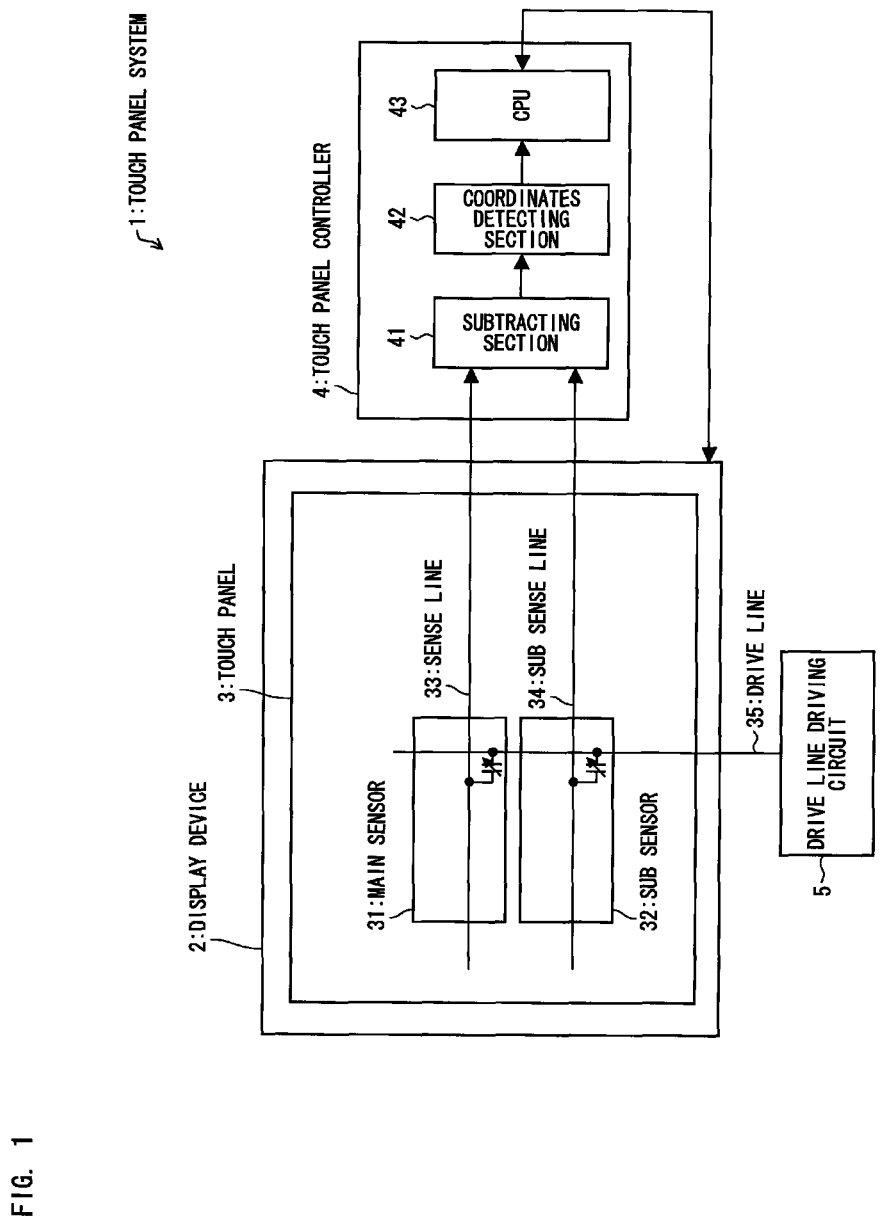
FIG. 1 is a view schematically illustrating a basic configuration of a touch panel system according to the present invention.

FIG. 1 is a view schematically illustrating a basic configuration of a touch panel system 1 according to one embodiment of the present invention. The touch panel system 1 includes a display device 2, a touch panel 3, a touch panel controller 4, and a drive line driving circuit 5. Further, the touch panel system 1h as a noise canceling function. In the descriptions below, a side used by a user is referred to as a "front surface" (or an "upper side").

The display device 2 includes a display screen (display section), which is not illustrated in FIG. 1. The display screen displays, e.g., various kinds of icons for operation and text information corresponding to operation instructions for the user. The display device 2 is made of, e.g., a liquid crystal display, a plasma display, an organic EL display, or a field emission display (FED). These displays are used in many generally-used electronic devices. Therefore, making the display device 2 of such the display provides a touch panel system 1 having a great versatility. The display device 2 may have any configuration, and is not limited to any particular configuration.

The touch panel 3 is configured to allow the user to perform a touch (press) operation on a surface of the touch panel 3 by his/her finger, a stylus, or the like so as to enter various kinds of operation instructions. The touch panel 3 is stacked on a front surface (upper side) of the display device 2 so as to cover the display screen.

The touch panel 3 includes two sensors (one main sensor 31 and one sub sensor 32) which are provided on (in) the same surface. The main sensor 31 and the sub sensor 32 are provided so as to be adjacent to each other. Each of the main sensor 31 and the sub sensor 32 is a capacitive type sensor. The touch panel 3, which is provided with the capacitive type sensors, has an advantage of having high transmittance and having durability.

The main sensor (main sensor section) 31 is provided in a region (touched region) of the touch panel 3 in which region a touch operation is performed. The main sensor 31 detects a touch operation that the user performs with respect to the touch panel 3. The touch operation is, for example, double-click, sliding, single-click, or dragging. The main sensor 31 is provided with a sense line 33 which is made of a linear electrode. The sense line 33 has an end which is connected with the touch panel controller 4. With this, a signal detected by the main sensor 31 is outputted to the touch panel controller 4 via the sense line 33. Namely, a signal corresponding to a touch operation detected by the main sensor 31 is outputted to the touch panel controller 4.

The sub sensor (sub sensor section) 32 detects a noise component reflected in the touch panel 3. The sub sensor 32 is provided in a region (non-touched region) of the touch panel 3 in which region no touch operation is performed. Therefore, the sub sensor 32 is not touched by the user in a touch operation, and the sub sensor 32 detects various kinds of noises generated in the touch panel system 1. Thus, unlike the main sensor 31, the sub sensor 32 does not detect a signal corresponding to a touch operation. Namely, the sub sensor 32 is configured not to be touched by the user in a touch operation and to detect a noise generated in the touch panel 3.

The sub sensor 32 is provided with a sub sense line 34 which is made of a linear electrode. The sub sense line 34 is provided so as to extend in parallel with the sense line 33 (i.e., to extend along a direction in which the sense line 33 extends). The sub sense line 34 has an end which is connected with the touch panel controller 4. With this, a signal detected by the sub sensor 32 is outputted to the touch panel controller 4 via the sub sense line 34.

Meanwhile, the touch panel 3 includes a drive line 35 provided so as to intersect the sense line 33 and the sub sense line 34 at right angles. The drive line 35 is made of a linear electrode. A capacitance is formed in an intersection of the sense line 33 or the sub sense line 34 and the drive line 35. Namely, a capacitance is formed in an intersection of the sense line 33 and the drive line 35, and another capacitance is formed in an intersection of the sub sense line 34 and the drive line 35. The drive line 35 is connected with the drive line driving circuit (sensor driving section) 5. Upon activation of the touch panel system 1, the drive line 35 is supplied with an electric potential at a certain interval.

Each of the sense line 33, the sub sense line 34, and the drive line 35 can be made of, e.g., a transparent wire material such as ITO (Indium Tin Oxide). In other words, each of the sense line 33, the sub sense line 34, and the drive line 35 is a sensor electrode in the touch panel 3.

Note that the drive line 35 is provided on a transparent substrate or a transparent film (not illustrated). Further, the drive line 35 is covered with an insulative layer (not illustrated). On the insulative layer, the sense line 33 and the sub sense line 34 are provided. Thus, the sense line 33 or the sub sense line 34 and the drive line 35 are isolated from each other via the insulative layer, and the sense line 33 or the sub sense line 34 and the drive line 35 are coupled to each other via the capacitance. The sense line 33 and the sub sense line 34 are covered with a protective layer (not illustrated). Namely, in the touch panel 3, the protective layer is positioned so as to be the closest to the front surface side (the user's side).

The touch panel controller 4 reads signals (data) supplied from the main sensor 31 and the sub sensor 32 of the touch panel 3. Since the touch panel system 1 includes the capacitive type sensors, the touch panel controller 4 detects a capacitance generated in the touch panel 3. Concretely, the touch panel controller 4 detects (i) a change in the capacitance between the sense line 33 and the drive line 35 and (ii) a change in the capacitance between the sub sense line 34 and the drive line 35. The touch panel controller 4 includes a subtracting section 41, a coordinates detecting section 42, and a CPU 43.

The subtracting section 41 includes (i) an input terminal (i.e., an input terminal for a main sensor output) for receiving a signal outputted by the main sensor 31 and (ii) an input terminal (i.e., an input terminal for a sub sensor output) for receiving a signal outputted by the sub sensor 32. The subtracting section 41 subtracts (i) the signal supplied to the input terminal for the sub sensor output from (ii) the signal supplied to the input terminal for the main sensor output. The signal obtained as a result of the subtracting operation by the subtracting section 41 is outputted to the coordinates detecting section 42. Note that the signal supplied to the subtracting section 41 may be either of a digital signal and an analog signal. Namely, the input signal supplied to the subtracting section 41 may be any signal, as long as it suits with the configuration of the subtracting section 41.

According to the signal obtained as a result of the subtracting operation by the subtracting section 41, the coordinates detecting section 42 detects information indicative of the presence or absence of a touch operation. For example, if a value of the output signal supplied from the subtracting section 41 is equal to or greater than a predetermined threshold value, the coordinates detecting section 42 outputs, to the CPU 43, a signal indicative of the presence of a touch operation. Note that the touch panel system 1 includes a single main sensor 31; therefore, the coordinates detecting section 42 detects information indicative of the presence or absence of a touch operation. Meanwhile, if a touch panel system 1 is configured to include a plurality of main sensors 31, a coordinates detecting section 42 determines, in addition to the presence or absence of a touch operation, coordinates values indicative of a position touched by the user.

The CPU 43 obtains, at a certain interval, information outputted by the coordinates detecting section 42. Further, according to the information thus obtained, the CPU 43 performs an operation such as output of the information to the display device 2.

The drive line driving circuit 5 is connected with the drive line 35. Upon activation of the touch panel system 1, the drive line driving circuit 5 applies an electric potential to the drive line 35 at a certain interval.

(2) Noise Processing Performed by Touch Panel System 1

The touch panel system 1 determines, according to a change in the capacitance which change is detected by the touch panel controller 4, the presence or absence of a touch operation. However, since the touch panel 3 is bonded to the front surface (the user's side) of the display device 2, the touch panel system 1 is likely to be affected not only by a noise such as a clock generated in the display device 2 but also by other noises coming from the outside. This leads to impairment in detection sensitivity for a touch operation (i.e., detection sensitivity of the coordinates detecting section 42).

Figure 2:
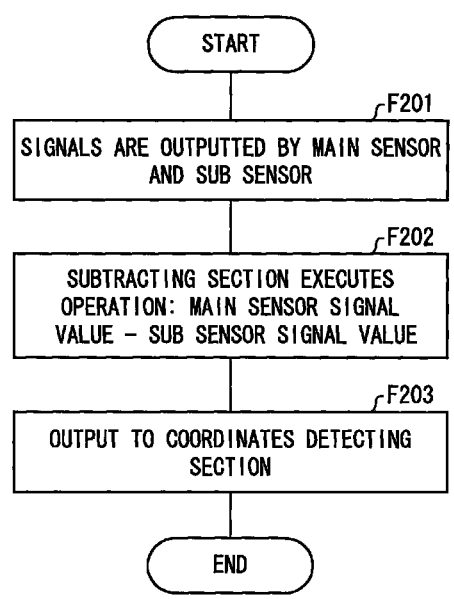
FIG. 2 is a flow chart illustrating a basic process of the touch panel system shown in FIG. 1.

In order to address this, as a measure for removing such the noises, the touch panel system 1 includes the sub sensor 32 and the subtracting section 41. With reference to FIG. 2, a noise canceling process of the touch panel system 1 will be described. FIG. 2 is a flow chart illustrating a noise canceling process, which is a basic process of the touch panel system 1.

Upon activation of the touch panel system 1, the drive line driving circuit 5 applies an electric potential to the drive line 35 at a certain interval. When the user performs a touch operation on the touch panel 3, both of the main sensor 31 and the sub sensor 32 output signals to the subtracting section 41.

Here, (i) a noise such as a clock generated in the display device 2 and (ii) other noises coming from the outside are reflected in the touch panel 3. Therefore, various kinds of noise components are detected by the main sensor 31 and the sub sensor 32. Namely, the output signal supplied from the main sensor 31 includes not only a signal derived from the touch operation itself but also a noise signal (noise component). Meanwhile, since the sub sensor 32 is configured not to detect any touch operation, the output signal supplied from the sub sensor 32 includes a noise signal (noise component), but does not include a signal derived from the touch operation (F201).

In the touch panel system 1, the main sensor 31 and the sub sensor 32 are provided in the same surface so as to be adjacent to each other. Therefore, (i) a value of the noise signal included in the output signal supplied from the main sensor 31 and (ii) a value of the noise signal included in the output signal supplied from the sub sensor 32 can be regarded as being basically the same. In view of this, the subtracting section 41 included in the touch panel controller 4 executes an operation for subtracting (i) the input signal (signal value) supplied from the sub sensor 32 from (ii) the input signal (signal value) supplied from the main sensor 31 (F202). Namely, the subtracting section 41 finds a difference between the sense line 33 and the sub sense line 34. This removes the noise signal from the output signal supplied from the main sensor 31. This provides the signal value derived from the touch operation itself, which signal value is generated in response to the touch operation.

The signal thus obtained by the subtracting operation (the signal derived from the touch operation itself) is outputted to the coordinates detecting section 42 included in the touch panel controller 4 (F203). Namely, the signal derived from the touch operation itself is outputted to the coordinates detecting section 42. According to the signal derived from the touch operation itself, the coordinates detecting section 42 determines the presence or absence of a touch operation. With this configuration, it is possible to prevent impairment in detection sensitivity of the coordinates detecting section 42 (e.g., detection sensitivity as to the presence or absence of a touch operation).

Thus, according to the touch panel system 1, the subtracting section 41 finds a difference between the sense line 33 and the sub sense line 34, so as to cancel, from an input signal which is supplied from the sense line 33 and includes a wide variety of noise components, the noise components. Namely, the subtracting section 41 cancels a noise signal from an input signal supplied from the sense line 33, so as to extract a signal derived from a touch operation itself. Thus, it is possible to provide the touch panel system 1 capable of reliably canceling a wide variety of noises.

Figure 3:
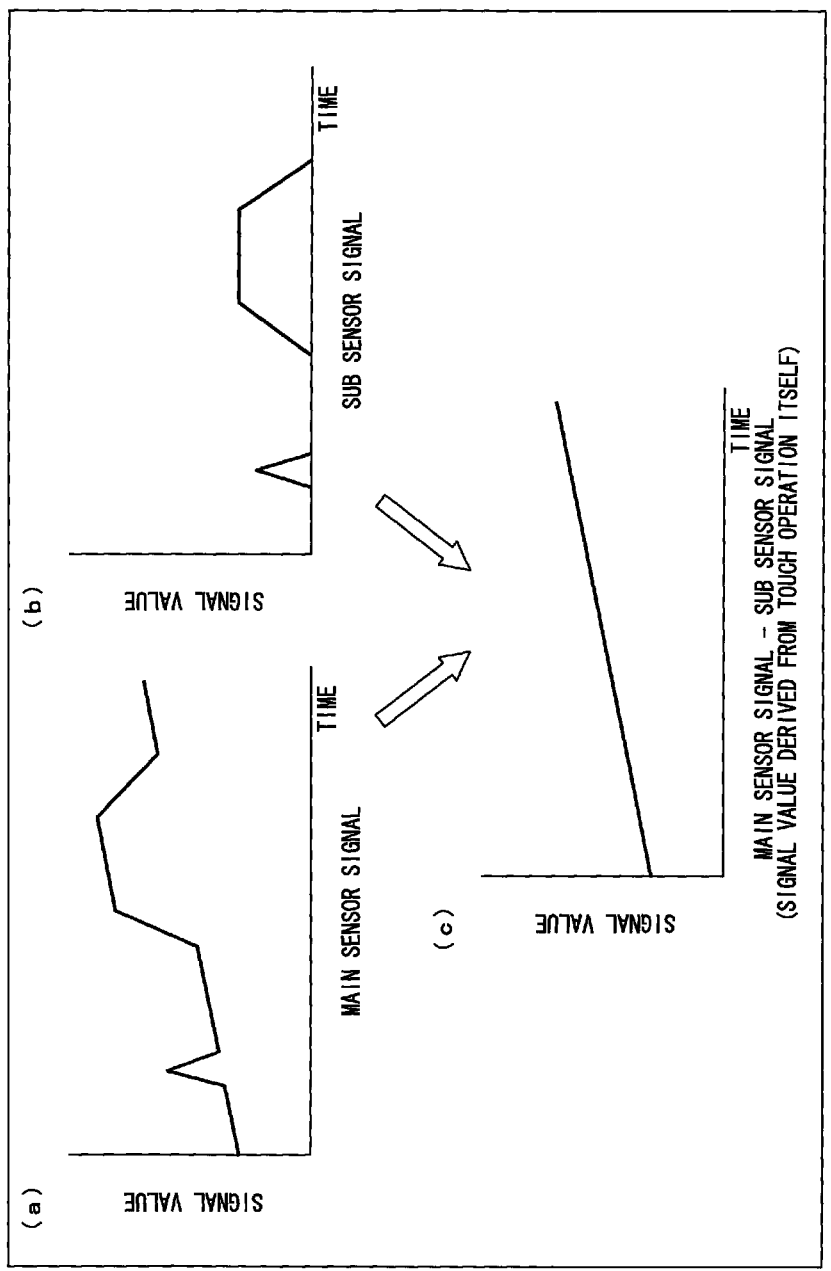
FIG. 3 is a view illustrating waveforms of respective signals which are to be processed by a subtracting section in the touch panel system shown in FIG. 1.

The noise canceling process of the touch panel system 1 is visually illustrated in FIG. 3. FIG. 3 is a view illustrating waveforms of respective signals which are to be processed by the subtracting section 41 in the touch panel system 1. (a) of FIG. 3 shows an output signal supplied from the main sensor 31, (b) of FIG. 3 shows an output signal supplied from the sub sensor 32, and (c) of FIG. 3 is a signal processed by the subtracting section 41. Each signal shown in FIG. 3 is a signal generated in response to a touch operation performed by the user.

The touch panel system 1 is configured such that the user's performing a touch operation increases the capacitance of the main sensor 31 which detects a touch operation ((a) of FIG. 3). Namely, the user's performing a touch operation increases a value of an output signal supplied from the main sensor 31 (the sense line 33). However, the output signal supplied from the main sensor 31 in response to the touch operation includes not only (i) a signal derived from the touch operation itself but also (ii) various kinds of noise signals (e.g., a noise such as a clock generated in the display device 2 and/or a noise coming from the outside).

Meanwhile, since the sub sensor 32 does not detect a touch operation, the capacitance of the sub sensor 32 (the sub sense line) is not increased by the touch operation. Namely, an output signal supplied from the sub sensor 32 does not include a signal derived from the touch operation, but includes a noise component reflected in the touch panel 3 ((b) of FIG. 3).

The subtracting section 41 subtracts (i) the output signal supplied from the sub sensor 32 from (ii) the output signal supplied from the main sensor 31 (i.e., the signal value of (a) of FIG. 3—the signal value of (b) of FIG. 3). As shown in (c) of FIG. 3, this subtracting operation removes (i) the noise component outputted by the sub sensor 32 from (ii) the output signal supplied from the main sensor 31. This provides the signal derived from the touch operation itself, which signal is generated in response to the touch operation. Furthermore, since the coordinates detecting section 42 is supplied with the signal derived from the touch operation itself, detection accuracy for a touch operation is not impaired.

As described above, according to the touch panel system 1 of the present embodiment, the main sensor 31 and the sub sensor 32 are provided in (on) the same surface of the touch panel 3. Consequently, each of (i) an output signal supplied from the main sensor 31 and (ii) an output signal supplied from the sub sensor 32 includes various kinds of noise signals reflected in the touch panel 3. Furthermore, the subtracting section 41 finds a difference between (i) the output signal supplied from the main sensor 31 which signal includes a signal derived from a touch operation and a noise signal and (ii) the output signal supplied from the sub sensor 32 which signal includes a noise signal. This removes the noise component from the output signal supplied from the main sensor 31, thereby extracting the signal derived from the touch operation itself. Therefore, it is possible to reliably remove (cancel) a wide variety of noises reflected in the touch panel 3.

Note that, according to the touch panel system of Patent Literature 1, a noise component which is the subject of removal is an AC signal component included in a signal which includes noise components. On the other hand, according to the touch panel system 1, each of (i) an output signal supplied from the main sensor 31 and (ii) an output signal supplied from the sub sensor 32 includes various kinds of noise components. Therefore, according to the touch panel system 1, a noise component which is the subject of removal is not limited to an AC signal component. Thus, the touch panel system 1 can cancel all noises reflected in the touch panel 3.

In the touch panel system 1, the sub sensor 32 only needs to be provided in a surface of the touch panel 3 in which surface the main sensor 31 is also provided. With this configuration, both of the main sensor 31 and the sub sensor 32 can detect a noise component (noise signal) reflected in the touch panel 3. Note that the sub sensor 32 is preferably configured not to detect a touch operation performed on the touch panel 3. With this configuration, the sub sensor 32 does not detect a signal derived from a touch operation; therefore, an output signal supplied from the sub sensor 32 does not include the signal derived from the touch operation. This prevents a case where the signal value derived from the touch operation is reduced by the subtracting operation performed by the subtracting section 41. Namely, the noise component is removed without reducing the signal derived from the touch operation which signal is detected by the main sensor 31. Therefore, it is possible to further enhance detection sensitivity for a touch operation.

The touch panel system 1 is configured such that the sub sensor 32 is provided in the region (non-touched region) of the touch panel 3 in which region no touch operation is performed by the user. In such a configuration, a signal derived from a touch operation is not detected by the sub sensor 32. Therefore, on the sub sensor 32, the user would not perform a touch operation. Accordingly, although the sub sensor 32 detects a noise reflected in the touch panel, the sub sensor 32 does not detect the signal derived from the touch operation. Thus, it is possible to reliably prevent the sub sensor 32 from detecting a touch operation.

In order that the sub sensor 32 detects a noise component, the sub sensor 32 is preferably provided as close to the main sensor 31 as possible. More preferably, the sub sensor 32 and the main sensor 31 are arranged side by side so as to be in contact with each other. With this configuration, the main sensor 31 and the sub sensor 32 are provided under almost the same condition. Particularly in a configuration in which the sub sensor 32 and the main sensor 31 are arranged side by side so as to be in contact with each other, the main sensor 31 and the sub sensor 32 are arranged so that a distance therebetween is shortest. Therefore, a value of a noise signal included in an output signal supplied from the sub sensor 32 can be regarded as being the same as that of a noise signal included in an output signal supplied from the main sensor 31. Therefore, by the subtracting operation performed by the subtracting section 41, it is possible to more reliably remove a noise component reflected in the touch panel 3. This makes it possible to further enhance detection sensitivity for a touch operation.

The present embodiment has dealt with the touch panel system 1 including the touch panel 3 of capacitive type. However, the principle of operation of the touch panel 3 (i.e., the method of operating the sensor) is not limited to the capacitive type. For example, the noise canceling function can be achieved similarly by a touch panel system including a touch panel of resistance film type, infrared type, ultrasonic wave type, or electromagnetic induction coupling type. Further, regardless of the type of the display device 2, the touch panel system 1 of the present embodiment provides the noise canceling function.

The touch panel system 1 of the present embodiment is applicable to various kinds of electronic devices provided with touch panels. Examples of such the electronic device encompass televisions, personal computers, mobile phones, digital cameras, portable game devices, electronic photo frames, personal digital assistants (PDAs), electronic books, home electronic appliances (e.g., microwave ovens, washing machines), ticket vending machines, automatic teller machines (ATM), and car navigation systems. Thus, it is possible to provide an electronic device which is capable of effectively preventing impairment in detection sensitivity for a touch operation.

Embodiment 2

(1) Configuration of Touch Panel System 1*a*

Figure 4:
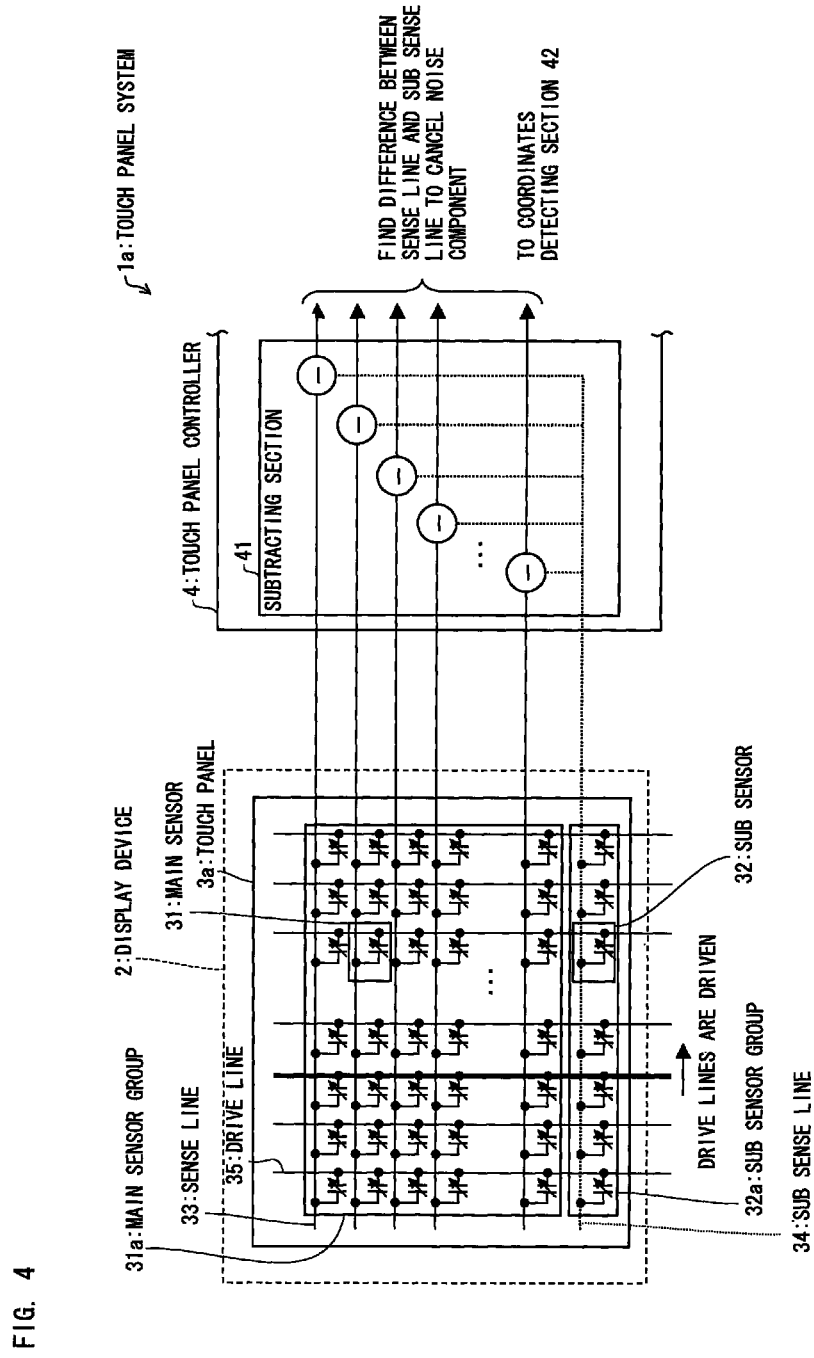
FIG. 4 is a view schematically illustrating a basic configuration of another touch panel system according to the present invention.

FIG. 4 is a view schematically illustrating a basic configuration of a touch panel system 1*a* according to another embodiment of the present invention. A basic configuration of the touch panel system 1*a* is substantially the same as that of the touch panel system 1 of Embodiment 1. The following will describe the touch panel system 1*a*, focusing on differences between the touch panel system 1*a* and the touch panel system 1. For convenience of explanation, members having the same functions as those explained in the drawings described in Embodiment 1 are given the same reference signs, and explanations thereof are omitted here.

The touch panel system 1*a* differs from the touch panel system 1 in terms of configurations of sensors provided in a touch panel 3*a*. Specifically, the touch panel 3*a* includes (i) a main sensor group 31*a* made of a plurality of main sensors 31 and (ii) a sub sensor group 32*a* made of a plurality of sub sensors 32. The touch panel system 1*a* detects not only (i) the presence or absence of a touch operation performed by the user but also (ii) positional information (coordinates) indicative of a position where the user performs the touch operation.

Specifically, according to the touch panel system 1*a*, the touch panel 3*a* includes the main sensor group 31*a* and the sub sensor group 32*a* which are provided on (in) the same surface of the touch panel 3*a*. The main sensor group 31*a* and the sub sensor group 32*a* are provided so as to be adjacent to each other. Each of the main sensor group 31*a* and the sub sensor group 32*a* is made of capacitive type sensors.

The main sensor group (main sensor section) 31*a* is provided in a region (touched region) of the touch panel 3*a* in which region a touch operation is performed. The main sensor group 31*a* detects a touch operation that the user performs with respect to the touch panel 3*a*. The main sensor group 31*a* is made of the plurality of main sensors 31 which are arranged in a matrix. The main sensor group 31*a* is provided with L sense lines 33 (L is an integer of 2 or greater). The sense lines 33 are provided so as to be parallel with each other and evenly spaced. On each of the sense lines 33, M main sensors 31 are provided (M is an integer of 2 or greater).

Each of the sense lines 33 has an end which is connected with a subtracting section 41 of a touch panel controller 4. With this, a signal detected by each main sensor is outputted to the subtracting section 41 via its corresponding sense line 33. Namely, a signal corresponding to a touch operation detected by the main sensor 31 is outputted to the subtracting section 41.

The sub sensor group (sub sensor section) 32*a* detects a noise component reflected in the touch panel 3*a*. The sub sensor group 32*a* is provided in a region (non-touched region) of the touch panel 3*a* in which region no touch operation is performed. Therefore, the sub sensor group 32*a* is not touched by the user in a touch operation, and the sub sensor group 32*a* detects various kinds of noises generated in the touch panel system 1*a*. Thus, unlike the main sensor group 31*a*, the sub sensor group 32*a* does not detect a signal corresponding to a touch operation. Namely, the sub sensor group 32*a* is configured not to be touched by the user in a touch operation but to detect a noise generated in the sensor. The sub sensor group 32*a* is provided with one sub sense line 34. The sub sense line 34 is provided so as to extend in parallel with the sense lines 33 (i.e., to extend along a direction in which the sense lines 33 extend). On the sub sense line 34, M sub sensors 32 are provided (M is an integer of 2 or greater). Namely, the number of main sensors 31 provided on each sense line 33 is equal to the number of sub sensors 32 provided on the sub sense line 34.

The sub sense line 34 has an end which is connected with the subtracting section 41 of the touch panel controller 4. With this, a signal detected by the sub sensor group 32*a* is outputted to the subtracting section 41 via the sub sense line 34.

Meanwhile, the touch panel 3*a* includes M drive lines 35 provided so as to intersect the sense lines 33 and the sub sense line 34 at right angles (M is an integer of 2 or greater). The drive lines 35 are provided so as to extend in parallel with each other and to be evenly spaced. On each of the drive lines 35, L main sensors 31 and one sub sensor 32 are provided (L is an integer of 2 or greater). Further, a capacitance is formed in an intersection of each of the sense lines 33 or the sub sense line 34 and a corresponding one of the drive lines 35. Namely, capacitances are formed in intersections of the sense lines 33 and the drive lines 35, and capacitances are formed in intersections of the sub sense line 34 and the drive lines 35. The drive lines 35 are connected with a drive line driving circuit (not illustrated). Upon activation of the touch panel system 1*a*, the drive lines 35 are supplied with electric potentials at a certain interval.

Thus, in the touch panel 3*a*, (i) the sense lines 33 and the sub sense line 34, which are provided in a horizontal direction, and (ii) the drive lines 35, which are provided in a vertical direction, are arranged in a two-dimensional matrix. For the sense line 33, the sub sense lines 34, and the drive line 35, the number thereof, a length thereof, a width thereof, a space therebetween, and/or the like can be arbitrarily set according to the intended purpose of the touch panel system 1*a*, the size of the touch panel 3*a*, and/or the like.

(2) Noise Processing Performed by Touch Panel System 1*a*

Figure 5:
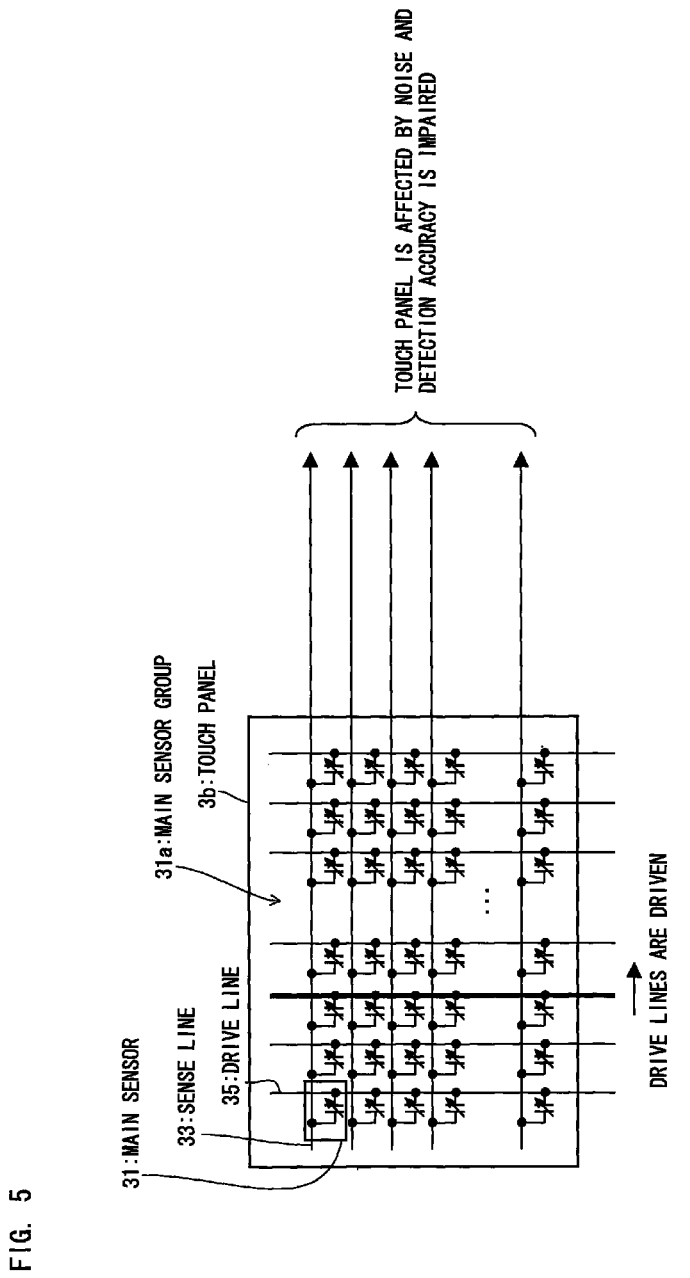
FIG. 5 is a view schematically illustrating a touch panel which is included in another version of the touch panel system shown in FIG. 4 and does not include a sub sensor group.

The touch panel system 1*a* determines, according to a change in the capacitance which change is detected by the touch panel controller 4, (i) the presence or absence of a touch operation and (ii) a touched position. However, similarly to the touch panel system 1, the touch panel system 1a is likely to be affected by various kinds of noises. This leads to impairment in detection sensitivity for a touch operation (i.e., detection sensitivity of the coordinates detecting section). Specifically, FIG. 5 is a view schematically illustrating a touch panel 3b, which is made by modifying the touch panel of the touch panel system 1a shown in FIG. 4 so that it does not include the sub sensor group 32a. As shown in FIG. 5, the touch panel 3b includes only a main sensor group 31a but does not include a sub sensor group 32a. Namely, the touch panel 3b shown in FIG. 5 has a configuration which is not provided with a countermeasure against noises yet. According to this configuration, the touch panel 3b is affected by various kinds of noises. Accordingly, a signal outputted by each sense line 33 includes various kinds of noises, and thus detection sensitivity for a touch operation is impaired.

Figure 6:
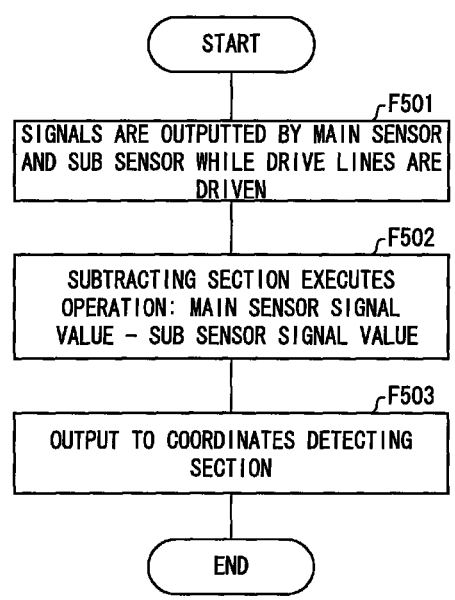
FIG. 6 is a flow chart illustrating a basic process of the touch panel system shown in FIG. 4.

In order to avoid this, the touch panel system 1a includes, as a measure for removing such the noises, the sub sensor group 32a and the subtracting section 41. With reference to FIG. 6, the following will describe a noise canceling process performed by the touch panel system 1a. FIG. 6 is a flow chart illustrating a noise canceling process, which is a basic process of the touch panel system 1a.

Upon activation of the touch panel system 1a, the drive line 35 is supplied with an electric potential at a certain interval. When the user performs a touch operation on the touch panel 3a, both of the main sensor group 31a and the sub sensor group 32a output signals to the subtracting section 41. Specifically, the user's performing the touch operation increases a capacitance of a specific main sensor 31 corresponding to the touched position. Namely, the user's performing the touch operation increases a value of an output signal supplied from that main sensor 31 (sense line 33). The touch panel system 1a outputs, to the subtracting section 41, output signals supplied from the sense line 33 and the sub sense line 34, while driving the drive lines 35.

To be more specific, a noise such as a clock generated in the display device 2 and other noises coming from the outside are reflected in the touch panel 3a. Therefore, the main sensor group 31a and the sub sensor group 32a detect various kinds of noise components. Specifically, the output signal supplied from the main sensor group 31a includes not only a signal derived from the touch operation itself but also a noise signal (noise component). Meanwhile, the sub sensor group 32a is configured not to detect a touch operation. Therefore, the output signal supplied from the sub sensor group 32a includes a noise signal (noise component), but does not include a signal derived from the touch operation (F501).

In the touch panel system 1a, the main sensor group 31a and the sub sensor group 32a are provided in the same surface so as to be adjacent to each other. Therefore, (i) a value of a noise signal included in the output signal supplied from the main sensor group 31a and (ii) a value of a noise signal included in the output signal supplied from the sub sensor group 32a can be regarded as being basically the same. In view of this, the subtracting section 41 in the touch panel controller 4 executes an operation for subtracting (i) the input signal (signal value) supplied from the sub sensor group 32a from (ii) the input signal (signal value) supplied from the main sensor group 31a (F502). Namely, the subtracting section 41 finds a difference between each sense line 33 and the sub sense line 34. This removes the noise signal from the output signal supplied from the main sensor group 31a. This provides the signal value derived from the touch operation itself, which signal is generated in response to the touch operation.

The signal thus obtained by the subtracting operation is outputted to the coordinates detecting section 42 included in the touch panel controller 4 (F503). Thus, the signal derived from the touch operation itself is outputted to the coordinates detecting section 42. According to the signal derived from the touch operation itself, the coordinates detecting section 42 detects (i) the presence or absence of a touch operation and (ii) a touched position (coordinates). With this configuration, it is possible to prevent impairment in detection sensitivity of the coordinates detecting section 42 (e.g., detection accuracy as to the presence or absence of a touch operation, detection sensitivity as to a touched position).

Note that, according to the touch panel system 1a, an output signal of the sense line 33 provided with the specific main sensor 31 corresponding to the touched position has a waveform as shown in (a) of FIG. 3, whereas an output signal of the sub sensor group 32a (sub sense line 34) has a waveform as shown in (b) of FIG. 3. The subtracting section 41 subtracts, from the output signal supplied from the main sensor group 31a, the output signal supplied from the sub sensor group 32a. As shown in (c) of FIG. 3, this subtracting operation removes, from the output signal supplied from the main sensor group 31a, the noise component outputted by the sub sensor group 32a. This provides the signal derived from the touch operation itself, which signal is generated in response to the touch operation. Furthermore, since the coordinates detecting section 42 is supplied with the signal derived from the touch operation itself, detection accuracy for a touch operation is not impaired. Therefore, it is possible to reduce a difference between (i) the actual touched position and (ii) the detected position which is detected by the coordinates detecting section 42.

As described above, while driving the drive lines 35, the touch panel system 1a reads, from the sense line 33, a change in a capacitance value of the main sensor group 31a which change is caused by the touch operation performed by the user. Furthermore, the touch panel system 1a reads a noise component from the sub sense line 34. Moreover, the touch panel system 1a allows the subtracting section 41 to find a difference between the sense line 33 and the sub sense line 34, so as to remove (cancel) the noise component.

The touch panel system 1a includes the main sensor group 31a made of the plurality of main sensors 31 arranged vertically and horizontally in the form of a matrix. Thanks to this configuration, in addition to the same effects as those given by the touch panel system 1, the touch panel system 1a can detect, by the coordinates detecting section 42, coordinates indicative of a touched position. Namely, the touch panel system 1a can detect a touched position (coordinates value) in addition to the presence or absence of a touch operation.

As with the case of the touch panel system 1, for the touch panel system 1a, a noise component which is the subject of removal is not limited to an AC signal component. Accordingly, the touch panel system 1a also can cancel all noises reflected in the touch panel 3a.

Embodiment 3

(1) Configuration of Touch Panel System 1b

Figure 7:
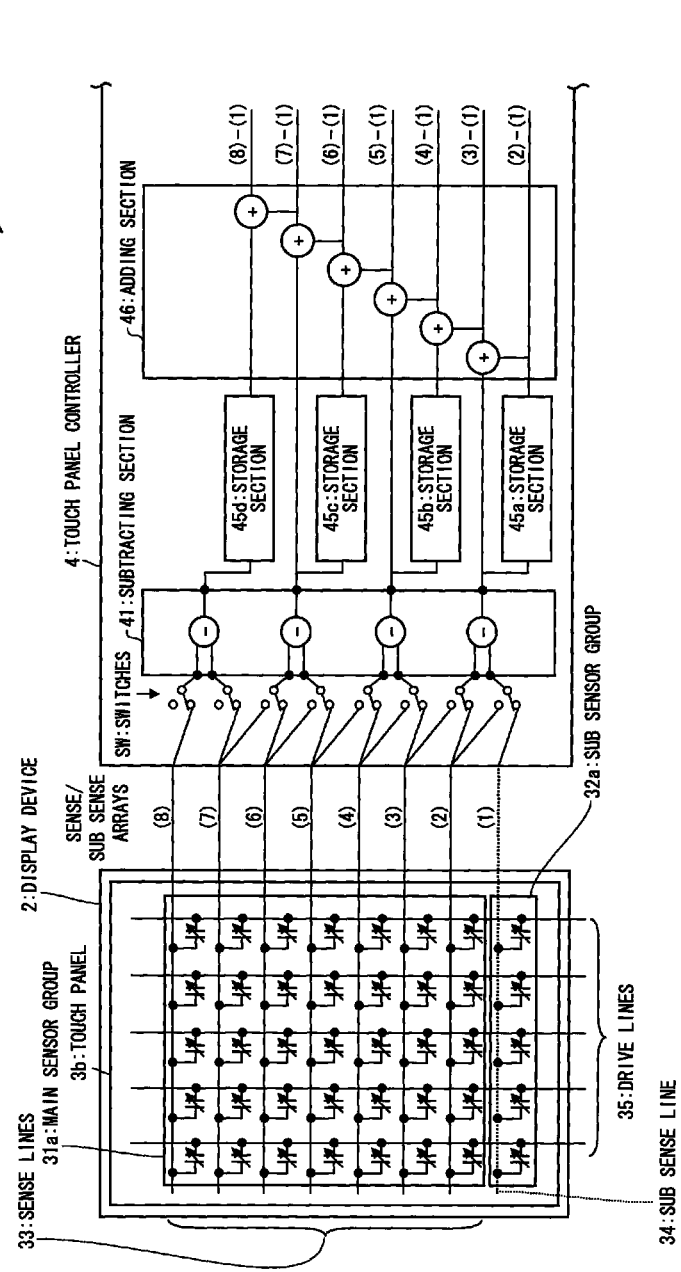
FIG. 7 is a view schematically illustrating a basic configuration of another touch panel system according to the present invention.

FIG. 7 is a view schematically illustrating a basic configuration of a touch panel system 1b according to another embodiment of the present invention. A basic configuration of the touch panel system 1b is substantially the same as that of the touch panel system 1a of Embodiment 2. The following will describe the touch panel system 1b, focusing on differences between the touch panel system 1a and the touch panel system 1b. For convenience of explanation, members having the same functions as those explained in the drawings described in Embodiments 1 and 2 are given the same reference signs, and explanations thereof are omitted here.

A touch panel 3b has the same configuration of that of the touch panel 3a in the touch panel system 1a of Embodiment 2. Namely, the touch panel 3b includes (i) a plurality of drive lines 35 (in FIG. 7, five drive lines 35), (ii) a plurality of sense lines 33 (in FIG. 7, seven sense lines 33) intersecting the drive lines 35, and (iii) one sub sense line 34 which intersects the drive lines 35 at right angles and extends in parallel with the sense lines 33. The sense lines 33 and the drive lines 35 are isolated from each other, and are coupled to each other via capacitances. The sub sense line 34 and the drive lines 35 are isolated from each other, and are coupled to each other via capacitances.

In the following description, eight sense/sub sense arrays, including the one sub sense line 34 and the seven sense lines 33, are referred to as Arrays (1) through (8), respectively.

A touch panel controller 4 includes switches SW, a subtracting section 41, storage sections 45a through 45d, and an adding section 46, which are arranged in this order from an input-receiving side of the touch panel controller 4. Note that the touch panel controller 4 also includes a coordinates detecting section 42 (not illustrated) and a CPU 43 (not illustrated) (FIG. 1). Thus, the touch panel system 1b differs from the touch panel systems 1 and 1a in terms of the configuration of the touch panel controller 4.

The switches SW select, from signals supplied from the sense lines 33 and the sub sense line 34, signals to be supplied to the subtracting section 41. More specifically, each of the switches SW includes two terminals (upper and lower terminals), and selects one of the upper and lower terminals. FIG. 7 shows a state where the switches SW select the lower terminals.

The subtracting section 41 performs difference signal operations on, out of signals supplied from Arrays (1) through (8), signals selected by the switches SW. Specifically, the subtracting section 41 performs difference signal operations between sense lines 33 which are adjacent to each other, and between a sense line 33 and the sub sense line 34 which are adjacent to each other. For example, in a case where the switches SW select the lower terminals as shown in FIG. 7, the subtracting section 41 performs the following difference signal operations: Array (8)−Array (7); Array (6)−Array (5); Array (4)−Array (3); and Array (2)−Array (1). On the other hand, in a case where the switches SW select the upper terminals (not illustrated), the subtracting section 41 performs the following difference signal operations: Array (7)−Array (6); Array (5)−Array (4); and Array (3)−Array (2).

In a case where each of the switches SW selects one of the upper and lower terminals, the storage sections 45a through 45d store signals (difference operation signals) obtained by the difference operations performed by the subtracting section 41. The difference operation signals stored in the storage sections 45a through 45d are outputted to the adding section 46. On the other hand, in a case where each of the switches SW selects the other one of the upper and lower terminals, difference operation signals are directly outputted to the adding section 46, not via the storage sections 45a through 45d.

The adding section 46 adds up the difference operation signals each of which is obtained from the sense lines 33 adjacent to each other and which are supplied from the subtracting section 41 and the storage sections 45a through 45d. Thereafter, the adding section 46 outputs a result of the adding operation. Further, the adding section 46 outputs the difference operation signal (Array (2)−Array (1)) which is obtained from the sub sense line 34 and the sense line 33 adjacent to the sub sense line 34 and which is stored in the storage section 45a. Ultimately, the adding section 46 outputs signals obtained by the following operations: Array (2)−Array (1); Array (3)−Array (1); Array (4)−Array (1); Array (5)−Array (1); Array (6)−Array (1); Array (7)−Array (1); and Array (8)−Array (1). Namely, each signal outputted by the adding section 46 is such a signal from which the noise signal (corresponding to the signal of Array (1)) included in the sense lines 33 has been removed. Furthermore, the subtracting section 41 has performed the difference signal operation between the sense lines 33 adjacent to each other. This allows the adding section 46 to output the signals from which the noise signals have been more reliably removed.

(2) Noise Processing Performed by Touch Panel System 1b

Figure 8:
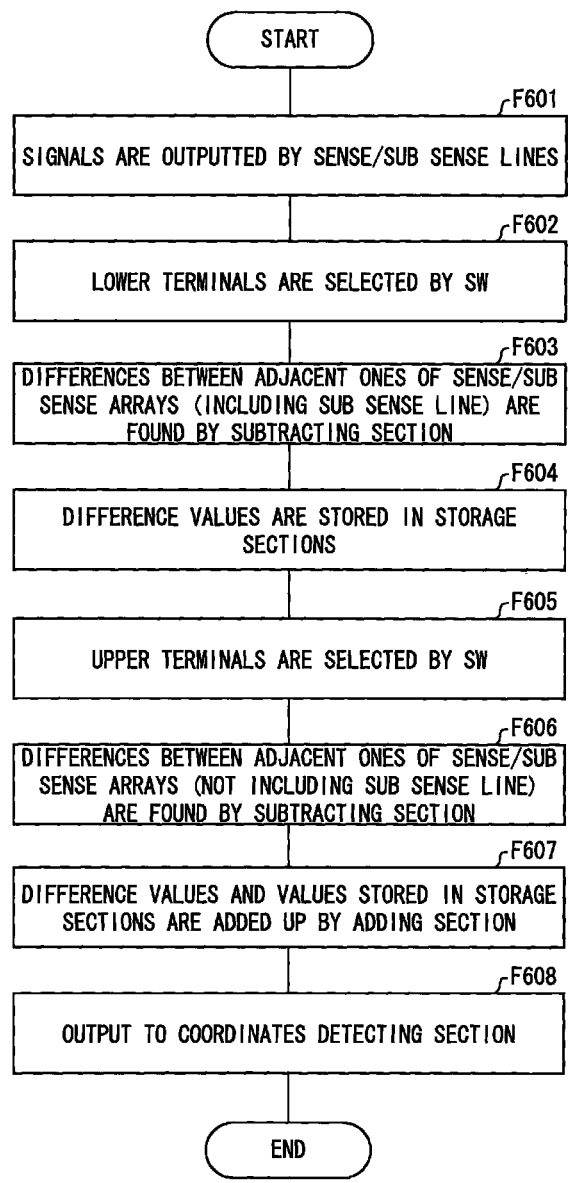
FIG. 8 is a flow chart illustrating a basic process of the touch panel system shown in FIG. 7.

With reference to FIGS. 7 and 8, the following will describe noise processing performed by the touch panel system 1b. FIG. 8 is a flow chart illustrating a noise canceling process, which is a basic process of the touch panel system 1b.

Upon activation of the touch panel system 1b, the drive line 35 is supplied with an electric potential at a certain interval. The user's performing a touch operation on the touch panel 3b increases a capacitance of a specific sense line 33 corresponding to the touched position. Namely, the user's performing the touch operation on the touch panel 3b increases a value of an output signal supplied from that sense line 33. The touch panel system 1b outputs, to the touch panel controller 4, output signals supplied from the sense lines 33 and the sub sense line 34, while driving the drive lines 35. Thus, while driving the drive lines 35, the touch panel system 1b detects changes in the capacitances of the sense lines 33 and a change in the capacitance of the sub sense line 34, so as to determine the presence or absence of a touch operation and a touched position.

To be more specific, a noise such as a clock generated in the display device 2 and other noises coming from the outside are reflected in the touch panel 3b. Therefore, each of the main sensor group 31a and the sub sensor group 32a detects various kinds of noise components. Specifically, the output signal supplied from the sense line 33 includes not only a signal derived from the touch operation itself but also a noise signal (noise component). Meanwhile, the sub sense line 34 is configured not to detect a touch operation. Therefore, the output signal supplied from the sub sense line 34 includes a noise signal (noise component), but does not include a signal derived from the touch operation (F601).

Next, the switches SW select the lower terminals (F602). Then, the subtracting section 41 finds a difference (sense line (Sn+1)−sense line Sn: a first difference) between a sense line 33 (sense line Sn) and a sense line (sense line Sn+1) which is one of two sense lines 33 adjacent to the certain sense line 33 and is closer to the sub sense line 34 than the other is. In this step, a difference (third difference) between the sub sense line 34 and a sense line 33 which is closer to the sub sense line 34 than any other sense lines 33 is found (F603).

For Arrays (1) through (8) shown in FIG. 7, the subtracting section 41 performs the following four difference signal operations:

Array (2)−Array (1) (The resulting difference value is referred to as "A".)
Array (4)−Array (3) (The resulting difference value is referred to as "C".)
Array (6)−Array (5) (The resulting difference value is referred to as "E".)
Array (8)−Array (7) (The resulting difference value is referred to as "G".)

Namely, in the step F603, the subtracting section 41 performs the difference signal operations on Arrays (1) through (8), which includes the sub sense line 34.

The difference values A, C, E, and G found by the subtracting section 41 are stored in the storage sections 45*a* through 45*d*, respectively. Namely, the storage section 45*a* stores the difference value A, the storage section 45*b* stores the difference value C, the storage section 45*c* stores the difference value E, and the storage section 45*d* stores the difference value G (F604).

Next, the switches SW selecting the lower terminals are turned to select (close) the upper terminals (F605). Then, the subtracting section 41 performs an operation similar to that of F603. Specifically, the subtracting section 41 performs a difference signal operation (sense line Sn−sense line (Sn−1): a second difference) between the sense line 33 (sense line Sn) and a sense line (sense line Sn−1) which is one of the two sense lines 33 adjacent to the certain sense line 33 and is further away from the sub sense line 34 than the other is (F606).

For Arrays (1) through (8) shown in FIG. 7, the subtracting section 41 performs the following three difference signal operations:

Array (3)−Array (2) (The resulting difference value is referred to as "B".)
Array (5)−Array (4) (The resulting difference value is referred to as "D".)
Array (7)−Array (6) (The resulting difference value is referred to as "F".)

Namely, in the step F606, the subtracting section 41 performs the difference signal operations on Arrays (2) through (7), which does not include the sub sense line 34.

Next, the adding section 46 performs an adding operation for adding up (i) the difference values B, D, and F found in the step F606 and (ii) the difference values A, C, E, and G stored in the respective storage sections 45*a* through 45*d*. Namely, the adding section 46 adds up (i) the difference values (the difference values A, C, E, and G) found when the lower terminals are selected by the switches SW and (ii) the difference values (the difference values B, D, and F) found when the upper terminals are selected by the switches SW (F607).

In the case of Arrays (1) through (8) shown in FIG. 7, the adding section 46 adds up (i) the difference value A (Array (2)−Array (1) signal) stored in the storage section 45*a* and (ii) the difference value B (Array (3)−Array (2) signal) outputted by the subtracting section 41. This adding operation is expressed as below:

Difference value $A$ + Difference value $B$ =

{Array (2) − Array(1)} + {Array(3) − Array(2)} =

Array(3) − Array(1) (The resulting difference value is referred to as "difference value $H$".)

This provides an Array (3)−Array (1) signal. The adding section 46 performs such operations sequentially.

Specifically, the adding section 46 adds, to the difference value H (Array (3)−Array (1) signal), the difference value C (Array (4)−Array (3) signal) stored in the storage section 45*b*. This provides an Array (4)−Array (1) signal (difference value I).

Next, the adding section 46 adds, to the difference value I (Array (4)−Array (1) signal), the difference value D (Array (5)−Array (4) signal) outputted by the subtracting section 41. This provides an Array (5)−Array (1) signal (difference value J).

Next, the adding section 46 adds, to the difference value J (Array (5)−Array (1) signal), the difference value E (Array (6)−Array (5) signal) stored in the storage section 45*c*. This provides an Array (6)−Array (1) signal (difference value K).

Next, the adding section 46 adds, to the difference value K (Array (6)−Array (1) signal), the difference value F (Array (7)−Array (6) signal) outputted by the subtracting section 41. This provides an Array (7)−Array (1) signal (difference value L).

Next, the adding section 46 adds, to the difference value L (Array (7)−Array (1) signal), the difference value G (Array (8)−Array (7) signal) stored in the storage section 45*d*. This provides an Array (8)−Array (1) signal (difference value M).

Note that the difference value A (i.e., Array (2)−Array (1) signal) stored in the storage section 45*a* is outputted without being subjected to any adding operation by the adding section 46.

Thus, the adding section 46 outputs the following signals:
Array (2)−Array (1) signal=Difference value A
Array (3)−Array (1) signal=Difference value H
Array (4)−Array (1) signal=Difference value I
Array (5)−Array (1) signal=Difference value J
Array (6)−Array (1) signal=Difference value K
Array (7)−Array (1) signal=Difference value L
Array (8)−Array (1) signal=Difference value M In the configuration shown in FIG. 7, Arrays (2) through (8) are the sense lines 33, and Array (1) is the sub sense line 34. As a result of the adding operations performed by the adding section 46, the signal of Array (1) (noise signal) is removed from each of the signals of Arrays (2) through (8). Accordingly, each output signal supplied from the adding section 46 is such a signal from which a noise signal included in the sense line 33 has been removed. Thus, it is possible to provide a signal value derived from a touch operation itself, which signal value is generated in response to the touch operation. Each output signal of the adding section 46, from which the noise signal has been removed, is outputted to the coordinates detecting section 42 in the touch panel controller 4. Namely, the signals derived from the touch operation itself are outputted to the coordinates detecting section 42 (F608).

As described above, the touch panel system 1*b* obtains a difference signal value between sense lines 33 adjacent to each other. Namely, a difference is found between the adjacent sense lines 33, which have a higher correlation in terms of noise. Furthermore, from an output signal supplied from each sense line 33, a signal (noise signal) of the sub sense line 34 is removed. Therefore, as compared with the touch panel systems 1 and 1*a* of Embodiments 1 and 2, the touch panel system 1*b* can remove a noise more reliably.

In addition, according to the touch panel system 1*b*, the adding section 46 sequentially performs adding operations from the sub sense line 34 side (i.e., in the order of increasing distance between a sense line involved in a certain adding operation and the sub-sense line). Therefore, it is possible to remove a noise by performing the adding operations in such a manner that a result of an adding operation is used in a next adding operation.

Embodiment 4

Figure 9:
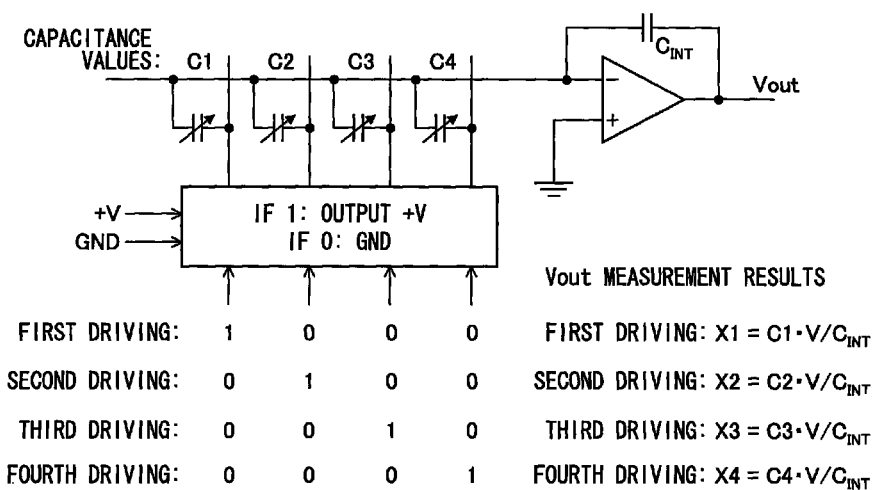
FIG. 9 is a view illustrating a driving method of a touch panel which driving method is employed in a conventional touch panel system.
Figure 10:
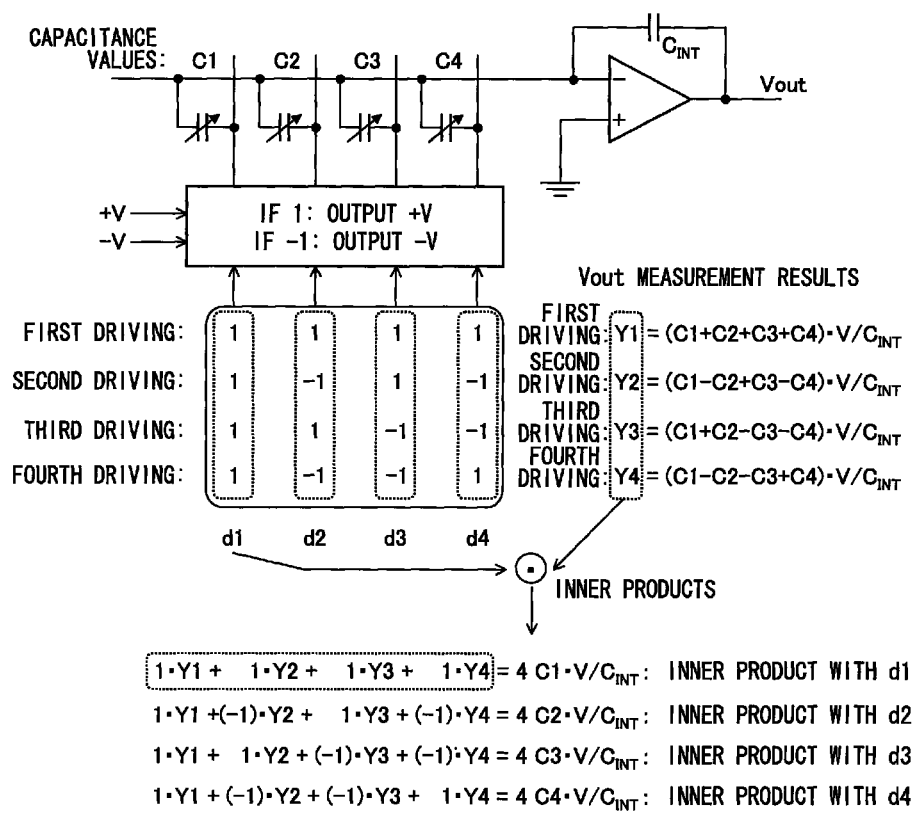
FIG. 10 is a view illustrating a driving method (orthogonal sequence driving method) of a touch panel which driving method is employed in a touch panel system of the present invention.

A driving method of a touch panel system of the present invention is not particularly limited. Preferably, the driving method is an orthogonal sequence driving method. In other words, drive lines 35 are preferably parallel driven. FIG. 9 is a view illustrating a driving method of a touch panel which driving method is employed in a conventional touch panel system. FIG. 10 is a view illustrating a driving method (orthogonal sequence driving method) of a touch panel which driving method is employed in a touch panel system of the present invention.

FIG. 9 shows one sense line extracted from the touch panel and provided with four sensors. As shown in FIG. 9, the conventional touch panel system drives drive lines in the following manner: +V volt is applied to a drive line which is to be driven, so that the drive lines are driven sequentially.

Specifically, in the first drive line driving, +V volt is applied to the leftmost sensor. This gives the first Vout measurement result (X1) expressed by:

$$X1 = C1 \, V/Cint$$

Similarly, in the second drive line driving, +V volt is applied to the second sensor from the left. This gives the second Vout measurement result (X2) expressed by:

$$X2 = C2 \times V/Cint$$

In the third drive line driving, +V volt is applied to the third sensor from the left. This gives the third Vout measurement result (X3) expressed by:

$$X3 = C3 \times V/Cint$$

In the fourth drive line driving, +V volt is applied to the rightmost sensor. This gives the fourth Vout measurement result (X4) expressed by:

$$X4 = C4 \times V/Cint$$

FIG. 10 shows, as well as FIG. 9, one sense line extracted from the touch panel and provided with four sensors. As shown in FIG. 10, according to the orthogonal sequence driving method, drive lines are driven in such a manner that +V volt or −V volt is applied to all the drive lines. Namely, according to the orthogonal sequence driving method, the drive lines are parallel driven.

Specifically, in the first drive line driving, +V volt is applied to all the sensors. This gives the first Vout measurement result (Y1) expressed by:

$$Y1 = (C1 + C2 + C3 + C4) \times V/Cint$$

In the second drive line driving, +V volt is applied to the leftmost sensor, −V volt is applied to the second sensor from the left, +V volt is applied to the third sensor from the left, and −V volt is applied to the rightmost sensor. This gives the second Vout measurement result (Y2) expressed by:

$$Y2 = (C1 - C2 + C3 - C4) \times V/Cint$$

In the third drive line driving, +V volt is applied to the leftmost sensor, +V volt is applied to the second sensor from the left, −V volt is applied to the third sensor from the left, and −V volt is applied to the rightmost sensor. This gives the third Vout measurement result (Y3) expressed by:

$$Y3 = (C1 + C2 - C3 - C4) \times V/Cint$$

In the fourth drive line driving, +V volt is applied to the leftmost sensor, −V volt is applied to the second sensor from the left, −V volt is applied to the third sensor from the left, and +V volt is applied to the rightmost sensor. This gives the fourth Vout measurement result (Y4) expressed by:

$$Y4 = C1 - C2 - C3 + C4) \times V/Cint$$

According to the configuration shown in FIG. 10, capacitance values (C1, C2, C3, C4) can be obtained by an inner product calculation of (i) output sequences (Y1, Y2, Y3, Y4) and (ii) orthogonal codes di. Such formula is established due to orthogonality of the orthogonal code di. Here, the code di indicates codes of positive and/or negative voltages applied to a respective drive line. Specifically, the code d1 indicates codes of voltages applied to the leftmost sensor, and is expressed as "+1, +1, +1, +1". The code d2 indicates codes of voltages applied to the second sensor from the left, and is expressed as "+1, −1, +1, −1". The code d3 indicates codes of voltages applied to the third sensor from the left, and is expressed as "+1, +1, −1, −1". The code d4 indicates codes of voltages applied to the leftmost-rightmost sensor, and is expressed as "+1, −1, −1, +1".

The values of C1, C2, C3, C4 are found by inner product calculations of (i) the output sequences Y1, Y2, Y3, Y4 and (ii) the codes d1, d2, d3, d4 as follows:

$$C1 = 1 \times Y1 + 1 \times Y2 + 1 \times Y3 + 1 \times Y4 = 4C1 \times V/Cint$$

$$C2 = 1 \times Y1 + (-1) \times Y2 + 1 \times Y3 + (-1) \times Y4 = 4C2 \times V/Cint$$

$$C3 = 1 \times Y1 + 1 \times Y2 + (-1) \times Y3 + (-1) \times Y4 = 4C3 \times V/Cint$$

$$C4 = 1 \times Y1 + (-1) \times Y2 + (-1) \times Y3 + (-1) \times Y4$$
$$= 4C3 \times V/Cint$$

Figure 11:
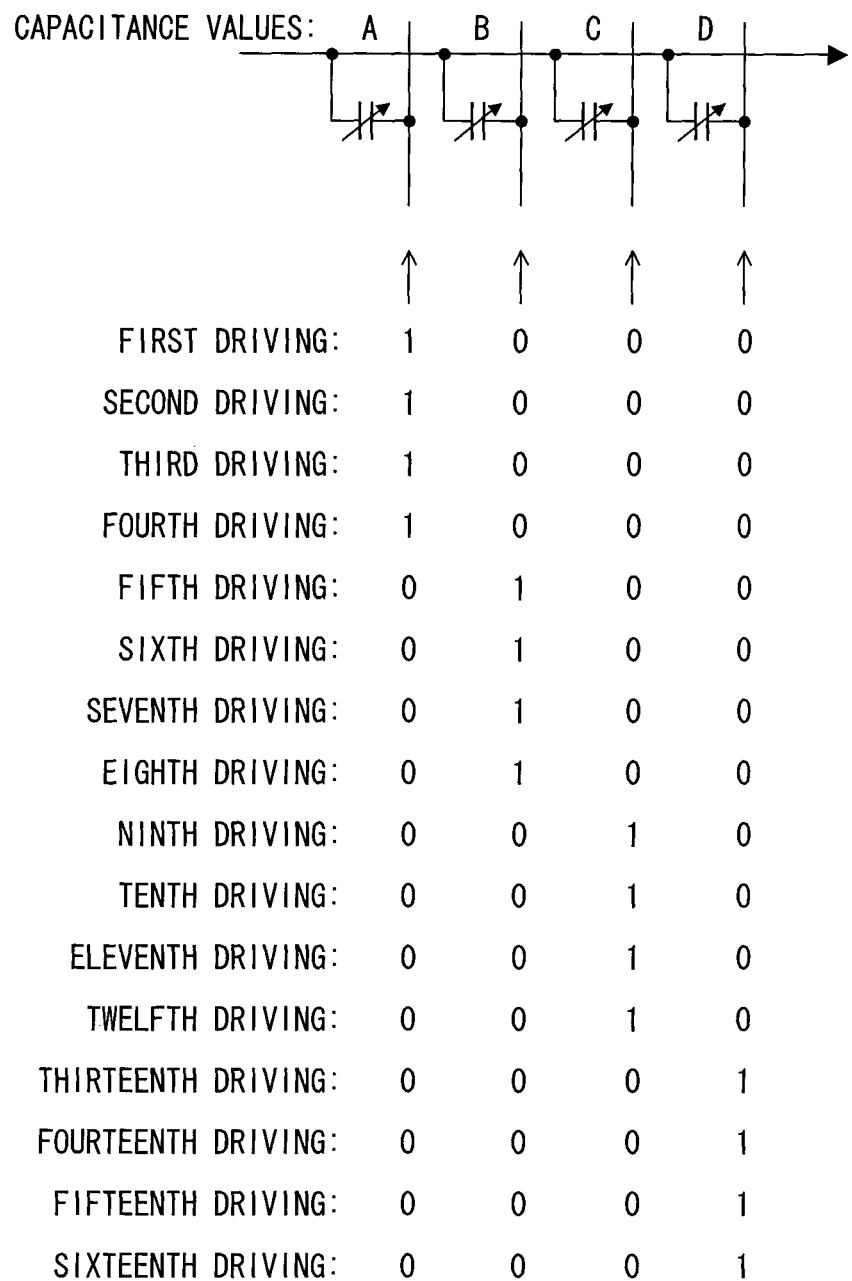
FIG. 11 is a view illustrating a process which needs to be performed by the touch panel employing the driving method of FIG. 9 in order to achieve sensitivity equivalent to that of the touch panel employing the driving method of FIG. 10.

Thus, due to the orthogonality of the codes di, Ci are obtained by inner product calculation of the codes di and the output sequences Yi. Now, the result thus obtained is compared with the result obtained by the conventional driving method shown in FIG. 9. In a case where the orthogonal sequence driving method and the conventional driving method perform the same number of driving operations, the orthogonal sequence driving method allows detection of values four times greater than those of the conventional driving method. FIG. 11 is a view illustrating a process which needs to be performed by the touch panel of the driving method of FIG. 9 in order that it achieves sensitivity equivalent to that of the touch panel of the driving method of FIG. 10. As shown in FIG. 11, in order that the driving method of FIG. 9 achieves the sensitivity equivalent to that given by the driving method of FIG. 10, the driving method of FIG. 9 needs to drive a certain drive line four times and to sum the results. Namely, according to the driving method of FIG. 9, a driving period for the drive lines is four times longer than that of the driving method of FIG. 10. Conversely, with a driving period for the drive lines which driving period is reduced to one-quarter of that of the driving method shown in FIG. 9, the driving method shown in FIG. 10 achieves sensitivity equivalent to that given by the conventional driving method shown in FIG. 9. Thus, according to the driving method shown in FIG. 10, it is possible to reduce electric power consumption of the touch panel system.

Figure 12:
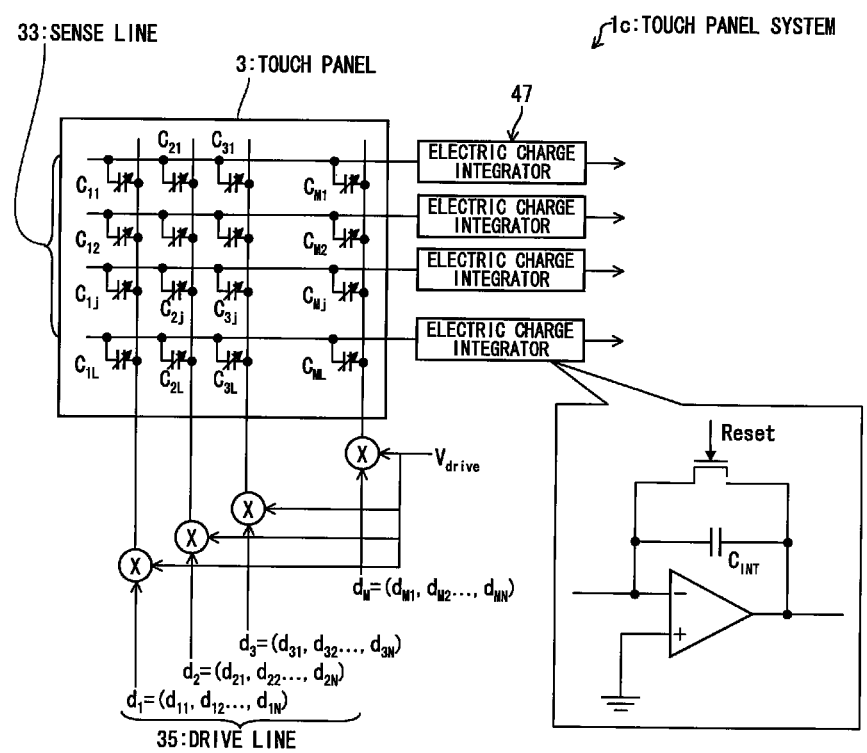
FIG. 12 is a view schematically illustrating another touch panel system according to the present invention, said another touch panel system including a touch panel driven by the orthogonal sequence driving method.

FIG. 12 is a view schematically illustrating a touch panel system 1c including a touch panel 3 driven by such the orthogonal sequence driving method. Specifically, the touch panel system 1c of FIG. 12 is shown with drive lines and sense lines, which correspond to the generalized four drive lines and one sense line of FIG. 10.

Specifically, the touch panel system 1c includes M drive lines 35, L sense lines 33 (each of M and L is a natural number), and capacitances which are formed between the drive lines 35 and the sense lines 33 so as to be arranged in a matrix. The touch panel system 1c performs the following operation: With respect to a matrix Cij (i=1, . . . , M, j= 1, . . . , L) of these capacitances, the code di=(di1, . . . , diN) (i=1, . . . , M) is used, which is constituted by "+1" and "−1" being orthogonal to each other and each having a code length N. Consequently, all the M drive lines 35 are driven concurrently in parallel, while applying +V volt in a case of "+1" and applying −V volt in a case of "−1". Further, capacitance values Cij are estimated by inner product calculation "di·sj=Σ(k=1, . . . , N)dik·sjk", i.e., inner product calculation of (i) output sequences sj=(sj1, . . . , sjN) (j=1, . . . , L) read from respective sense lines 33 and (ii) the codes di. In order to perform such the inner product calculation, the touch panel system 1c includes an electric charge integrator (calculation section) 47. A strength of an output signal (Vout) supplied from the electric charge integrator 47 is found by:

$$Vout = Cf \times Vdrive \times N / Cint$$

The output sequence sj is expressed as follows:

$$sj = (sj1, \ldots, sjN)$$
$$= \left(\sum (k=1, \ldots, M) Ckj \times dk1, \ldots, \sum (k=1, \ldots, M) Ckj \times dkN\right) \times (Vdrive/Cint)$$
$$= \left(\sum (k=1, \ldots, M) Ckj \times (dk1, \ldots, dkN)\right) \times (Vdrive/Cint)$$
$$= \sum (k=1, \ldots, M)(Ckj \times dk) \times (Vdrive/Cint)$$

The inner product of the code di and the output sequence sj is expressed as follows:

$$di \cdot sj = di \cdot \left(\sum (k=1, \ldots, M)(Ckj \times dk) \times (Vdrive/Cint)\right)$$
$$= \sum (k=1, \ldots, M)(Ckj \times di \cdot dk) \times (Vdrive/Cint)$$
$$= \sum (k=1, \ldots, M)(Ckj \times N \times \delta ik) \times (Vdrive/Cint)$$
$$[\delta ik = 1 \text{ if } i=k, 0 \text{ if else}]$$
$$= Cij \times N \times (Vdrive/Cint)$$

Thus, according to the touch panel system 1c, the touch panel 3 is driven by the orthogonal sequence driving method. Therefore, the following generalization is possible: By finding an inner product of the code di and the output sequence sj, a signal of the capacitance Cij is multiplied by N (code length). This driving method provides an effect that a signal strength of a capacitance is N-folded, regardless of the number of drive lines 35 (i.e., "M"). Conversely, by employing the orthogonal sequence driving method, sensitivity equivalent to that given by the conventional driving method shown in FIG. 9 can be achieved with a driving period for the drive lines which period is reduced to one-Nth of that of the driving method shown in FIG. 9. Namely, employing the orthogonal sequence driving method can reduce the number of times that the drive lines should be driven. This makes it possible to reduce electric power consumption of the touch panel system 1c.

Embodiment 5

Figure 13:
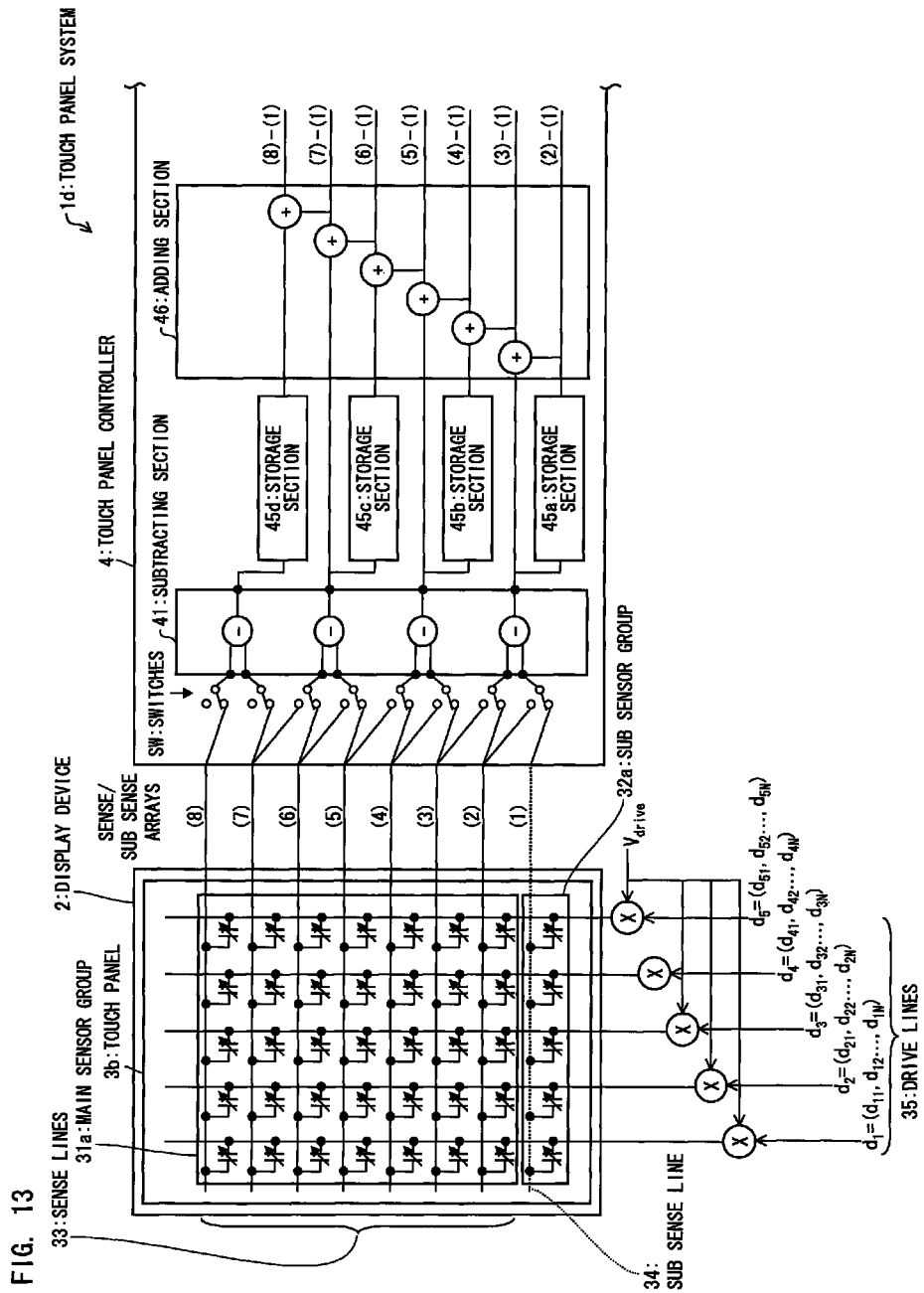
FIG. 13 is a view schematically illustrating a basic configuration of a touch panel system according to another embodiment of the present invention.

FIG. 13 is a view schematically illustrating a basic configuration of a touch panel system 1d according to the present embodiment. The touch panel system 1d is configured by employing, in the touch panel system 1b with the noise canceling function shown in FIG. 7, the orthogonal sequence driving method for the drive lines 35 which is shown in FIGS. 10 and 12 and which is employed in the touch panel system 1c. Since the touch panel system 1d operates in the same manner as the above-described touch panel systems 1b and 1c, explanations thereof are omitted here.

According to the touch panel system 1d, a difference signal value is found between sense lines 33 which are adjacent to each other. Namely, a difference is found between the adjacent sense lines 33, which have a higher correlation in terms of noise. Furthermore, from an output signal supplied from each sense line 33, a signal (noise signal) of a sub sense line 34 is removed. Therefore, as compared with the touch panel systems 1 and 1a of Embodiments 1 and 2, the touch panel system 1d can remove a noise more reliably. Moreover, a signal of a capacitance Cij is multiplied by N (code length). This allows a capacitance to have an N-folded signal strength, regardless of the number of drive lines 35. In addition, since the orthogonal sequence driving method is employed, sensitivity equivalent to that given by the conventional driving method shown in FIG. 9 can be achieved with a driving period for the drive lines which period is reduced to one-Nth of that of the driving method shown in FIG. 9. Namely, employing the orthogonal sequence driving method can reduce the number of times that the drive lines should be driven. This makes it possible to reduce electric power consumption of the touch panel system 1d.

Embodiment 6

Figure 14:
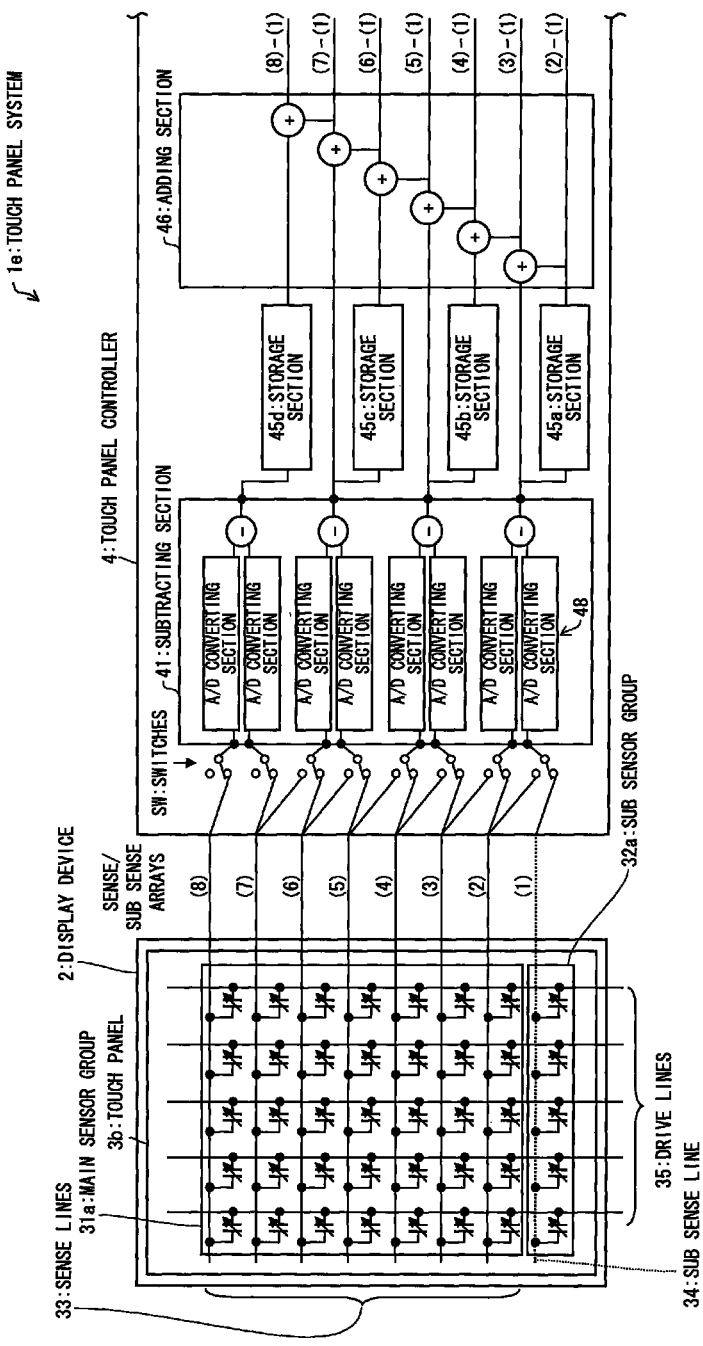
FIG. 14 is a view schematically illustrating a basic configuration of another touch panel system according to the present invention.

FIG. 14 is a view schematically illustrating a basic configuration of a touch panel system 1e according to the present embodiment. The touch panel system 1e includes a subtracting section 41 having a different configuration.

Each of output signals supplied from a sense line 33 and a sub sense line 34 of a touch panel 3b is an analog signal. Therefore, the subtracting section 41 includes an analog-to-digital converting section (first analog-to-digital converting section) 48 and a digital subtracter (not illustrated).

With this configuration, output signals (analog signals) supplied from the touch panel 3b are converted into digital signals by the analog-to-digital converting section 48 of the subtracting section 41. The digital subtracter performs, by use of the digital signals thus converted, subtracting operations in the same manner as in the touch panel system 1b shown in FIG. 7.

Thus, the touch panel system 1e can remove a noise by (i) converting, into digital signals, analog signals outputted by the touch panel 3b and thereafter (ii) performing subtracting operations.

Embodiment 7

Figure 15:
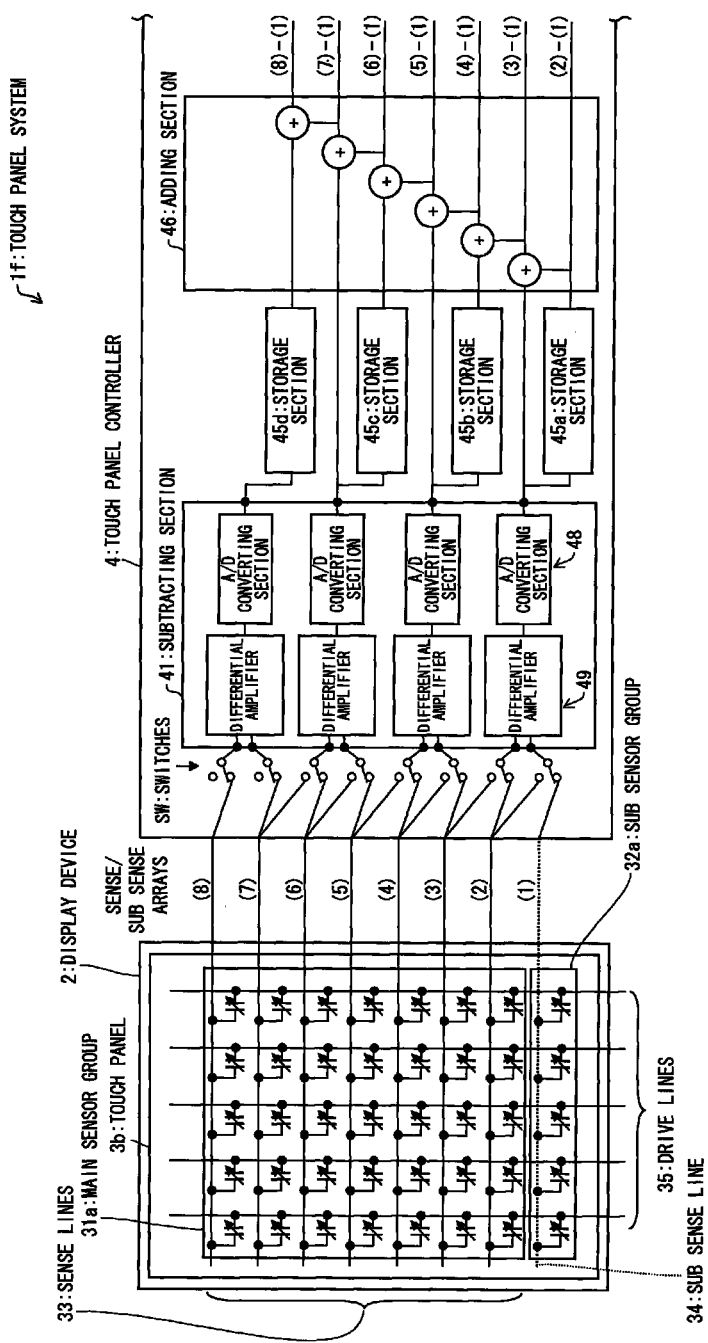
FIG. 15 is a view schematically illustrating a basic configuration of another touch panel system according to the present invention.

FIG. 15 is a view schematically illustrating a basic configuration of a touch panel system 1f according to the present embodiment. The touch panel system 1f includes a subtracting section 41 having a different configuration.

Output signals supplied from a sense line 33 and a sub sense line 34 of a touch panel 3b are analog signals. Therefore, the subtracting section 41 includes a differential amplifier 49 and an analog-to-digital converting section 48.

With this configuration, in the same manner as in the touch panel system 1b shown in FIG. 7, the differential amplifier 49 performs subtracting operations on output signals (analog signals) supplied from the touch panel 3b, without converting the analog signals into digital signals. The analog-to-digital converting section 48 (second analog-to-digital converting section) converts, into a digital signal, an analog signal thus obtained by the subtracting operations.

Thus, the touch panel system if can remove a noise by (i) performing subtracting operations on analog signals outputted by the touch panel 3b, without converting the analog signals into digital signals, and thereafter (ii) converting the resulting signal into a digital signal.

Embodiment 8

Figure 16:
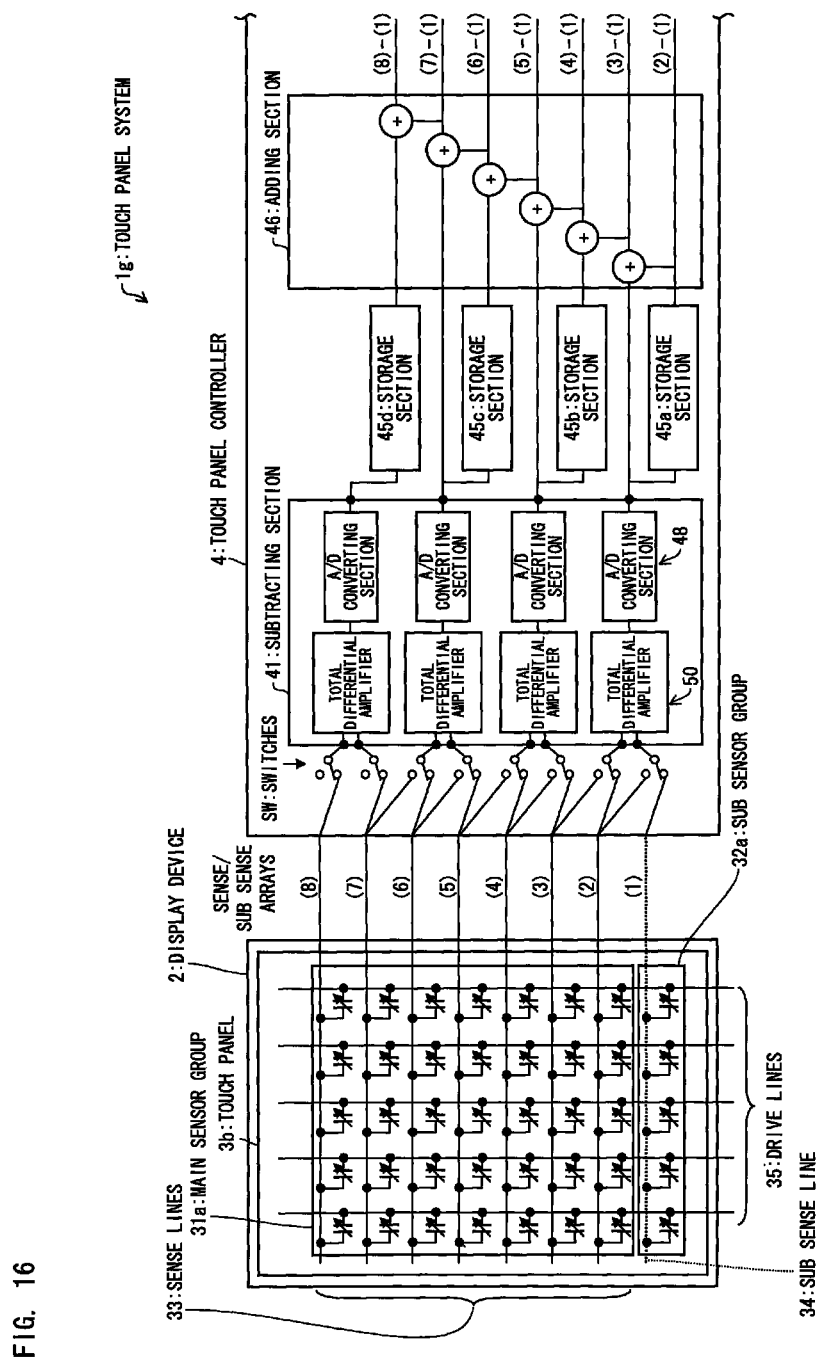
FIG. 16 is a view schematically illustrating a basic configuration of another touch panel system according to the present invention.

FIG. 16 is a view schematically illustrating a basic configuration of a touch panel system 1g according to the present embodiment. The touch panel system 1g includes a subtracting section 41 having a different configuration. The touch panel system 1g includes a total differential amplifier 50 instead of the differential amplifier 49 in the touch panel system 1f shown in FIG. 15.

Output signals supplied from sense lines 33 and a sub sense line 34 of a touch panel 3b are analog signals. Therefore, the subtracting section 41 includes a total differential amplifier 50 and an analog-to-digital converting section 48.

With this configuration, in the same manner as in the touch panel system 1b shown in FIG. 7, the total differential amplifier 50 performs subtracting operations on output signals (analog signals) supplied from the touch panel 3b, without converting the analog signals into digital signals. The analog-to-digital converting section 48 converts, into a digital signal, an analog signal thus obtained by the subtracting operations.

Figure 17:
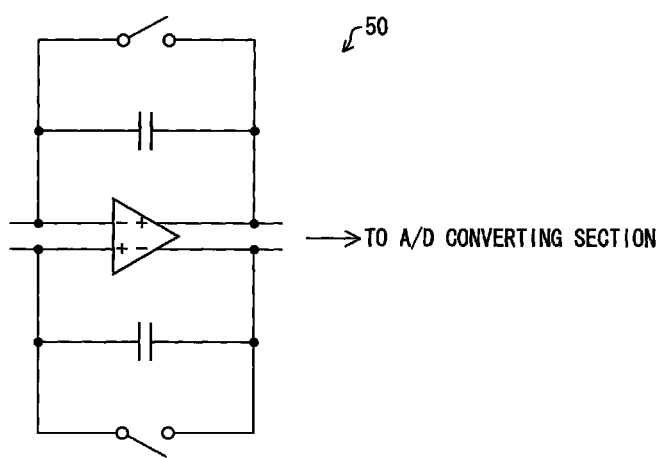
FIG. 17 is a circuit diagram showing one example of a total differential amplifier included in the touch panel system shown in FIG. 16.

FIG. 17 is a circuit diagram illustrating one example of the total differential amplifier 50. The total differential amplifier 50 includes two pairs each including a capacitance and a switch, the two pairs being arranged so as to be symmetric to each other with respect to a differential amplifier. Specifically, a non-inverting input terminal (+) and an inverting input terminal (−) of the differential amplifier are supplied with signals from sense lines 33 which are adjacent to each other. A capacitance (feedback capacitance) is provided between an inverting output terminal (−) and the non-inverting input terminal (+) of the differential amplifier so that the capacitance is connected with the inverting output terminal (−) and the non-inverting input terminal (+), and another capacitance (feedback capacitance) is provided between a non-inverting output terminal (+) and the inverting input terminal (−) of the differential amplifier so that said another capacitance is connected with the non-inverting output terminal (+) and the inverting input terminal (−), these capacitances having the same capacitance value. Furthermore, a switch is provided between the inverting output terminal (−) and the non-inverting input terminal (+) so that the switch is connected with the inverting output terminal (−) and the non-inverting input terminal (+), and another switch is provided between the non-inverting output terminal (+) and the inverting input terminal (−) so that said another switch is connected with the non-inverting output terminal (+) and the inverting input terminal (−).

Thus, the touch panel system 1g can remove a noise by (i) performing subtracting operations on analog signals outputted by the touch panel 3b, without converting the analog signals into digital signals, and thereafter (ii) converting the resulting signal into a digital signal.

Embodiment 9

Figure 18:
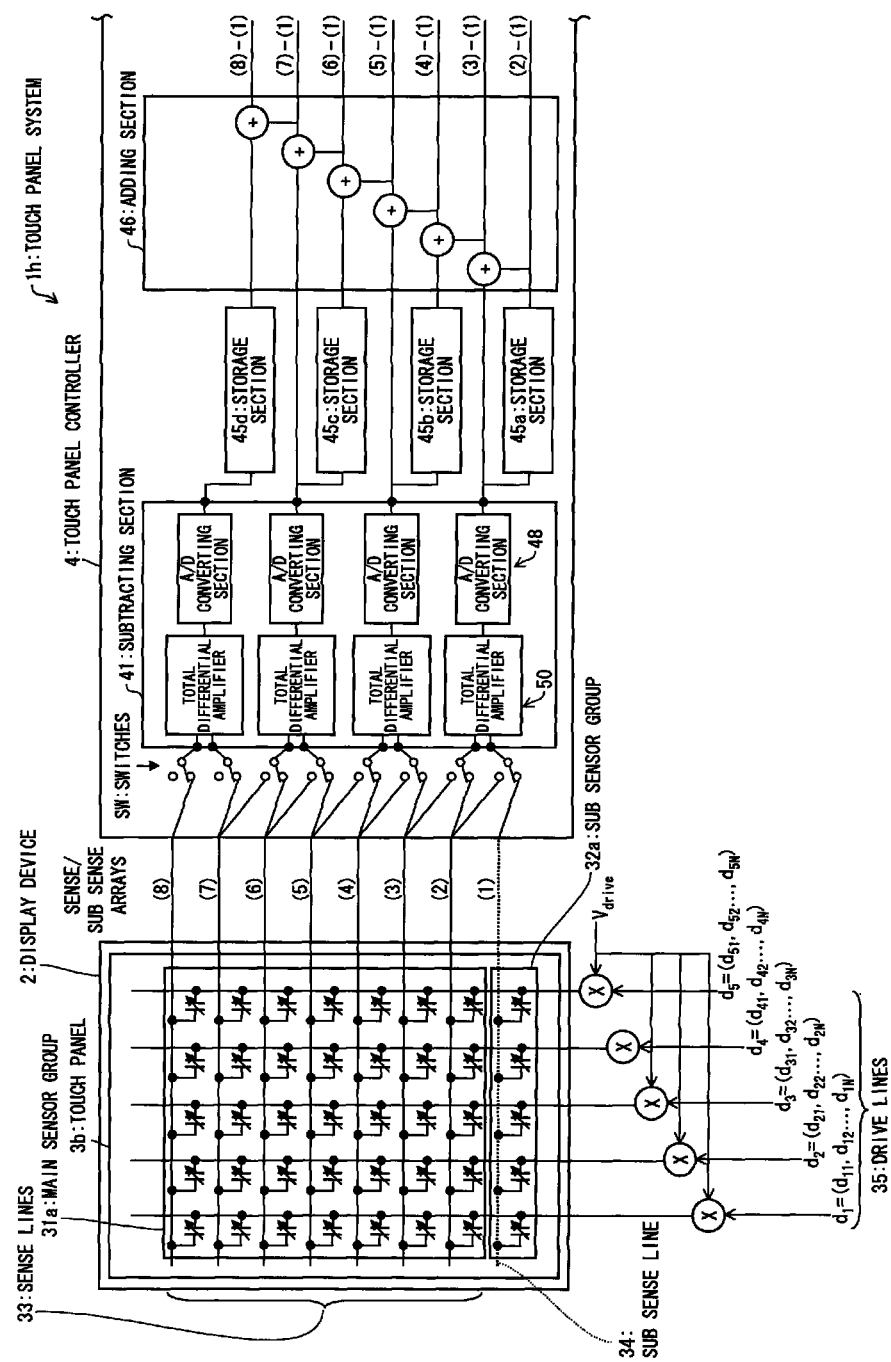
FIG. 18 is a view schematically illustrating a basic configuration of another touch panel system according to the present invention.
Figure 19:
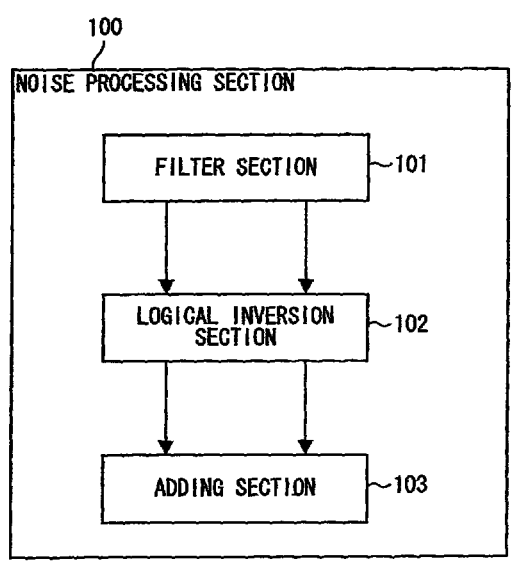
FIG. 19 is a block diagram illustrating a noise processing section provided in a touch panel system of Patent Literature 1.

FIG. 18 is a view schematically illustrating a basic configuration of a touch panel system 1h according to the present embodiment. The touch panel system 1h includes (i) a subtracting section 41 having a different configuration and involves (i) a different driving method of a touch panel 3b. The touch panel system 1h includes a total differential amplifier 50 instead of the differential amplifier 49 in the touch panel system 1f shown in FIG. 15.

Output signals supplied from sense lines 33 and a sub sense line 34 of the touch panel 3b are analog signals. Therefore, the subtracting section 41 includes a total differential amplifier 50 and an analog-to-digital converting section 48.

With this configuration, in the same manner as in the touch panel system 1b shown in FIG. 7, the total differential amplifier 50 performs subtracting operations on output signals (analog signals) supplied from the touch panel 3b, without converting the analog signals into digital signals. The analog-to-digital converting section 48 converts, into a digital signal, an analog signal thus obtained by the subtracting operations.

Further, the touch panel system 1h employs, as a driving method for the touch panel 3b, the orthogonal sequence driving method shown in FIGS. 10, 12, and 13. According to this configuration, as shown in FIG. 10, a voltage for driving four drive lines is applied as follows: In the second driving through the fourth driving, +V is applied twice and −V is also applied twice, i.e., the number of times of application of +V is equal to that of −V. On the other hand, in the first driving, +V is applied four times. Accordingly, an output value of an output sequence Y1 of the first driving is greater than that of each of output sequences Y2 through Y4 of the second driving through the fourth driving. Therefore, applying a dynamic range to the output value of any of the output sequences Y2 through Y4 of the second driving through the fourth driving causes saturation of the output sequence Y1 of the first driving.

In order to address this, the subtracting section 41 of the touch panel system 1h includes the total differential amplifier 50. Further, employed as the total differential amplifier 50 is the one whose input common-mode voltage range is rail to rail. Namely, the total differential amplifier 50 has a wide common-mode input range. Consequently, the total differential amplifier 50 can operate in a voltage range from a power source voltage (Vdd) to GND. Furthermore, a difference between input signals supplied to the total differential amplifier 50 is amplified. Therefore, regardless of the type of the orthogonal sequence driving method employed in the touch panel 3b which is combined with the touch panel system 1h, an output signal from the total differential amplifier 50 is free from the problem of output saturation. Note that one example of the total differential amplifier 50 is as previously described with reference to FIG. 17.

Thus, the touch panel system 1h can remove a noise by (i) performing subtracting operations on analog signals outputted by the touch panel 3b, without converting the analog signals into digital signals, and thereafter (ii) converting the resulting signal into a digital signal. Furthermore, since the touch panel system 1h includes the total differential amplifier 50 capable of rail-to-rail operation, an output signal from the total differential amplifier 50 is free from the problem of output saturation.

Embodiment 10

In Embodiments 1 through 9, a touch panel system provided with a sub sensor 32 (sub sense line 34) has been described. However, for a touch panel system of the present invention, the sub sensor 32 is not essential. In the present embodiment, a touch panel system not provided with a sub sensor 32 will be described.

Figure 20:
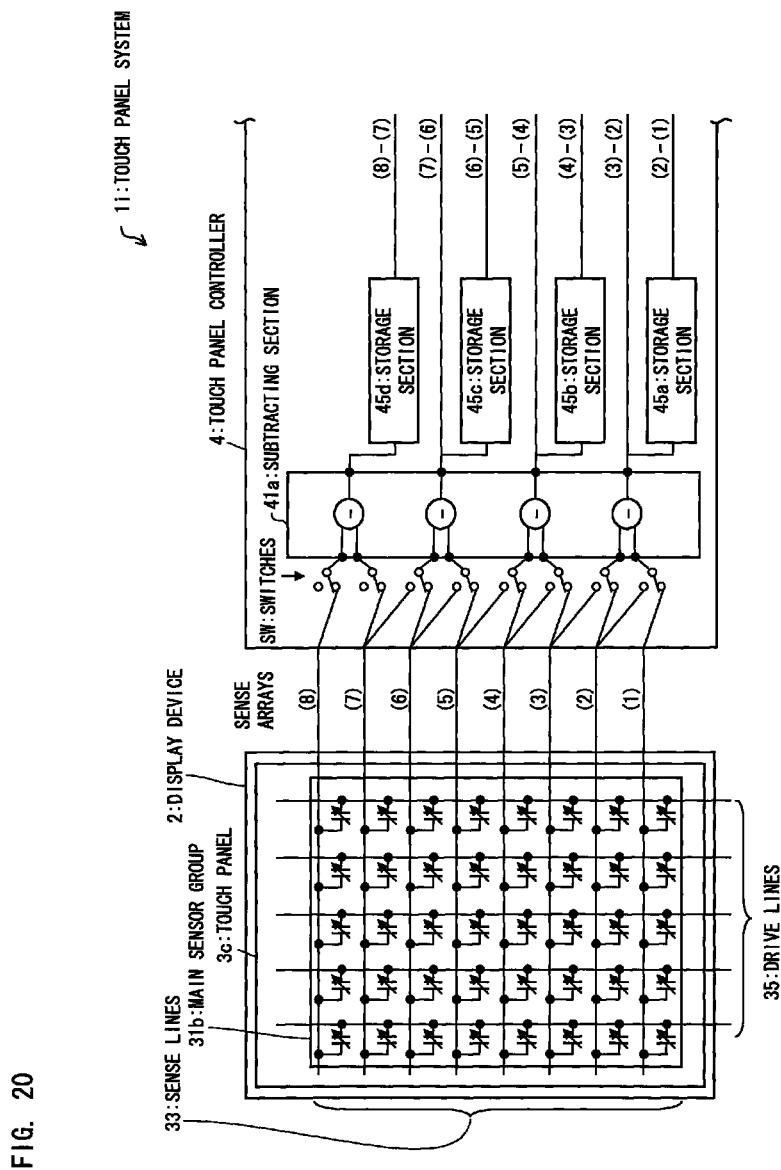
FIG. 20 is a view schematically illustrating a basic configuration of another touch panel system according to the present invention.

FIG. 20 is a view schematically illustrating a basic configuration of a touch panel system 1i of the present embodiment. The touch panel system 1i includes a subtracting section 41a for finding a difference signal of sense lines 33 adjacent to each other.

More specifically, a touch panel 3c includes a plurality of (in FIG. 20, five) drive lines 35 and a plurality of (in FIG. 20, eight) sense lines 33 intersecting the drive lines 35. The sense lines 33 and the drive lines 35 are isolated from each other, and the sense lines 33 and the drive lines 35 are coupled to each other via capacitances.

A touch panel controller 4 includes switches SW, the subtracting section 41a, storage sections 45a through 45d, which are arranged in this order from an input-receiving side of the touch panel controller 4. Note that the touch panel controller 4 also includes a coordinates detecting section 42 (not illustrated) and a CPU 43 (not illustrated) (see FIG. 1).

The subtracting section 41a includes input terminals (input terminals for outputs of main sensors) for receiving signals outputted by main sensors 31. The subtracting section 41a receives the signals from the main sensors 31. Then, the subtracting section 41a subtracts one of adjacent sense lines 33 from the other of the adjacent sense lines 33, so as to find a difference value (difference signal). The signal thus obtained as a result of the subtracting operation by the subtracting section 41a is outputted to the coordinates detecting section 42 (see FIG. 1).

Thus, the touch panel system 1i differs from the touch panel systems of the above-described embodiments in terms of that the touch panel system 1i is not provided with a sub sensor 32 (sub sense line 34) and the subtracting section 41a performs a different operation.

The switches SW select, from signals supplied from the sense lines 33, signals to be supplied to the subtracting section 41a. More specifically, each of the switches SW includes two terminals (upper and lower terminals), and selects one of the upper and lower terminals. FIG. 20 shows a state where the switches SW select the lower terminals.

The subtracting section 41a performs difference signal operations on, out of signals supplied from Arrays (1) through (8), signals selected by the switches SW. Specifically, the subtracting section 41a performs a difference signal operation between sense lines 33 which are adjacent to each other. For example, in a case where the switches SW select the lower terminals as shown in FIG. 20, the subtracting section 41a performs the following signal operations: Array (8)−Array (7); Array (6)−Array (5); Array (4)−Array (3); and Array (2)−Array (1). On the other hand, in a case where the switches SW select the upper terminals (not illustrated), the subtracting section 41a performs the following difference signal operations: Array (7)−Array (6); Array (5)−Array (4); and Array (3)−Array (2).

In a case where each of the switches SW selects one of the upper and lower terminals, the storage sections 45a through 45d store signals (difference operation signals) obtained by the difference operations performed by the subtracting section 41a. On the other hand, in a case where each of the switches SW selects the other one of the upper and lower terminals, difference operation signals are directly outputted, not via the storage sections 45a through 45d.

(2) Noise Processing Performed by Touch Panel System 1i

Figure 21:
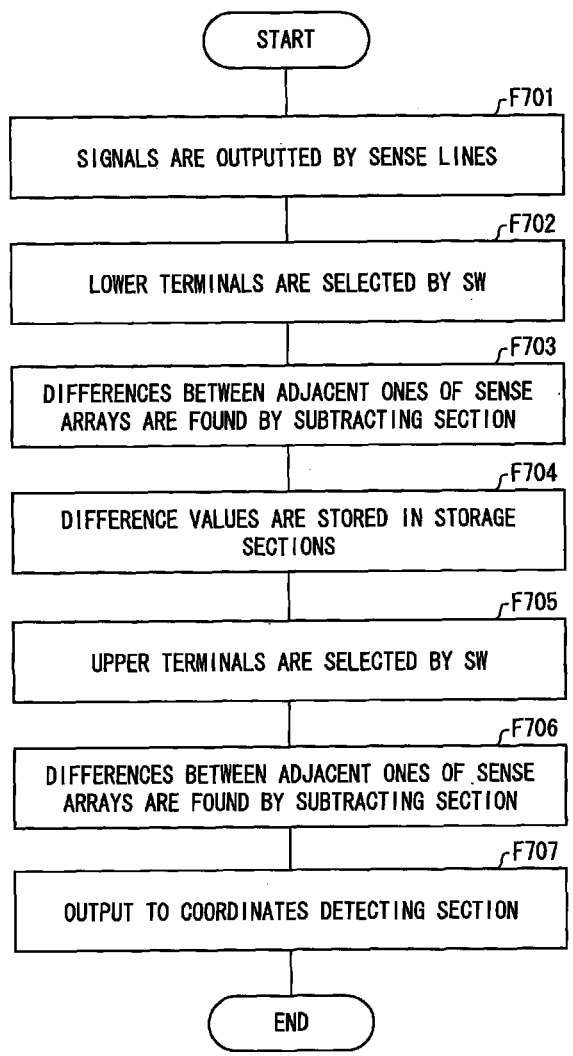
FIG. 21 is a flow chart illustrating a basic process of the touch panel system shown in FIG. 20.

With reference to FIGS. 20 and 21, the following will describe noise processing performed by the touch panel system 1i. FIG. 21 is a flow chart illustrating a noise canceling process, which is a basic process of the touch panel system 1i.

Upon activation of the touch panel system 1i, the drive line 35 is supplied with an electric potential at a certain interval. The user's performing a touch operation on the touch panel 3c changes a capacitance of a specific sense line 33 corresponding to the touched position. Namely, the user's performing the touch operation on the touch panel 3c changes a value of an output signal supplied from that sense line 33. The touch panel system 1i outputs, to the touch panel controller 4, output signals from the sense lines 33, while driving the drive lines 35. Thus, while driving the drive lines 35, the touch panel system 1i detects a change in the capacitance of the sense line 33, so as to determine the presence or absence of a touch operation and a touched position.

To be more specific, a noise such as a clock generated in the display device 2 and other noises coming from the outside are reflected in the touch panel 3c. Therefore, a main sensor group 31b detects various kinds of noise components. Specifically, the output signal supplied from the sense line 33 includes not only a signal derived from the touch operation itself but also a noise signal (noise component) (F701).

Next, the switches SW select the lower terminals (F702). Then, the subtracting section 41a finds a difference (sense line (Sn+1)−sense line Sn: a first difference) between a sense line 33 (sense line Sn) and a sense line (sense line Sn+1) which is one of two sense lines 33 adjacent to the certain sense line 33 (F703).

For Arrays (1) through (8) shown in FIG. 20, the subtracting section 41a performs the following four difference signal operations:

Array (2)−Array (1) (The resulting difference value is referred to as "A".)
Array (4)−Array (3) (The resulting difference value is referred to as "C".)
Array (6)−Array (5) (The resulting difference value is referred to as "E".)
Array (8)−Array (7) (The resulting difference value is referred to as "G".)

Namely, in the step F703, the subtracting section 41a performs the difference signal operations on Arrays (1) through (8) of the sense lines 33.

The difference values A, C, E, and G found by the subtracting section 41a are stored in the storage sections 45a through 45d, respectively. Namely, the storage section 45a stores the difference value A, the storage section 45b stores the difference value C, the storage section 45c stores the difference value E, and the storage section 45d stores the difference value G (F704).

Next, the switches SW selecting the lower terminals are turned to select (close) the upper terminals (F705). Then, the subtracting section 41a performs an operation similar to that of F703. Specifically, the subtracting section 41a performs a difference signal operation (sense line (Sn–(Sn–1): a second difference) between the sense line 33 (sense line Sn) and a sense line (sense line Sn–1) which is the other one of the two sense lines 33 adjacent to the certain sense line 33 (F706).

For Arrays (1) through (8) shown in FIG. 20, the subtracting section 41a performs the following three difference signal operations:

Array (3)–Array (2) (The resulting difference value is referred to as "B".)
Array (5)–Array (4) (The resulting difference value is referred to as "D".)
Array (7)–Array (6) (The resulting difference value is referred to as "F".)

Namely, in the step F706, the subtracting section 41a performs the difference signal operations on Arrays (2) through (7).

As described above, the touch panel system 1i obtains a difference signal value between sense lines 33 adjacent to each other. Namely, a difference is found between the adjacent sense lines 33, which have a higher correlation in terms of noise. This removes the noise component from the output signal supplied from the main sensor group 31b, thereby extracting the signal derived from the touch operation itself. This makes it possible to reliably remove (cancel) a wide variety of noises reflected in the touch panel 3c.

Embodiment 11

Figure 22:
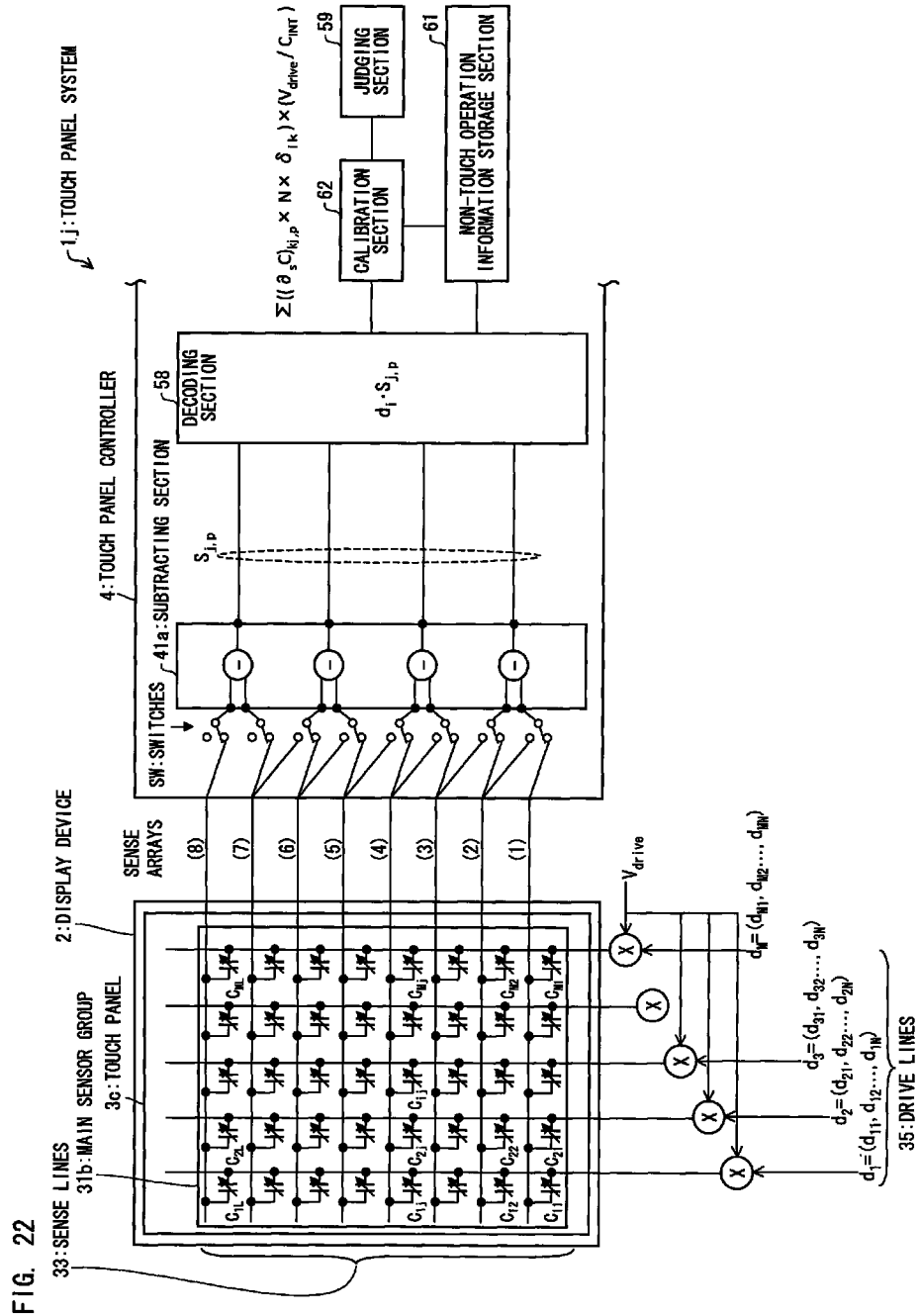
FIG. 22 is a view schematically illustrating a basic configuration of another touch panel system according to the present invention.

FIG. 22 is a view schematically illustrating a basic configuration of a touch panel system 1j of the present embodiment. The touch panel system 1j is configured by employing, in the above-described touch panel system 1i having the noise canceling function shown in FIG. 20, a drive line driving circuit (not illustrated) for parallel driving the drive lines 35. Further, the touch panel system 1j includes (i) a decoding section 58 for decoding difference values of capacitances which difference values are found by a subtracting section 41a, (ii) a non-touch operation information storage section 61 for storing a distribution of differences between the capacitances which differences are decoded by the decoding section 58 when no touch operation is performed, and (iii) a calibration section 62 for calibrating a distribution of differences between the capacitances which differences are decoded by the decoding section 58 when a touch operation is performed. Since the touch panel system 1j operates in the same manner as the above-described touch panel system 1i, explanations thereof are omitted here. The following descriptions focus on processes performed by the subtracting section 41a, the decoding section 58, the non-touch operation information storage section 61, and the calibration section 62. Further, the following descriptions deal with an example where orthogonal sequences or M sequences are used as code sequences for parallel driving.

Concretely, assume that code sequences (a component is 1 or –1) for parallel driving the first drive line through the Mth drive line are as follows:

$$d_1 = (d_{11}, d_{12}, \ldots, d_{1N})$$

$$d_2 = (d_{21}, d_{22}, \ldots, d_{2N})$$

$$\vdots$$

-continued $$\vdots$$

$$d_M = (d_{M1}, d_{M2}, \ldots, d_{MN})$$

Hereinafter, the code sequences are assumed as orthogonal sequences or M sequences each having a code length N (=2^n–1), having been shifted. Such sequences have a nature of establishing the following formula:

$$d_i \cdot d_j = \sum_{k=1}^{N} d_{ik} \times d_{jk} = N \times \delta_{ij}$$

where if $d_1$ to $d_M$ is an orthogonal sequence, $\delta_{ij}=1$ if i=j, 0 if i≠j, if $d_1$ to $d_M$ is an M sequence, $\delta_{ij}=1$ if i=j, –1/N if i≠j.

Difference output sequences "$S_{j,P}$ (j=1, ..., [L/2], P=1,2) (L indicates the number of sense lines 33, [n]=an integer part of n)" of sense lines 33, which difference output sequences correspond to the aforementioned sequences, are defined as follows:

$S_{j,1}$: An output sequence for $d_1$ through $d_M$ when the switches SW select the lower terminals.

$S_{j,2}$: An output sequence for $d_1$ through $d_M$ when the switches SW select the upper terminals.

Further, a distribution of differences "$(\partial sC)_{kj,P}$ (k=1, ..., M; j=1, ..., [L/2]; P=1, 2)" of capacitance values in a direction in which each of the drive lines 35 extends (in a direction in which the sense lines 33 are arranged) is defined as follows:

$$(\partial sC)_{kj,1} = C_{k,2j} - C_{k,2j-1}$$

$$(\partial sC)_{kj,2} = C_{k,2j+1} - C_{k,2j}$$

In this case, a difference output of capacitances in the direction in which each of the drive lines 35 extends obtained by parallel driving is as follows:

$$S_{j,p} = (s_{j1,p}, s_{j2,p}, \ldots, s_{jN,p})$$

$$= \left( \sum_{k=1}^{M} (\partial_s C)_{kj,p} \times d_{k1}, \sum_{k=1}^{N} (\partial_s C)_{kj,p} \times d_{k2}, \ldots, \sum_{k=1}^{N} (\partial_s C)_{kj,p} \times d_{kN} \right) \times$$

$$(V_{drive} / C_{INT})$$

$$= \left( \sum_{k=1}^{M} (\partial_s C)_{kj,p} \times (d_{k1}, d_{k2}, \ldots, d_{kN}) \right) \times (V_{drive} / C_{INT})$$

$$= \sum_{k=1}^{M} (\partial_s C)_{kj,p} \times d_k) \times (V_{drive} / C_{INT})$$

The decoding section 58 decodes the difference values of the capacitances which differences value are found by the subtracting section 41a (i.e., the distribution of differences between the capacitance values in the direction in which each of the drive lines 35 extends). Specifically, the decoding section 58 finds inner products of (i) the code sequences for parallel driving the drive lines 35 and (ii) the difference output sequences of sense lines 33, which difference output sequences correspond to the aforementioned sequences. Therefore, an inner product value decoded by the decoding section 58 is expressed as follows:

$$d_i \cdot s_{j,P} = d_i \sum_{k=1}^{N} ((\partial_s C)_{kj,P} \times d_k) \times (V_{drive}/C_{INT})$$

$$= \sum_{k=1}^{N} ((\partial_s C)_{kj,P} \times d_i \cdot d_k) \times (V_{drive}/C_{INT})$$

$$= \sum_{k=1}^{N} ((\partial_s C)_{kj,P} \times N \times \delta_{ik}) \times (V_{drive}/C_{INT})$$

where $$d_i \cdot d_j = \sum_{k=1}^{N} d_{ik} \times d_{jk} = N \times \delta_{ij},$$

and if $d_1$ to $d_M$ is an orthogonal sequence, $\delta_{ij}=1$ if i=j, 0 if i≉j if $d_1$ to $d_M$ is an M sequence, $\delta_{ij}=1$ if i=j, $-1/N$ if i≉j.

Thus, the decoding section 58 finds, as a main component of the decoded inner product value $d_i \cdot s_{j,P}$, an N-folded distribution of differences $(\partial_s C)_{kj,P}$ between the capacitance values in the direction in which each of the drive lines 35 extends. Accordingly, by regarding an estimate value of the distribution of differences $(\partial_s C)_{ij,P}$ between the capacitance values in the direction in which each of the drive lines extends as the inner product value $d_i \cdot s_{j,P}$, it is possible to read signal strengths of the capacitance values which signal strengths have been multiplied by N (i.e., multiplied by a code length).

Meanwhile, as described above, by defining the difference output sequences $S_{j,P}$ (P=1, 2) of the sense lines 33, a common mode noise superimposed in common on sense lines 33 adjacent to each other is canceled. This makes it possible to read a difference capacitance with a high SNR.

As described above, according to the touch panel system 1j, the touch panel 3c is parallel driven, and the decoding section 58 decodes the values of the differences between the capacitances which values are found by the subtracting section 41a. Consequently, signals of the capacitances are multiplied by a code length (i.e., multiplied by N). Therefore, signal strengths of the capacitances are increased, regardless of the number of drive lines 35. Further, provided that necessary signal strengths are merely equal to those of the conventional driving method shown in FIG. 9, it is possible to reduce a driving period for the drive lines 35 to one-Nth of that of the driving method shown in FIG. 9. Namely, it is possible to reduce the number of times that the drive lines 35 should be driven. This makes it possible to reduce electric power consumption of the touch panel system 1j.

Preferably, the touch panel system 1j is configured such that the calibration section 62 subtracts (i) differences between respective pairs of the sense lines 33 adjacent to each other (=a distribution of difference values in the entire touch panel) which differences are found when no touch operation is performed from (ii) differences between the respective pairs of the sense lines 33 adjacent to each other (i.e., a distribution of difference values in the entire touch panel 3c) which differences are found when a touch operation is performed. Namely, it is preferable that (i) such the difference signal operation is performed before and after a touch operation and (ii) subtraction is performed between difference value signals obtained before and after the touch operation. For example, the non-touch operation information storage section 61 stores an estimated value of a distribution of differences $(\partial_s C)_{kj,P}$ found in an initial state where no touch operation is performed (when no touch operation is performed). Then, the calibration section 62 subtracts (i) the estimated value of the distribution of the differences $(\partial_s C)_{kj,P}$ found when no touch operation is performed, which estimated value is stored in the non-touch operation information storage section 61, from (ii) an estimated value of a distribution of differences $(\partial_s C)_{kj}$ found when a touch operation is performed. Thus, the calibration section 62 subtracts (i) the distribution of the differences between capacitances found when no touch operation is performed which distribution is stored in the non-touch operation information storage section from (ii) the distribution of differences between the capacitances found when a touch operation is performed (i.e., the difference value signal found when a touch operation is performed–the difference value signal found when no touch operation is performed). This makes it possible to cancel an offset inherent in the touch panel 3c.

Thus, the touch panel system 1j is free from a difference component resulting from a variation in capacitances which variation is inherent in the touch panel 3c. Consequently, only a difference component resulting from the touch operation is detected. In the case of the M sequence, an error component ($\delta_{ij}=-1/N$ if else i≉j) mixes therein, which does not occur in the case of the orthogonal sequence. However, this error component results only from the touch operation. Therefore, if N is increased (e.g., N=63 or 127), a degree of deterioration of SNR becomes smaller.

Embodiment 12

Figure 23:
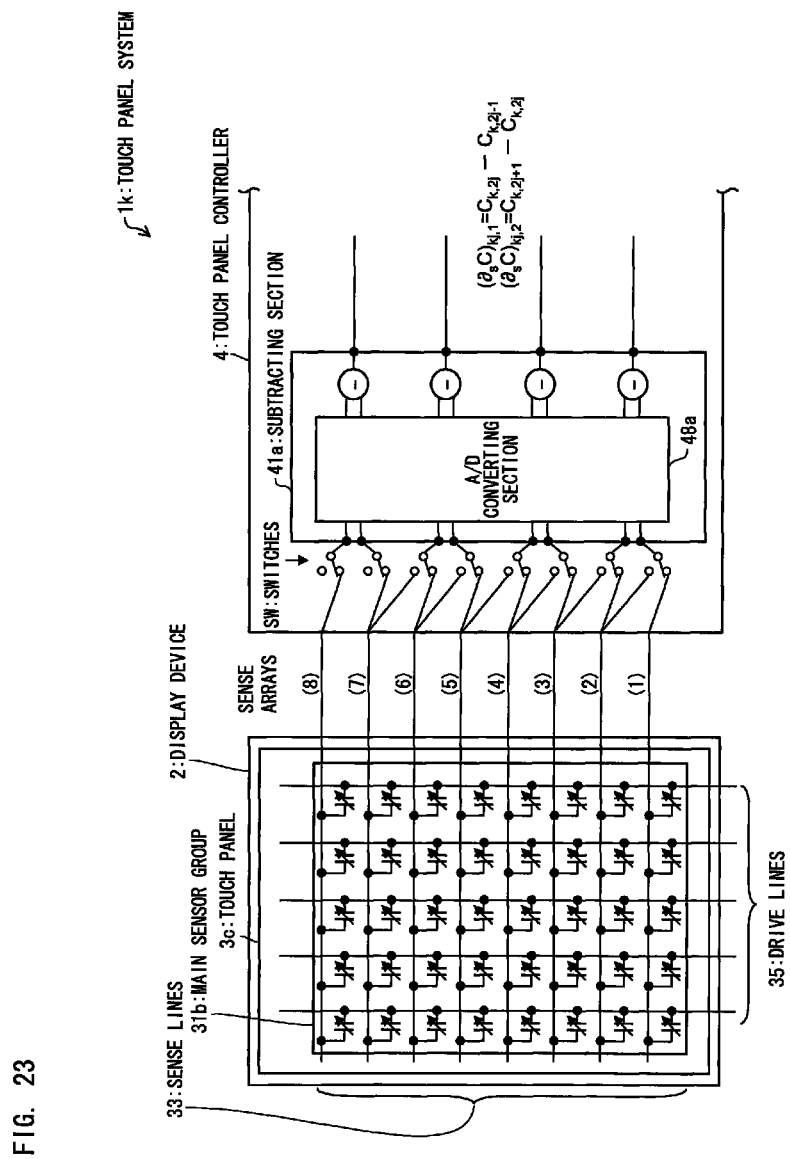
FIG. 23 is a view schematically illustrating a basic configuration of another touch panel system according to the present invention.

FIG. 23 is a view schematically illustrating a basic configuration of a touch panel system 1k of the present embodiment. The touch panel system 1k includes a subtracting section 41a having a different configuration.

Output signals supplied from sense lines 33 of a touch panel 3c are analog signals. Therefore, the subtracting section 41a includes an analog-to-digital converting section (third analog-to-digital converting section) 48a and a digital subtracter (not illustrated).

With this configuration, output signals (analog signals) supplied from the touch panel 3c are converted into digital signals by the analog-to-digital converting section 48a of the subtracting section 41a. The digital subtracter performs, by use of the digital signals thus converted, subtracting operations in the same manner as in the touch panel systems 1i and 1j shown in FIG. 20.

Thus, the touch panel system 1k can remove a noise by (i) converting, into digital signals, analog signals outputted by the touch panel 3c and thereafter (ii) performing subtracting operations.

Embodiment 13

Figure 24:
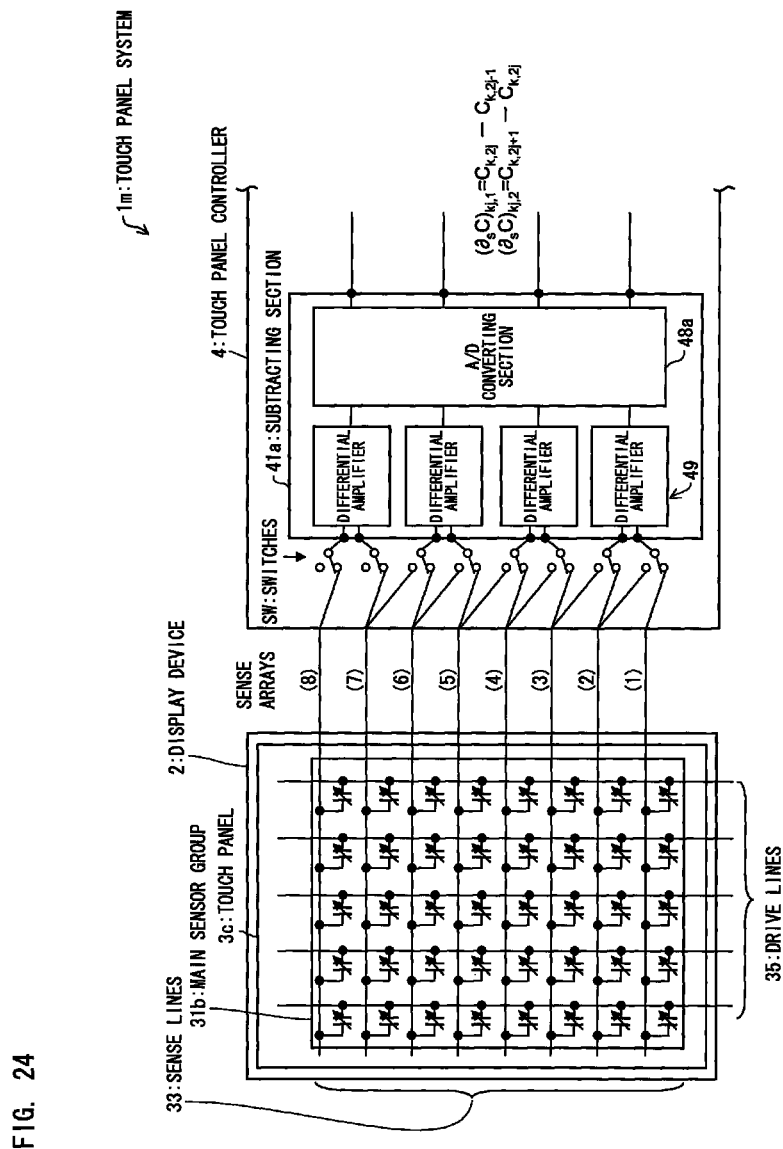
FIG. 24 is a view schematically illustrating a basic configuration of another touch panel system according to the present invention.

FIG. 24 is a view schematically illustrating a basic configuration of a touch panel system 1m of the present embodiment. The touch panel system 1m includes a subtracting section 41a having a different configuration.

Output signals supplied from sense lines 33 of a touch panel 3c are analog signals. Therefore, the subtracting section 41a includes a differential amplifier 49 and an analog-to-digital converting section 48a (fourth analog-to-digital converting section).

With this configuration, in the same manner as in the touch panel system 1*i* shown in FIG. 20, the differential amplifier 49 performs subtracting operations on output signals (analog signals) supplied from the touch panel 3*c*, without converting the analog signals into digital signals. The analog-to-digital converting section 48*a* converts, into a digital signal, an analog signal thus obtained by the subtracting operations.

Thus, the touch panel system 1*m* can remove a noise by (i) performing subtracting operations on analog signals outputted by the touch panel 3*c*, without converting the analog signals into digital signals, and thereafter (ii) converting the resulting signal into a digital signal.

Embodiment 14

Figure 25:
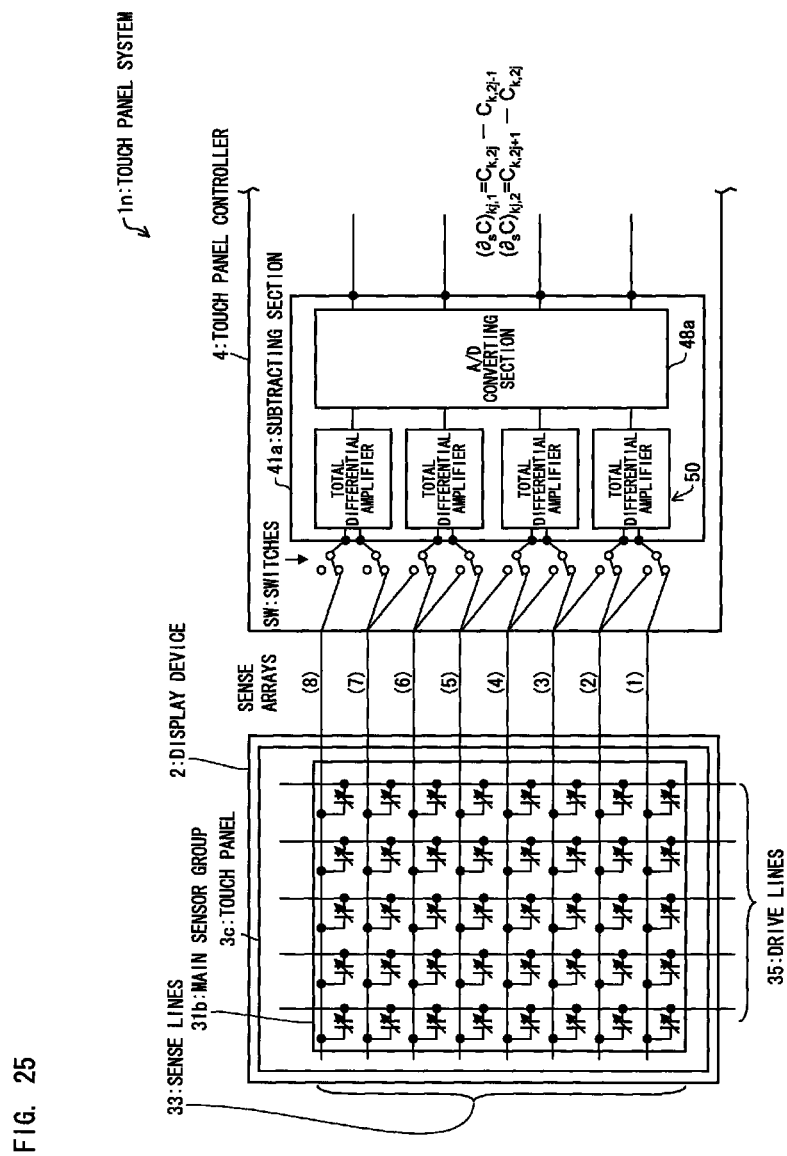
FIG. 25 is a view schematically illustrating a basic configuration of another touch panel system according to the present invention.

FIG. 25 is a view schematically illustrating a basic configuration of a touch panel system 1*n* of the present embodiment. The touch panel system 1*n* includes a subtracting section 41*a* having a different configuration. The touch panel system 1*n* includes a total differential amplifier 50 instead of the differential amplifier 49 in the touch panel system 1*m* shown in FIG. 24.

Output signals supplied from sense lines 33 of a touch panel 3*c* are analog signals. Therefore, the subtracting section 41*a* includes the total differential amplifier 50 and an analog-to-digital converting section 48*a*.

With this configuration, in the same manner as in the touch panel system 1*i* shown in FIG. 20, the total differential amplifier 50 performs subtracting operations on output signals (analog signals) from the touch panel 3*c*, without converting the analog signals into digital signals. The analog-to-digital converting section 48*a* converts, into a digital signal, an analog signal thus obtained by the subtracting operations.

Thus, the touch panel system 1*n* can remove a noise by (i) performing subtracting operations on analog signals outputted by the touch panel 3*c*, without converting the analog signals into digital signals, and thereafter (ii) converting the resulting signal into a digital signal.

Embodiment 15

Figure 26:
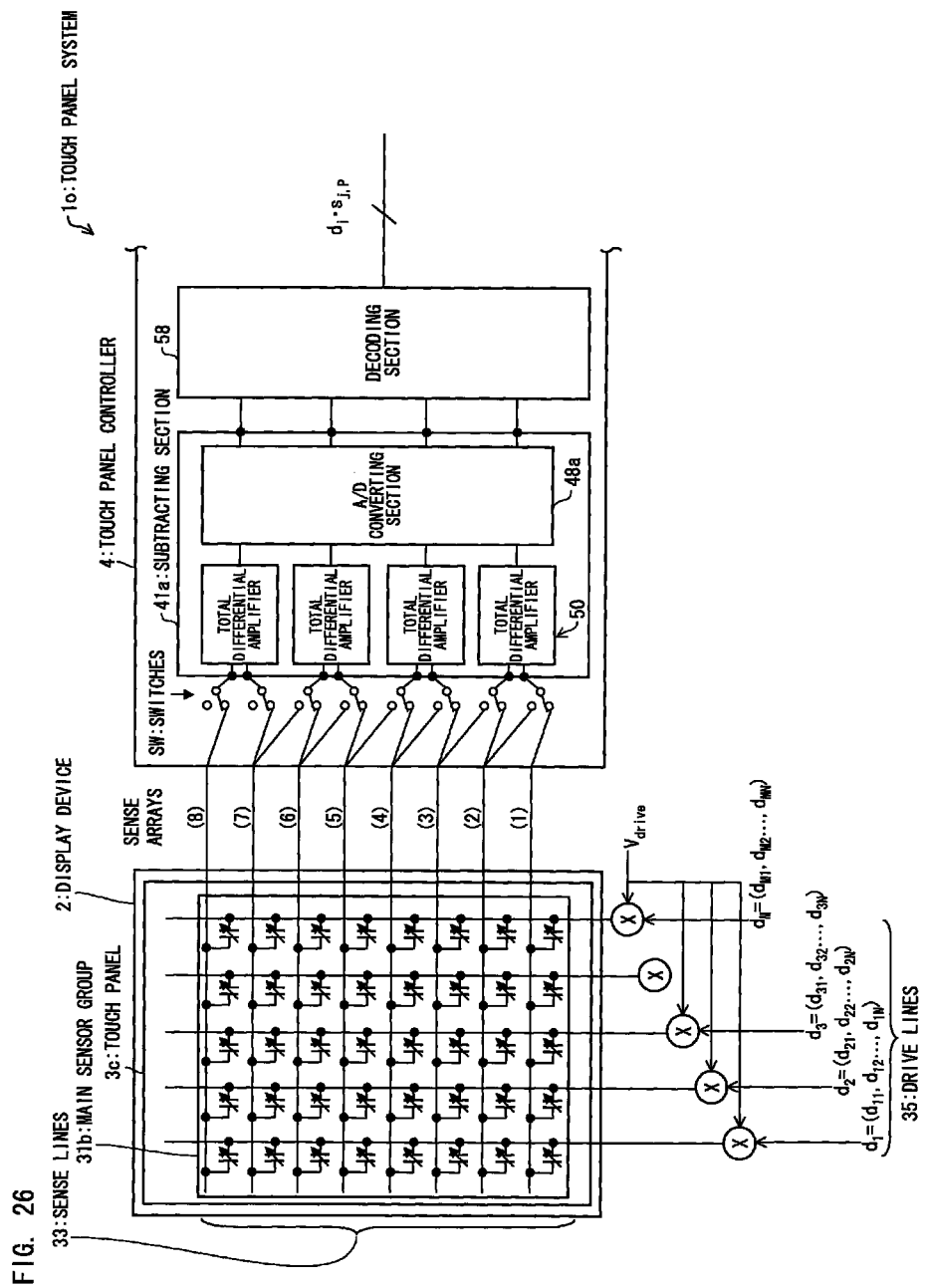
FIG. 26 is a view schematically illustrating a basic configuration of another touch panel system according to the present invention.

FIG. 26 is a view schematically illustrating a basic configuration of a touch panel system 1*o* of the present embodiment. The touch panel system 1*o* includes a subtracting section 41*a* having a different configuration. The touch panel system 1*o* includes a total differential amplifier 50 instead of the differential amplifier 49 in the touch panel system 1*m* shown in FIG. 26.

Output signals supplied from sense lines 33 of a touch panel 3*c* are analog signals. Therefore, the subtracting section 41*a* includes the total differential amplifier 50 and an analog-to-digital converting section 48*a*.

With this configuration, in the same manner as in the touch panel system 1*i* shown in FIG. 20, the total differential amplifier 50 performs subtracting operations on output signals (analog signals) from the touch panel 3*c*, without converting the analog signals into digital signals. The analog-to-digital converting section 48*a* converts, into a digital signal, an analog signal thus obtained by the subtracting operations.

Further, the touch panel system 1*o* employs, as a driving method for the touch panel 3*c*, the orthogonal sequence driving method shown in FIGS. 10, 12, and 22. According to this configuration, as shown in FIG. 10, a voltage for driving four drive lines is applied as follows: In the second driving through the fourth driving, +V is applied twice and −V is also applied twice, i.e., the number of times of application of +V is equal to that of −V. On the other hand, in the first driving, +V is applied four times. Accordingly, an output value of an output sequence Y1 of the first driving is greater than that of each of output sequences Y2 through Y4 of the second driving through the fourth driving. Therefore, adding a dynamic range to the output values of the output sequences Y2 through Y4 of the second driving through the fourth driving causes saturation of the output sequence Y1 of the first driving.

In order to address this, the subtracting section 41*a* of the touch panel system to includes the total differential amplifier 50.

Further, employed as the total differential amplifier 50 is the one whose input common-mode voltage range is rail to rail. Namely, the total differential amplifier 50 has a wide common-mode input range. Consequently, the total differential amplifier 50 can operate in a voltage range from a power source voltage (Vdd) to GND. Furthermore, a difference between input signals supplied to the total differential amplifier 50 is amplified. Therefore, regardless of the type of the orthogonal sequence driving method employed in the touch panel 3*c* which is combined with the touch panel system 1*o*, an output signal from the total differential amplifier 50 is free from the problem of output saturation. Note that one example of the total differential amplifier 50 is as previously described with reference to FIG. 17.

Thus, the touch panel system 1*o* can remove a noise by (i) performing subtracting operations on analog signals outputted by the touch panel 3*c*, without converting the analog signals into digital signals, and thereafter (ii) converting the resulting signal into a digital signal. Furthermore, since the touch panel system 1*o* includes the total differential amplifier 50 capable of rail-to-rail operation, an output signal from the total differential amplifier 50 is free from the problem of output saturation.

Embodiment 16

Next, the following will describe a method for detecting a touch operation, which method is employed in the touch panel systems of the above-described embodiments. The following descriptions deal with, as an example, the touch panel system 1*j* of FIG. 22. However, the touch panel systems of other embodiments perform the same operation. The touch panel system 1*j* includes a judging section 59 for determining the presence or absence of a touch operation based on a comparison of (i) a difference between signals of sense lines 33 adjacent to each other which difference is found by the subtracting section 41*a* and the decoding section 58, and (ii) positive and negative threshold values. Note that the judging section 59 is supplied with (i) a signal (a distribution of differences between capacitances) having been subjected to a calibration process by the calibration section 62 or (ii) a signal (a distribution of differences between capacitances) having not been subjected to a calibration process by the calibration section 62. In the case where the signal having not been subjected to the calibration process by the calibration section 62 is inputted to the judging section 59, a distribution of differences between the capacitances which distribution has been decoded by the decoding section 58 is directly inputted to the judging section 59. The following will describe the case where the signal having not been subjected to the calibration process by the calibration section 62 is inputted to the judging section 59. However, the same operation is performed also in the case where the signal having been subjected to the calibration process is inputted to the judging section 59.

Figure 27:
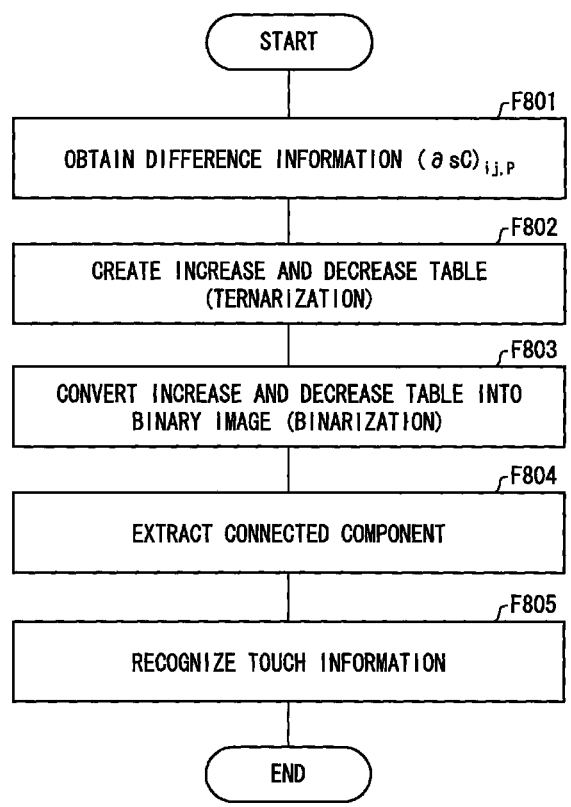
FIG. 27 is a flow chart illustrating a basic process of a judging section in the touch panel system shown in FIG. 22.

FIG. 27 is a flow chart illustrating a basic process of the judging section 59 in the touch panel system 1*j* shown in FIG. 22. FIG. 28 is a view schematically illustrating a method of recognizing touch information in the flow chart shown in FIG. 27.

As shown in FIG. 27, the judging section 59 first obtains values of differences in signal between respective pairs of sense lines adjacent to each other (difference information) "$(\partial sC)_{ij,P}$" which values are found by the subtracting section 41*a* and the decoding section 59 (F801). Next, the judging section 59 compares the values of the differences with a positive threshold value THp and a negative threshold value THm, each of which is stored in the judging section 59, so as to create an increase and decrease table (F802). This increase and decrease table is, for example, a ternary increase and decrease table as shown in (a) of FIG. 28.

Next, the ternary increase and decrease table is converted into a binary image (i.e., binarized) (F803). For example, in a case where the increase and decrease table shown in (a) of FIG. 28 is scanned in the order from a sense line S1 to a sense line S7 (in a direction toward the right in FIG. 28), the following operation is carried out: In the increase and decrease table, if the value "+" is scanned, the value therein and subsequent value(s) are all converted into "1" until the value "−" is scanned next. Meanwhile, if the value "−" is scanned, the scanning is performed in a direction opposite to the scanning direction (in a direction toward the left in FIG. 28) and the value therein is surely converted into "1". In this manner, binarized data as shown in (b) of FIG. 28 is obtained.

Next, in order to extract touch information from the binarized data, a connected component is extracted (F804). For example, in (b) of FIG. 28, if the values "1" are arranged side by side on drive lines adjacent to each other and on a single sense line, (i) a connected component including one of such the values "1" and (ii) a connected component including the other one of such the values "1" are regarded as a single connected component, which is set as a candidate of a touched position. Namely, each of the boxed parts including the values "1" in (c) of FIG. 28 is regarded as a single connected component, and is extracted as a candidate of a touched position.

Lastly, based on the extracted candidates of the touched position, touch information (the size, position, etc. of the touch) is recognized (F805).

Thus, based on a difference between signals of sense lines 33 adjacent to each other from which difference a noise signal has been removed, the judging section 59 determines the presence or absence of a touch operation. This makes it possible to accurately determine the presence or absence of the touch operation.

Furthermore, in the above-described example, based on a comparison of (i) the differences in signals between the respective pairs of sense lines 33 adjacent to each other which differences are found by the subtracting section 41*a* and (ii) the positive and negative threshold values (THp, THm), the judging section 59 creates the increase and decrease table indicating, in ternary, the distribution of the differences in signal between the sense lines 33, and converts the increase and decrease table into the binary image. Namely, the differences in signals between the respective pairs of sense lines 33 adjacent to each other from which differences the noise signal has been removed are inputted to the judging section 59. The judging section 59 compares (i) the differences in signals between the respective pairs of sense lines 33 adjacent to each other and (ii) the positive and negative threshold values (THp, THm) stored in the judging section 59, so as to create the increase and decrease table indicating, in ternary, the distribution of the differences in signal between the sense lines 33. Further, the judging section 59 binarizes the increase and decrease table, so that the increase and decrease table is converted into the binary image. Consequently, from the binary image thus converted, the candidates of the touched position are extracted. Thus, by recognizing the touch information (the size, position, etc. of the touch) based on the binary image, it is possible not only to determine the presence or absence of the touch operation but also to recognize the touch information more accurately.

Embodiment 17

Figure 29:
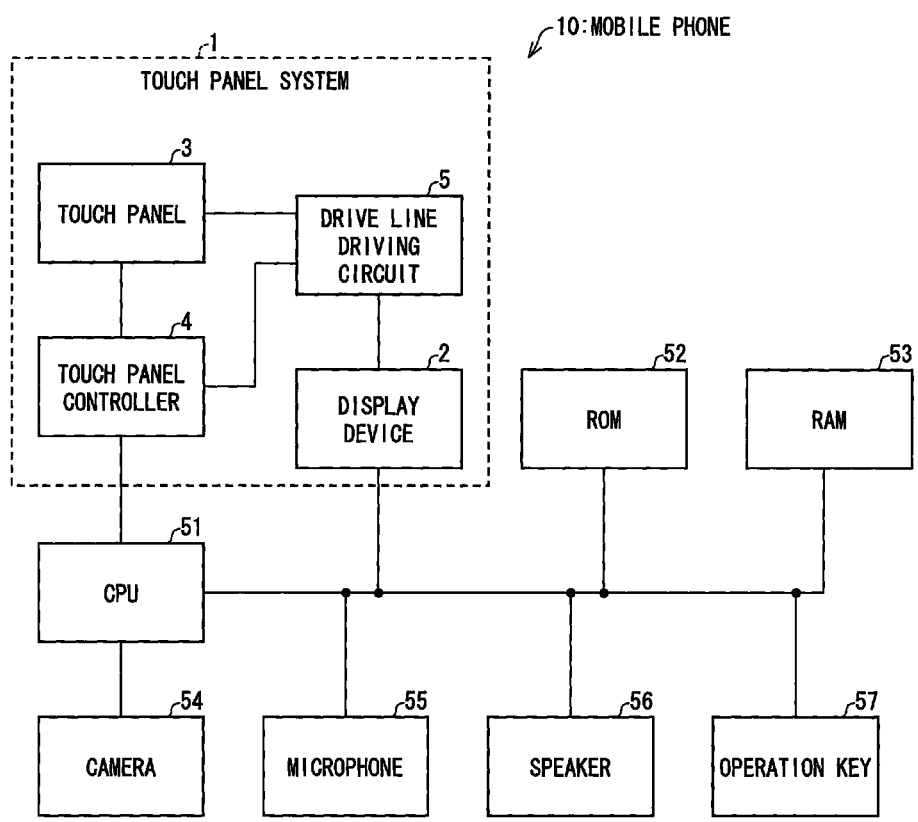
FIG. 29 is a functional block diagram illustrating a configuration of a mobile phone including the touch panel system.

FIG. 29 is a functional block diagram illustrating a configuration of a mobile phone 10 including a touch panel system 1. The mobile phone (electronic device) 10 includes a CPU 51, a RAM 53, a ROM 52, a camera 54, a microphone 55, a speaker 56, an operation key 57, and the touch panel system 1. These elements are connected with each other via data bus. The CPU 51 controls operation of the mobile phone 10.

The CPU 51 executes, for example, a program stored in the ROM 52. The operation key 57 receives an instruction entered by a user of the mobile phone 10. The RAM 53 stores, in a volatile manner, data generated as a result of the CPU 51's executing the program or data inputted via the operation key 57. The ROM 52 stores data in an involatile manner.

Further, the ROM 52 is a ROM into which data can be written and from which data can be deleted, for example, an EPROM (Erasable Programmable Read-Only Memory) or a flash memory. The mobile phone 10 may be configured to include an interface (IF) (not illustrated in FIG. 29) which allows the mobile phone 10 to be connected with another electronic device via a wire.

The camera 54 takes an image of a subject in response to the user's operation on the operation key 57. The obtained image data of the subject is stored in the RAM 53 or an external memory (e.g., a memory card). The microphone accepts an inputted voice of the user. The mobile phone 10 binarizes the inputted voice (analog data). Then, the mobile phone 10 transmits the binarized voice to a receiver (e.g., to another mobile phone). The speaker 56 outputs, for example, sounds based on music data stored in the RAM 53.

The touch panel system 1 includes a touch panel 3, a touch panel controller 4, a drive line driving circuit 5, and a display device 2. The CPU 51 controls operation of the touch panel system 1. The CPU 51 executes, for example, a program stored in the ROM 52. The RAM 53 stores, in a volatile manner, data generated as a result of the CPU 51's executing the program. The ROM 52 stores data in an involatile manner.

The display device 2 displays an image stored in the ROM 52 or the RAM 53. The display device 2 is stacked on the touch panel 3 or includes the touch panel 3.

Embodiment 18

The touch panel system in each of the above embodiments can further include the following configuration.

[Configuration of Touch Panel System 1*p*]

Figure 31:
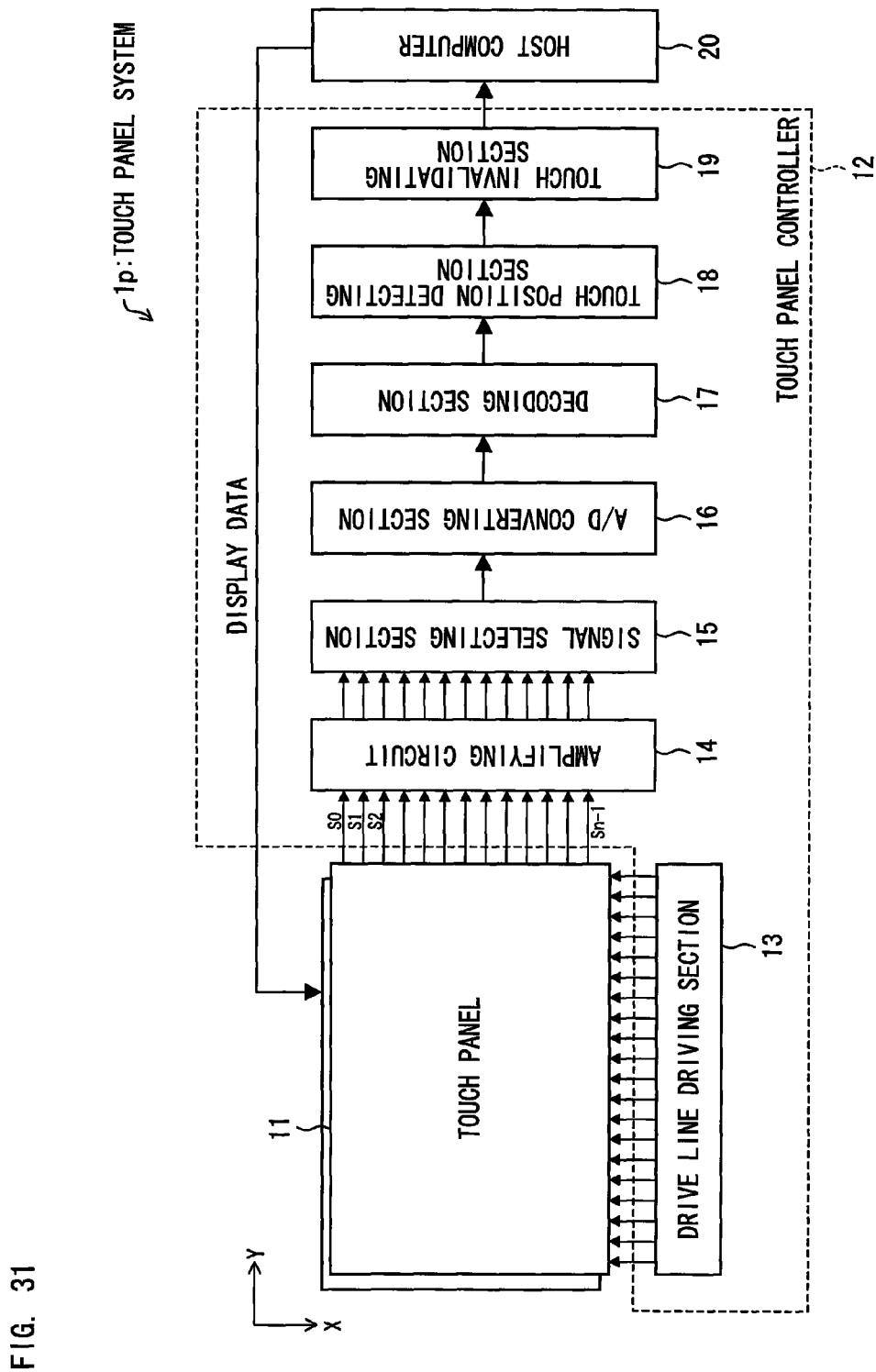
FIG. 31 is a block diagram illustrating an outline configuration of a touch panel system of the embodiment of the present invention.

FIG. 31 is a block diagram illustrating an outline configuration of a touch panel system of the present embodiment provided in an electronic device.

A touch panel system 1*p* includes a touch panel 11 and a touch panel controller 12. The touch panel 11 and the touch panel controller 12 are configured to be capable of detecting simultaneous touches on a plurality of points of the touch panel 11. One example of the configuration is a so-called capacitance type touch panel.

The touch panel 11 is disposed so as to overlap a display screen (not illustrated) of a display device. Examples of the display device encompass liquid crystal display devices, plasma display devices, organic EL display devices, and field emission display devices. Specific examples of the touch panel 11 encompass touch panels provided in portable electronic devices (mobile electronic devices) such as smartphones, tablet-type terminals, notebook computers, and the like.

The touch panel 11 includes a plurality of drive lines that extend in a vertical direction (the X direction in FIG. 31) and that are parallel to each other. Further, the touch panel 11 includes a plurality of sense lines (S0, S1, S2, . . . Sn−1) that extend in a horizontal direction (the Y direction in FIG. 31) and that are parallel to each other. Further, the touch panel 11 includes a plurality of electrostatic capacitors (not illustrated) formed at respective intersections of the plurality of drive lines and the plurality of sense lines.

The touch panel controller 12 is a system which is configured to allow for a touch operation using the touch panel 11 (an instruction given to the electronic device in accordance with a touch on the touch panel 11). In this specification, the touch panel controller 12 means constituents elements, except for the touch panel 11, for accomplishing the touch operation.

The touch panel controller 12 includes a drive line driving section 13, an amplifying circuit 14, a signal selecting section 15, an A/D (analog/digital) converting section 16, a decoding section 17, a touch position detecting section 18, and a touch invalidating section 19. The touch panel system 1$p$ includes a host computer 20.

The drive line driving section 13 drives the plurality of drive lines by applying a voltage to the plurality of drive lines. Thus, an electric charge is supplied to the plurality of electrostatic capacitors.

The amplifying circuit 14 reads out, for each of the sense lines, linear sum signals of electric charges accumulated in the plurality of electrostatic capacitors, and then supplies the linear sum signals to the signal selecting section 15.

The signal selecting section 15 selects one of the plurality of linear sum signals thus read out for each of the sense lines, and then supplies the linear sum signal thus selected to the A/D converting section 16.

The A/D converting section 16 converts the linear sum signal selected by the signal selecting section 15 from an analog signal to a digital signal, and then supplies the linear sum signal thus converted to the decoding section 17.

The decoding section 17 decodes the linear sum signal thus supplied from the A/D converting section 16 so as to obtain an electrostatic capacitance distribution, and then supplies the electrostatic capacitance distribution to the touch position detecting section 18.

The touch position detecting section 18 detects a touched point of the touch panel 11 on the basis of a distribution of X-coordinates and Y-coordinates on the electrostatic capacitance distribution, and then supplies the result of the detection to the touch invalidating section 19.

The touch invalidating section 19 judges whether or not the touched point of the touch panel 11 has been continuously touched for a predetermined period of time. The predetermined period of time is approximately 1 to several seconds. For example, the predetermined period of time is 2 seconds. In a case where the touched point of the touch panel 11 has been continuously touched for the predetermined period of time, the touch invalidating section 19 invalidates a touch operation corresponding to the touch.

The touch invalidating section 19 supplies information indicative of the touched point of the touch panel 11 to the host computer 20 in a case where the touch invalidating section 19 validates the touch operation. Meanwhile, in a case where the touch invalidating section 19 invalidates the touch operation, the touch invalidating section 19 awaits without supplying such information to the host computer 20.

That is, the touch invalidating section 19 has a function of invalidating, in a case where a specific point of the touch panel 11 is continuously touched for a predetermined period of time, an instruction that is given to an electronic device including the touch panel 11 in accordance with the touch.

The host computer 20 is, for example, constituted by a CPU (Central Processing Unit). The host computer 20 controls the electronic device in accordance with the information supplied from the touch invalidating section 19. For example, the host computer 20 causes display data corresponding to information supplied from the touch invalidating section 19 to be supplied to a display device provided in the electronic device so that an image is displayed on a display screen of the display device.

[Example 1 of Touch Invalidating Section]

Figure 30:
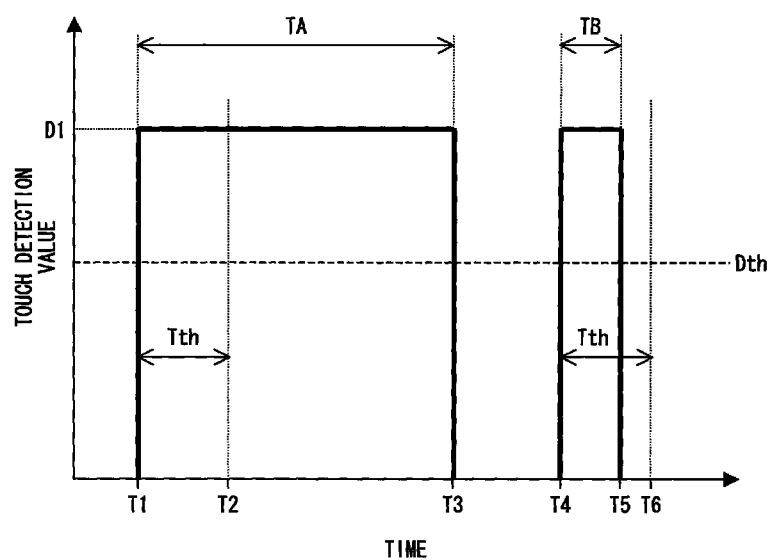
FIG. 30 is a graph illustrating an example in which a touch operation is invalidated by a touch invalidating section of an embodiment of the present invention.

FIG. 30 is a graph illustrating an example in which a touch operation is invalidated by the touch invalidating section 19 of the present embodiment.

In the graph of FIG. 30, the vertical axis represents a touch detection value and the horizontal axis represents an elapsed time.

The present example discusses an example in which an object makes contact with a single specific point of the touch panel 11.

In a case where an object makes contact with the touch panel 11, a touch detection value corresponding to an electrostatic capacitance at a contact point increases in accordance with the degree of this touch (pressure on the touch panel 11, range of the contact, etc.). The touch position detecting section 18 of the touch panel controller 12 judges that the contact point is being touched, in a case where the touch detection value is not less than a touch threshold value Dth or in a case where the touch detection value is above the touch threshold value Dth. The touch position detecting section 18 judges that the touch is continuing, until the touch detection value goes below the touch threshold value Dth or in a case where the touch detection value becomes not more than the touch threshold value Dth.

Generally, in a case where a human finger makes contact with the touch panel 11, the touch detection value is increased by this contact so as to exceed the touch threshold value Dth. Accordingly, in the present embodiment, it is assumed that (i) the touch position detecting section 18 judges that a touch is being made, in a case where the touch detection value is above the touch threshold value Dth, whereas (ii) the touch position detecting section 18 judges that no touch is being made, in a case where the touch detection value is not more than the touch threshold value Dth.

In the graph of FIG. 30, a time T1 at which the touch detection value becomes a value D1 which exceeds the touch threshold value Dth corresponds to a time at which the touch position detecting section 18 first judges that a touch is being made (a time at which the touch starts). This instant is set as a touch start time T1.

The touch invalidating section 19 judges whether or not the touch continues for a predetermined period of time. In other words, the touch invalidating section 19 judges whether or not a period of time for which the touch detection value is above the touch threshold value Dth continues for the predetermined period of time.

The touch invalidating section 19 makes this judgment with reference to a touch time threshold value Tth which is a period of time corresponding to the predetermined period of time. A time set as the touch time threshold value Tth is a specific period of time which lasts for this time (spans this time). In the graph of FIG. 30, a period of time from the touch start time T1 to a time T2 corresponds to the touch time threshold value Tth. The time T2 is a time at which the touch time threshold value Tth (the predetermined period of time) has elapsed from the touch start time T1. Accordingly, the touch time threshold value Tth is expressed by (time T2−time T1).

It is preferable that the touch invalidating section 19 thus judge whether or not the touch continues for the touch time threshold value Tth which corresponds to the predetermined period of time.

This makes it possible to judge, with a simple configuration, whether or not the contact point is continuously touched for the predetermined period of time.

That is, the touch invalidating section 19 judges whether or not continuous touch periods TA and TB (periods in which the touch detection value is being above the touch threshold value Dth) are not less than the period of time represented by the touch time threshold value Tth.

In a case where the continuous touch period TA which starts at the time T1 and ends at a time T3 is not less than the period of time represented by the touch time threshold value Tth, the touch invalidating section 19 judges that the touch continued for the predetermined period of time. Based on this judgment, the touch invalidating section 19 invalidates a touch operation corresponding to the touch (see the continuous period TA in FIG. 30).

Meanwhile, in a case where the continuous touch period TB which starts at a time T4 and ends at a time T5 is less than the period of time represented by the touch time threshold value Tth which starts at the time T4 and ends at a time T6, the touch invalidating section 19 judges that the touch did not continue for the predetermined period of time. Based on this judgment, the touch invalidating section 19 validates the touch operation corresponding to the touch (see the continuous period TB in FIG. 30).

In a case where a specific point of the touch panel 11 is continuously touched for a predetermined period of time, the touch invalidating section 19 invalidates an instruction that is given in accordance with the touch to the electronic device. Accordingly, in a case where an unintended contact of an object with the touch panel 11 continues, such as a case where a hand holding the electronic device is in contact with the touch panel 11, an instruction corresponding to the contact is not executed. This makes it possible to prevent an incorrect operation caused by such an unintended contact of an object with the touch panel 11.

Moreover, there is no need to change a standard by which presence or absence of a touch is judged for the purpose of preventing such an incorrect operation, unlike the above-mentioned conventional art. It is therefore possible to suppress a decline in sensitivity of detection of presence or absence of a touch.

Figure 32:
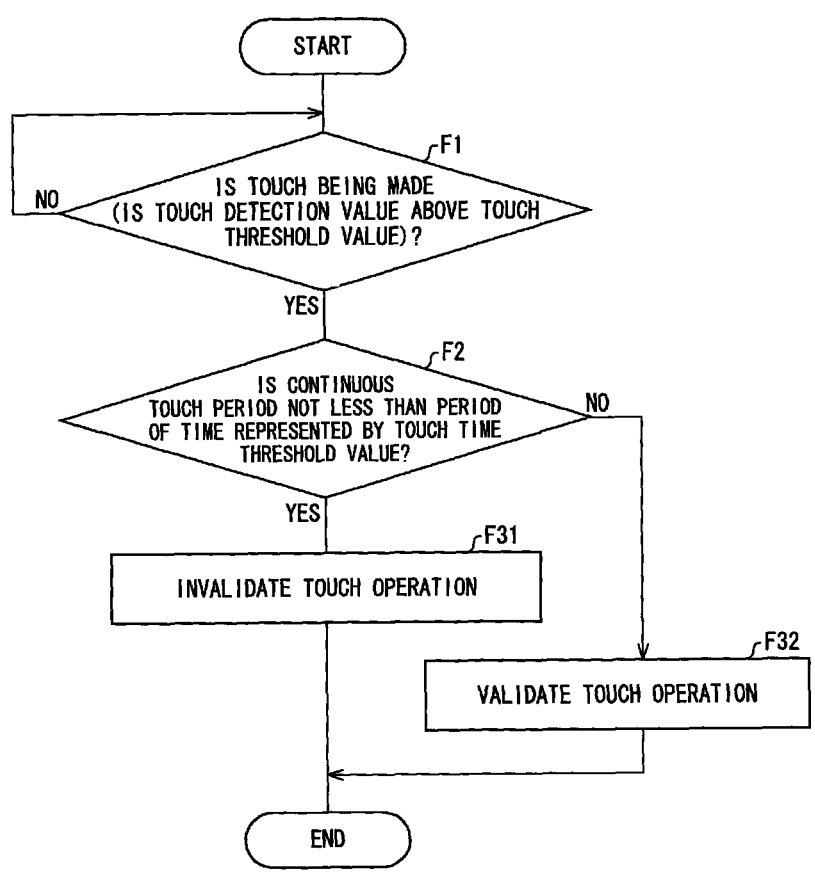
FIG. 32 is a flow chart showing an example of how a touch operation is invalidated by the touch invalidating section of the embodiment of the present invention.

FIG. 32 is a flow chart showing an example of how a touch operation is invalidated by the touch invalidating section 19 of the present embodiment.

First, the touch position detecting section 18 judges whether or not a contact point is being touched, by judging whether or not a touch detection value corresponding to the contact point is above the touch threshold value Dth (Step F1). In a case where the touch detection value is not above the touch threshold value Dth (NO in Step F1), the judgment is made again.

In a case where the touch detection value is above the touch threshold value Dth (YES in Step F1), the touch invalidating section 19 detects whether or not a continuous touch period of the touch is not less than a period of time represented by the touch time threshold value Tth (Step F2).

In a case where the continuous touch period is not less than the period of time represented by the touch time threshold value Tth (YES in Step F2), the touch invalidating section 19 judges that the touch continued for the predetermined period of time, and invalidates a touch operation corresponding to the touch (Step F31).

Meanwhile, in a case where the continuous touch period is less than the period of time represented by the touch time threshold value Tth (NO in Step F2), the touch invalidating section 19 judges that the touch did not continue for the predetermined period of time, and validates the touch operation corresponding to the touch (Step F32).

[Example 2 of Touch Invalidating Section]

Figure 33:
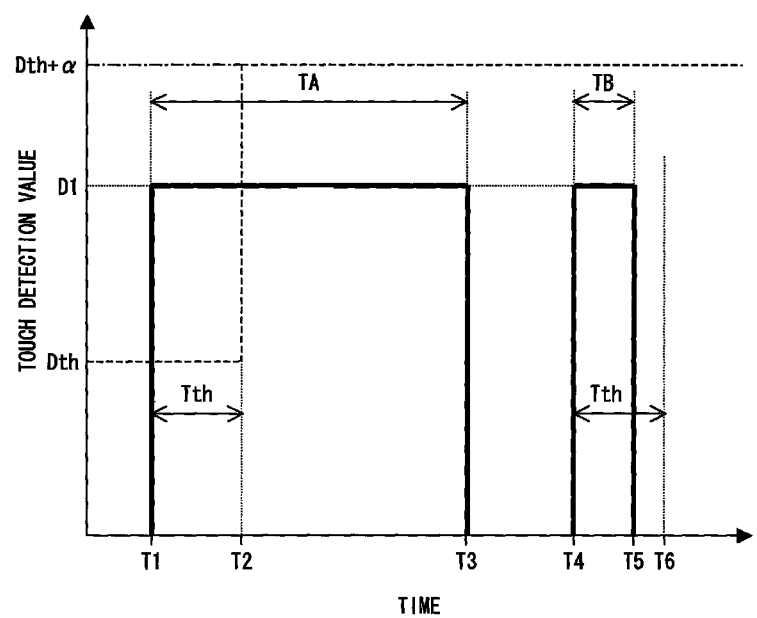
FIG. 33 is a graph illustrating another example in which a touch operation is invalidated by the touch invalidating section of the embodiment of the present invention.

FIG. 33 is a graph illustrating another example in which a touch operation is invalidated by the touch invalidating section 19 of the present embodiment.

The graph of FIG. 33 is based on the graph of FIG. 30. The following description, which is given with reference to the graph of FIG. 33, deals with only matters different from the description given with reference to the graph of FIG. 30, and the other matters are omitted for convenience of description.

In the example shown by the graph of FIG. 30, the touch threshold value Dth, which is a threshold value for judging based on a touch detection value whether a touch is being made, does not change over time.

Meanwhile, in the example shown by the graph of FIG. 33, the touch invalidating section 19 changes a touch threshold value in accordance with passage of time.

In the example shown by the graph of FIG. 33, since a touch detection value is being a value D1 which exceeds the touch threshold value Dth, over a touch time threshold value Tth corresponding to a period of time from the touch start time T1 to the time T2, the touch invalidating section 19 makes the touch threshold value higher by a than Dth. That is, in a case where the touch continues for the touch time threshold value Tth (the predetermined period of time), the touch invalidating section 19 makes the touch threshold value higher by a than Dth for a certain period of time. The certain period of time is, for example, a period of time until a display device or an electronic device is turned off or a period of time shorter than this period of time. It is preferable that the touch threshold value (Dth+α) thus increased is a value that is sufficiently larger than a touch detection value obtained by contact of a human finger with the touch panel 11. That is, it is preferable that the touch threshold value (Dth+α) thus increased is a value that does not allow a contact with the touch panel 11 to be judged as a touch.

This allows the touch invalidating section 19 to invalidate a touch operation regardless of a continuous touch period after the touch threshold value is made higher by a than Dth, i.e., after the time T2 of FIG. 33. In this case, even in a case where a continuous touch period TB which starts at a time T4 and ends at a time T5 is less than the period of time represented by the touch time threshold value Tth which starts at the time T4 and ends at a time T6, the touch invalidating section 19 can invalidates a touch operation corresponding to the touch.

In a case where a continuous touch period is not less than the period of time represented by the touch time threshold value Tth, the touch invalidating section 19 judges that the touch continued for the predetermined period of time, and the touch invalidating section 19 invalidates a touch operation corresponding to the touch and makes the touch threshold value higher by a than Dth (see the period TA in FIG. 33).

After the touch threshold value is made higher by a than Dth, even a continuous touch period TB corresponding to a next touch is less than the period of time represented by the touch time threshold value Tth, a touch detection value D1 is not more than the touch threshold value (Dth+α). Accordingly, the touch invalidating section 19 invalidates a touch operation corresponding to the touch (see the period TB in FIG. 33).

As described above, the touch invalidating section 19 can be configured to increase a touch threshold value in a case where a touch continues for a predetermined period of time, so as to invalidate a touch operation corresponding to the touch for a certain period of time.

Consequently, even in a case where an unintended contact of an object with the touch panel 11 frequently occurs in a short time, it is possible to prevent an incorrect operation, which can occur every time the contact is made, by causing the touch invalidating section 19 to function just once.

Moreover, it is possible to achieve, with a simple configuration, an arrangement in which in a case where a specific point is continuously touched for a predetermined period of time, the touch invalidating section 19 increases a touch threshold value so that an instruction corresponding to a touch on this point is invalidated for a certain period of time.

[Configuration of Electronic Device]

Figure 34:
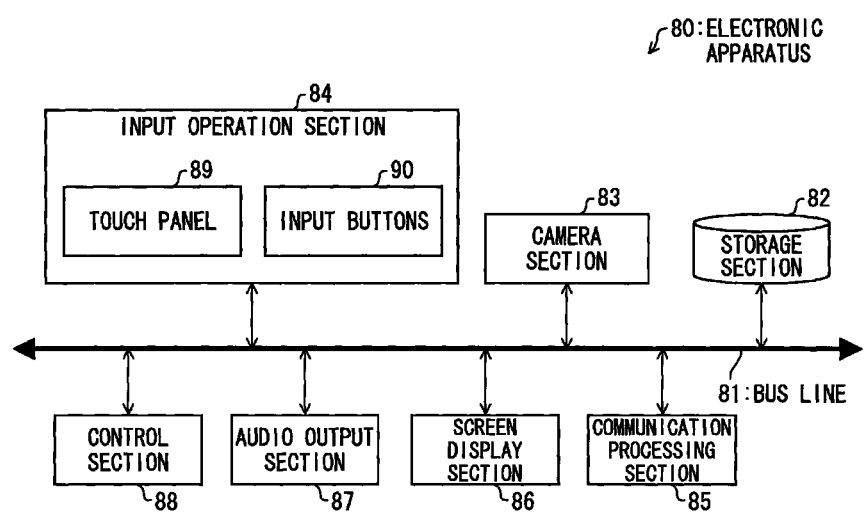
FIG. 34 is a block diagram illustrating an example of an outline configuration of an electronic device of the embodiment of the present invention.

FIG. 34 is a block diagram illustrating an example of an outline configuration of an electronic device 80 of the present embodiment.

The electronic device 80 illustrated in FIG. 34 is a mobile apparatus. FIG. 34 shows an example in which the electronic device 80 is a smartphone.

The electronic device 80 includes a bus line 81. The electronic device 80 includes a storage section 82, a camera section 83, an input operation section 84, a communication processing section 85, a screen display section 86, an audio output section 87, and a control section 88 each of which is connected to the bus line 81.

The storage section 82 is, for example, constituted by a ROM (Read Only Memory) and a RAM (Random Access Memory). In the storage section 82, various kinds of data such as data of an image taken by the camera section 83 and data of an image to be displayed on a display screen which is a main part of the screen display section 86 are stored.

The camera section 83 is, for example, constituted by an imaging module which includes an imaging lens and an imaging device. The camera section 83 is for taking a photograph of an object (subject).

The input operation section 84 includes a touch panel 89 and input buttons 90.

The touch panel 89 has an identical configuration to the touch panel 11 (see FIG. 31), and is disposed so as to overlap the display screen. The touch panel 89 is capable of giving the electronic device 80 various kinds of instruction according to a touched point, a continuous touch period, etc.

The input buttons 90 are a plurality of buttons provided on a housing (not illustrated) or the like of the electronic device 80. The input buttons 90 are capable of giving the electronic device 80 various kinds of instruction according to a pressed button, a combination of pressed buttons, a period of time for which a button is being pressed, a timing at which a button is pressed, etc.

The communication processing section 85 is responsible for communication between the electronic device 80 and an outside of the electronic device 80, such as reception of television broadcast, connection with various kinds of communication networks including Internet, and communication with other terminals (telephone call etc. in the case of a mobile terminal). The communication processing section 85 includes various kinds of antennas for transmitting and receiving a radio wave, a peripheral circuit (peripheral equipment) of the antennas, etc.

The screen display section (display device) 86 includes a display screen on which an image is displayed. The screen display section (display device) 86 is any of a liquid crystal display device, a plasma display device, an organic EL display device, and a field emission display. As described above, the touch panel 89 is disposed so as to overlap the display screen which is a main part of the screen display section 86. Note that a structure of the touch panel 89 is not illustrated nor described in detail here.

The audio output section 87 includes a speaker or the like. The audio output section 87 outputs audio to an outside.

The control section 88 collectively controls the storage section 82, the camera section 83, the input operation section 84, the communication processing section 85, the screen display section 86, and the audio output section 87 via the bus line 81. For the purpose of this control, the control section 88 writes data to be stored into the storage section 82 and reads desired data from the storage section 82 as necessary.

The control section 88 is mainly constituted by a CPU. The control section 88 corresponds to the host computer 20 (see FIG. 31). Note, however, that taking into consideration that the control section 88 carries out signal processing based on input from the touch panel 11, it can be interpreted that the control section 88 includes the constituent elements of the touch panel controller 12 (see FIG. 31) including hardware.

It is thus possible to provide the electronic device 80 that is capable of preventing an incorrect operation caused by an unintended contact of an object with the touch panel 11 while suppressing a decline in sensitivity of detection of presence or absence of a touch.

[Example 3 of Touch Invalidating Section]

It is possible to cause the touch invalidating section 19 to function (invalidate, in a case where a specific point is continuously touched for a predetermined period of time, an instruction that is given in accordance with the touch to the electronic device) only in a part of the touch panel 11. Such an example is described below with reference to (a) and (b) of FIG. 35.

(a) and (b) of FIG. 35 are diagrams illustrating still another example in which a touch operation is invalidated by the touch invalidating section 19 of the present embodiment.

A tablet-type terminal (electronic device) 200 illustrated in (a) and (b) of FIG. 35 includes a touch panel 11 that is disposed so as to overlap a display screen, a gravity sensor 201, and a frame 202. Further, the tablet-type terminal 200 includes the touch panel controller 12 (not illustrated, see FIG. 31).

In the following description, it is assumed that (i) the tablet-type terminal 200 has a substantially rectangular shape from a plan view and (ii) the gravity sensor 201 is provided in a part of the frame 202 which part constitute a short side of the tablet-type terminal 200, in accordance with the illustration of (a) and (b) of FIG. 35. A state in which the tablet-type terminal 200 is held so that a short side of the tablet-type terminal 200 faces the ground (see (a) of FIG. 35) is referred to as a portrait orientation, and a state in which the tablet-type terminal 200 is held so that a long side of the tablet-type terminal 200 faces the ground (see (b) of FIG. 35) is referred to as a landscape orientation.

The gravity sensor 201 detects an orientation of the tablet-type terminal 200 with respect to the gravity (ground). The tablet-type terminal 200 is configured to be capable of controlling its functions, operations, etc. in accordance with the orientation of the tablet-type terminal 200 with respect to the gravity thus detected by the gravity sensor 201.

It is well known that not only tablet-type terminals including a gravity sensor but also any electronic devices including a gravity sensor can be controlled in accordance with orientations of the electronic devices. For example, the tablet-type terminal 200 can be controlled to display an image so that an orientation of the image in the portrait orientation (see (a) of FIG. 35) is different from that in the landscape orientation (see (b) of FIG. 35).

In a case where the tablet-type terminal 200 is held in the portrait orientation, hands (objects) 203 holding the tablet-type terminal 200 are generally located on portions of the frame 202 which constitute the long sides of the tablet-type terminal 200 (see (a) of FIG. 35). As such, it is likely that the hands 203 unintentionally make contact with portions of the touch panel 11 that are in the vicinity of the hands 203.

In view of this, in a case where the tablet-type terminal 200 is held in the portrait orientation, only regions of the touch panel 11 that are in the vicinity of the portions of the frame 202 which constitute the long sides of the tablet-type terminal 200 are set as regions in which the touch invalidating section 19 functions. Specific examples of such regions in which the touch invalidating section 19 functions are regions 204.

Meanwhile, in a case where the tablet-type terminal 200 is held in the landscape orientation, the hands 203 holding the tablet-type terminal 200 are generally located on portions of the frame 202 which constitute the short sides of the tablet-type terminal 200 (see (b) of FIG. 35). As such, it is likely that the hands 203 unintentionally make contact with portions of the touch panel 11 that are in the vicinity of the hands 203.

In view of this, in a case where the tablet-type terminal 200 is held in the landscape orientation, only regions of the touch panel 11 that are in the vicinity of the portions of the frame 202 which constitute the short sides of the tablet-type terminal 200 are set as regions in which the touch invalidating section 19 functions. Specific examples of such regions in which the touch invalidating section 19 functions are regions 205.

In the tablet-type terminal 200, there are cases where it is desired that an instruction corresponding to a long touch on a specific point of the touch panel 11 (so-called "press and hold") be executed. It is not preferable that a region of the touch panel 11 in which region such a long touch is expected to be made be set as the region in which the touch invalidating section 19 functions. According to the above arrangement, it is possible to achieve both of (i) execution of such an instruction corresponding to a long touch on a specific point of the touch panel 11 and (ii) invalidation of a touch by the touch invalidating section 19.

Further, in the tablet-type terminal 200, there are cases where a region preferable as the region in which the touch invalidating section 19 functions should be changed in accordance with the orientation of the tablet-type terminal 200. By changing such a region in accordance with a result of detection of the orientation of the tablet-type terminal 200 with respect to the gravity, the touch invalidating section 19 can be caused to function in a manner according to a change of the orientation of the tablet-type terminal 200.

The above description has dealt with an example in which (i) the gravity sensor 201 for detecting an orientation of the tablet-type terminal 200 with respect to the gravity is provided in the tablet-type terminal 200 and (ii) a region in which the touch invalidating section 19 functions is changed in accordance with the orientation of the tablet-type terminal 200 detected by the gravity sensor 201. Note, however, that such a region in which the touch invalidating section 19 functions may be a predetermined fixed region.

For example, it is possible that a region of the touch panel 11 with which region the hands 203 holding the tablet-type terminal 200 are expected to be likely to make contact be set in advance as the region in which the touch invalidating section 19 functions. Alternatively, it is also possible that the whole of portions of the touch panel 11 that are in the vicinity of the frame 202 be set as the region in which the touch invalidating section 19 functions. In this way, the region in which the touch invalidating section 19 functions can be set without the need for the control operation according to a result of detection by the gravity sensor 201.

The present invention can also be expressed as below:

[1] A touch panel system including: a touch panel including a plurality of sensors; and a touch panel controller for receiving signals from the sensors so as to read data, the plurality of sensors including (i) a main sensor for inputting a signal in response to a touch operation performed by a user and (ii) a sub sensor provided on a surface of the touch panel on which surface the main sensor is provided, and the touch panel controller including subtracting means for (i) receiving a signal supplied from the main sensor and a signal supplied from the sub sensor and (ii) subtracting, from the signal supplied from the main sensor, the signal supplied from the sub sensor.

[2] The touch panel system described in [1], wherein the sub sensor is not touched by the user in the touch operation, and detects a noise generated in the sensor.

[3] The touch panel system described in [1] or [2], wherein the main sensor and the sub sensor are provided so as to be adjacent to each other.

[4] A touch panel system including: a display device; a touch panel which is provided on an upper section or the like of a display screen of the display device and which includes a plurality of sensor groups including sensors arranged in a matrix; and a touch panel controller for receiving signals from the sensor groups so as to read data, the sensor groups including (i) a main sensor group for inputting a signal in response to a touch operation performed by a user and (ii) a sub sensor group provided on a surface of the touch panel on which surface the main sensor group is provided, and the touch panel controller including subtracting means for (i) receiving a signal supplied from the main sensor group and a signal supplied from the sub sensor group and (ii) subtracting, from the signal supplied from the main sensor group, the signal supplied from the sub sensor group.

[5] The touch panel system described in [4], wherein the sub sensor group is not touched by the user in the touch operation, and detects a noise generated in the sensor group.

[6] The touch panel system described in [4] or [5], wherein the main sensor group and the sub sensor group are provided so as to be adjacent to each other.

[7] The touch panel system described in any of [1] through [6], wherein the display device is a liquid crystal display, a plasma display, an organic electroluminescence display, or a field emission display.

[8] An electronic device including a touch panel system described in any of [1] through [7].

According to each of the above configurations, the touch panel includes the main sensor section for detecting a touch operation and the sub sensor section for detecting a noise, and a difference between a signal of the main sensor section and a signal of the sub sensor section is found by the subtracting section. This removes a noise signal from the output signal which is supplied from the main sensor section, thereby extracting a signal derived from the touch operation itself, which signal is generated in response to the touch operation. Therefore, it is possible to reliably remove (cancel) a wide variety of noises reflected in the touch panel. Thus, a noise component which is the subject of removal is not limited to an AC signal component in a signal including noises, but is all noise components reflected in the touch panel. Namely, it is possible to provide a touch panel system and an electronic device each of which is capable of canceling basically all noise components.

Also, the present invention can be described as below:

Preferably, the touch panel system of any of the embodiments of the present invention is configured such that: the main sensor section is provided with a plurality of sense lines; the sub sensor section is provided with a sub sense line extending along a direction in which the sense lines extend; the subtracting section finds a first difference which is expressed by (Sn+1)−Sn, the first difference corresponding to a difference between (i) a signal of a sense line Sn which is selected from the plurality of sense lines and (ii) a signal of a sense line Sn+1, which is one of two sense lines adjacent to the sense line Sn, the two sense lines being the sense line Sn+1 and a sense line Sn−1 each of which is included in the plurality of sense lines; the subtracting section finds a second difference which is expressed by Sn−(Sn−1), the second difference corresponding to a difference between (i) the signal of the sense line Sn and (ii) a signal of the sense line Sn−1, which is the other one of the two sense lines; the subtracting section finds a third difference, the third difference corresponding to a difference between (i) a signal of the sub sense line and (ii) a signal of a sense line adjacent to the sub sense line which sense line is included in the plurality of sense lines; and the touch panel controller includes an adding section for adding up the first difference, the second difference, and the third difference.

According to the above configuration, the subtracting section obtains a difference signal value between sense lines adjacent to each other. Namely, a difference is found between the adjacent sense lines, which have a higher correlation in terms of noise. Furthermore, from an output signal supplied from each sense line, a signal (noise signal) of the sub sense line is removed. This makes it possible to remove a noise more reliably.

The touch panel system of any of the embodiments of the present invention may be configured to include: drive lines provided so as to intersect the sense lines and the sub sense line; a drive line driving circuit for driving the drive lines by use of orthogonal sequences or M sequences; capacitances being formed (i) between the sense lines and the drive lines and (ii) between the sub sense line and the drive lines; and a calculation section for finding capacitance values of the respective capacitances by (i) reading output signals from the sense lines and the sub sense line and by (ii) finding inner products of the output signals and the orthogonal sequences or the M sequences for driving the drive lines in parallel.

According to the above configuration, the touch panel is driven by the orthogonal sequence driving method. Consequently, a signal of the capacitance is multiplied by a code length (i.e., multiplied by N). Therefore, a signal strength of the capacitance is increased, regardless of the number of drive lines. Further, provided that a necessary signal strength is merely equal to that of the conventional method, it is possible to reduce the number of times that the drive lines should be driven, thereby enabling to reduce electric power consumption.

The touch panel system of any of the embodiments of the present invention may be configured such that: the subtracting section includes a first analog-to-digital converting section for converting, into digital signals, analog signals supplied from the sense lines and the sub sense line to the subtracting section; and the subtracting section uses, in order to find the first difference, the second difference, and the third difference, the digital signals obtained by the first analog-to-digital converting section.

According to the above configuration, it is possible to remove a noise by (ii) converting, into digital signals, analog signals outputted by the touch panel, and thereafter by (ii) performing subtracting operations.

The touch panel system of any of the embodiments of the present invention may be configured such that: the subtracting section includes a second analog-to-digital converting section for converting, into digital signals, analog signals supplied from the sense lines and the sub sense line to the subtracting section; and the second analog-to-digital converting section converts, into a digital signal, each of the first difference, the second difference, and the third difference that are found by the subtracting section with use of the analog signals.

According to the above configuration, it is possible to remove a noise by (i) performing subtracting operations on analog signals outputted by the touch panel, without converting the analog signals into digital signals, and thereafter by (ii) converting the resulting signal into a digital signal.

Preferably, the touch panel system of any of the embodiments of the present invention is configured such that: the subtracting section includes a total differential amplifier for finding the first difference, the second difference, and the third difference with use of the analog signals.

According to the above configuration, it is possible to remove a noise by (i) causing the total differential amplifier to perform subtracting operations on analog signals without converting the analog signals into digital signals which analog signals are outputted by the touch panel, and thereafter by (ii) converting the resulting signal into a digital signal.

Preferably, the touch panel system of any of the embodiments of the present invention is configured such that: the total differential amplifier has an input common-mode voltage range which is rail to rail.

The above configuration includes the total differential amplifier capable of rail-to-rail operation. Therefore, the total differential amplifier is operable in a voltage range from a power source voltage (Vdd) to GND. Accordingly, an output signal from the total differential amplifier is free from a problem of output saturation.

Preferably, the touch panel system of any of the embodiments of the present invention is configured such that: the adding section adds the first difference, the second difference, and the third difference in such a manner that individual adding operations are carried out in the order of increasing distance between a sense line involved in a certain adding operation and the sub-sense line, and the adding section uses a result of one adding operation in a next adding operation.

According to the above configuration, the adding section sequentially performs adding operations in the order of increasing distance between a sense line involved in a certain adding operation and the sub-sense line, while utilizing the results of the adding operations. This makes it possible to increase a speed at which an adding operation is performed.

The touch panel system of any of the embodiments of the present invention may be configured such that: the sub sensor section is configured not to detect a touch operation performed with respect to the touch panel.

According to the above configuration, since a signal generated by a touch operation is not detected by the sub sensor section, an output signal from the sub sensor section does not include the signal generated by the touch operation. This prevents a case where the signal value derived from the touch operation is reduced by the subtracting operation performed by the subtracting section. Namely, a noise component is removed without reducing the signal detected by the main sensor section, which signal is generated in response to the touch operation. This makes it possible to further enhance detection sensitivity for a touch operation.

The touch panel system of any of the embodiments of the present invention may be configured such that: the sub sensor section is provided in a region of the touch panel in which region no touch operation is performed.

According to the above configuration, the sub sensor section is provided so as not to be positioned in a region (touched region) where a user performs a touch operation. Therefore, on the sub sensor section, the user would not perform a touch operation. Accordingly, although the sub sensor section detects a noise reflected in the touch panel, the sub sensor section does not detect a signal generated by a touch operation. This can reliably prevent the sub sensor section from detecting a touch operation.

Namely, since the above configuration does not allow the sub sensor section to detect a signal generated by a touch operation, an output signal supplied from the sub sensor section does not include the signal generated by the touch operation. This prevents a case where the signal value derived from the touch operation is reduced by the subtracting operation performed by the subtracting section. Namely, a noise component is removed without reducing the signal generated by the touch operation and detected by the main sensor section. This makes it possible to further enhance detection sensitivity for a touch operation.

Preferably, the touch panel system of any of the embodiments of the present invention is configured such that: the main sensor section and the sub sensor section are provided so as to be adjacent to each other.

According to the above configuration, the main sensor section and the sub sensor section are arranged so that a distance therebetween is shortest. Namely, the main sensor section and the sub sensor section are provided under substantially the same condition. Therefore, a value of a noise signal included in an output signal from the sub sensor section can be regarded as being the same as that of a noise signal included in an output signal from the main sensor section. This can more reliably remove, by the subtracting operation performed by the subtracting section, a noise component reflected in the touch panel. This makes it possible to further enhance detection sensitivity for a touch operation.

The touch panel system of any of the embodiments of the present invention may be configured such that: the main sensor section is made of one main sensor.

According to the above configuration, the main sensor section is made of a single main sensor. This can provide a touch panel system capable of determining the presence or absence of a touch operation.

The touch panel system of any of the embodiments of the present invention may be configured such that: the main sensor section is made of a plurality of main sensors arranged in a matrix.

According to the above configuration, the main sensor section is made of a plurality of main sensors arranged in a matrix. This can provide a touch panel system capable of determining (i) the presence or absence of a touch operation and (ii) a touched position.

Preferably, the touch panel system of any of the embodiments of the present invention is configured so as to include: drive lines provided so as to intersect the sense lines; a drive line driving circuit for driving the drive lines in parallel; capacitances being formed between the sense lines and the drive lines; and a decoding section for decoding values of differences between the capacitances in a direction in which each of the drive lines extends which differences are found by the subtracting section as the differences in signal between the respective pairs of the sense lines adjacent to each other, based on output signals that the subtracting section receives from the sense lines.

According to the above configuration, the touch panel is parallel driven, and the decoding section decodes the difference values of the capacitances which difference values are found by the subtracting section. Consequently, signals of the capacitances are multiplied by a code length (i.e., multiplied by N). Therefore, signal strengths of the capacitances are increased, regardless of the number of drive lines. Further, provided that necessary signal strengths are merely equal to those of a conventional method, it is possible to reduce the number of times that the drive lines should be driven. This makes it possible to reduce electric power consumption.

The touch panel system of any of the embodiments of the present invention may be configured such that: the subtracting section includes a third analog-to-digital converting section for converting, into digital signals, analog signals supplied from the sense lines to the subtracting section; and the subtracting section uses, in order to find the differences in signal between the respective pairs of the sense lines adjacent to each other, the digital signals obtained by the third analog-to-digital converting section.

According to the above configuration, it is possible to remove a noise by (ii) converting, into digital signals, analog signals outputted by the touch panel, and thereafter by (ii) performing subtracting operations.

The touch panel system of any of the embodiments of the present invention may be configured such that: the subtracting section includes a fourth analog-to-digital converting section for converting, into digital signals, analog signals supplied from the sense lines to the subtracting section; and the fourth analog-to-digital converting section converts, into digital signals, the differences in signal between the respective pairs of the sense lines adjacent to each other, the differences being found by the subtracting section with use of the analog signals.

According to the above configuration, it is possible to remove a noise by (i) performing subtracting operations on analog signals outputted by the touch panel, without converting the analog signals into digital signals, and thereafter by (ii) converting the resulting signal into a digital signal.

The touch panel system of any of the embodiments of the present invention may be configured such that: the subtracting section includes a total differential amplifier for finding, with use of the analog signals, the differences in signal between the respective pairs of the sense lines adjacent to each other.

According to the above configuration, it is possible to remove a noise by (i) causing the total differential amplifier to perform subtracting operations on analog signals without converting the analog signals into digital signals which analog signals are outputted by the touch panel, and thereafter by (ii) converting the resulting signal into a digital signal.

The touch panel system of any of the embodiments of the present invention may be configured so as to include: a non-touch operation information storage section for storing a first distribution of differences between the capacitances which differences are decoded by the decoding section when no touch operation is performed; and a calibration section for subtracting (i) the first distribution stored in the non-touch operation information storage section from (ii) a second distribution of differences between the capacitances which differences are decoded by the decoding section when a touch operation is performed, so as to calibrate the second distribution.

According to the above configuration, the non-touch operation information storage section stores the first distribution of the differences between the capacitances which differences are decoded by the decoding section when no touch operation is performed. Further, the calibration section subtracts (i) the first distribution stored in the non-touch operation information storage section from (ii) the second distribution of the differences between the capacitances which differences are found when a touch operation is performed. Namely, the calibration section performs the following calculation: (the second distribution of the differences between the capacitances which differences are found when the touch operation is performed)–(the first distribution of the differences between the capacitances which differences are found when no touch operation is performed). This can cancel an offset inherent in the touch panel.

Preferably, the touch panel system of any of the embodiments of the present invention is configured so as to include: a judging section for determining the presence or absence of a touch operation based on a comparison of (i) the differences in signal between the respective pairs of the sense lines adjacent to each other which differences are found by the subtracting section and (ii) positive and negative threshold values.

According to the above configuration, the judging section determines the presence or absence of a touch operation based on the differences in signal between the respective pairs the sense lines adjacent to each other from which differences a noise signal has been removed. This makes it possible to accurately determine the presence or absence of the touch operation.

Preferably, the touch panel system of any of the embodiments of the present invention is configured such that: the judging section creates, based on the comparison of (i) the differences in signal between the respective pairs of the sense lines adjacent to each other which differences are found by the subtracting section and (ii) the positive and negative threshold values, an increase and decrease table which indicates, in ternary, a distribution of differences between signals of the sense lines, and the judging section converts the increase and decrease table into a binary image, so as to extract touch information therefrom.

According to the above configuration, the differences in signal between the respective pairs of the sense lines adjacent to each other from which differences a noise signal has been removed are inputted to the judging section. Based on the comparison of (i) the differences in signal between the respective pairs of the sense lines adjacent to each other and (ii) the positive and negative threshold values stored in the judging section, the judging section creates the increase and decrease table indicating, in ternary, the distribution of the differences in signal between the respective pairs of the sense lines adjacent to each other. Further, the judging section binarizes the increase and decrease table, so that the increase and decrease table is converted into the binary image. Consequently, from the binary image thus converted, candidates of a touched position are extracted. Thus, by recognizing the touch information (the size, position, etc. of the touch) based on the binary image, it is possible not only to determine the presence or absence of the touch operation but also to recognize the touch information more accurately.

Preferably, the touch panel system of any of the embodiments of the present invention is configured to further include a display device, the touch panel being provided to a front surface of the display device.

According to the above configuration, since the touch panel is provided on the front surface of the display device, it is possible to reliably remove a noise generated in the display device.

Preferably, the touch panel system of any of the embodiments of the present invention is configured such that: the display device is a liquid crystal display, a plasma display, an organic electroluminescence display, or a field emission display.

According to the above configuration, the display device is made of any of various kinds of displays used in generally-used electronic devices. Therefore, it is possible to provide a touch panel system having a great versatility.

A touch panel system of the present invention includes a touch invalidating section which, in a case where a specific point of a touch panel is continuously touched for a predetermined period of time, invalidates an instruction that is given, in accordance with the touch, to an electronic device including the touch panel.

According to the above configuration, in a case where a specific point of the touch panel is continuously touched for a predetermined period of time, the touch invalidating section invalidates an instruction that is given, in accordance with the touch, to the electronic device. Accordingly, in a case where an unintended contact of an object with the touch panel continues, such as a case where a hand holding the electronic device makes contact with the touch panel, an instruction corresponding to the contact is not executed. Consequently, it is possible to prevent an incorrect operation caused by an unintended contact of an object with the touch panel.

Further, according to the above configuration, it is unnecessary to change a standard by which presence or absence of a touch is judged for the purpose of preventing such an incorrect operation. It is therefore possible to suppress a decline in sensitivity of detection of presence or absence of a touch.

An electronic device of the present invention includes: the touch panel system of the present invention; and a display device corresponding to the touch panel, the touch panel system and the display device being configured to be capable of detecting simultaneous touches on a plurality of points of the touch panel.

According to the above configuration, it is possible to provide an electronic device that is capable of preventing an incorrect operation caused by an unintended contact of an object with a touch panel while suppressing a decline in sensitivity of detection of presence or absence of a touch, as in the touch panel system of the present invention.

As described above, the touch panel system of the present invention includes a touch invalidating section which, in a case where a specific point of a touch panel is continuously touched for a predetermined period of time, invalidates an instruction that is given, in accordance with the touch, to an electronic device including the touch panel.

This produces an effect that it is possible to prevent an incorrect operation caused by an unintended contact of an object with a touch panel while suppressing a decline in sensitivity of detection of presence or absence of a touch on the touch panel.

The touch panel system of the present invention is preferably arranged such that the touch invalidating section judges whether or not the touch continues for a touch time threshold value which is a period of time corresponding to the predetermined period of time.

According to the above configuration, it is possible to judge, with a simple configuration, whether or not the point is continuously touched for the predetermined period of time.

Further, the touch panel system of the present invention is preferably arranged such that, in a case where the point is continuously touched for the predetermined period of time, the touch invalidating section invalidates an instruction corresponding to a next touch on the point.

According to the above configuration, even in a case where an unintended contact of an object with the touch panel frequently occurs in a short time, it is possible to prevent an incorrect operation, which can occur every time the contact is made, by causing the touch invalidating section to function just once.

Further, the touch panel system of the present invention is preferably arranged such that the touch invalidating section judges that the point is being touched, in a case where a level of a signal indicative of a degree of contact of an object with the point is not less than a touch threshold value, which is a standard for the level, or in a case where the level is above the touch threshold value, and the touch invalidating section increases the touch threshold value in a case where the point is continuously touched for the predetermined period of time.

According to the above configuration, it is possible to invalidate, with a simple configuration, an instruction corresponding to a touch on the point for a certain period of time.

The electronic device of the present invention is preferably arranged such that the touch invalidating section functions only in a part of the touch panel.

According to the above configuration, only the part of the touch panel can be set as a region in which the function of the touch invalidating section is executed.

In the electronic device, there are cases where it is desired that an instruction corresponding to a long touch on a specific point of the touch panel (so-called "press and hold") be executed. It is not preferable that a region of the touch panel in which region such a long touch is expected to be made be set as the region in which the function of the touch invalidating section is executed. According to the above configuration, it is possible to achieve both of (i) execution of such an instruction corresponding to a long touch on a specific point of the touch panel and (ii) invalidation of a touch by the touch invalidating section.

The electronic device of the present invention is especially preferably arranged such that the part of the touch panel is a region of the touch panel which region a hand holding the electronic device makes contact with.

Further, the electronic device of the present invention is preferably arranged so as to further include a gravity sensor which detects an orientation of the electronic device with respect to gravity, the touch invalidating section changing the part of the touch panel in accordance with a result of the detection of the gravity sensor.

In the electronic device, there are cases where a region preferable as the part of the touch panel should be changed in accordance with an orientation of the electronic device. According to the above configuration, the part of the region is changed in accordance with a result of detection of an orientation of the electronic device with respect to the gravity. This allows the touch invalidating section to function in a manner according to a change of the orientation of the electronic device.

Further, the electronic device of the present invention is preferably arranged such that the display device includes a display screen on which an image is displayed, the display device is any one of a liquid crystal display device, a plasma display device, an organic EL (ElectroLuminescence) display device, and a field emission display device, and the touch panel is disposed so as to overlap the display screen of the display device.

Further, the electronic device of the present invention is preferably arranged such that the touch panel includes: a plurality of drive lines that extend in a vertical direction and that are parallel to each other; a plurality of sense lines that extend in a horizontal direction and that are parallel to each other; and a plurality of electrostatic capacitors that are provided at respective intersections of the plurality of drive lines and the plurality of sense lines.

In other words, the touch panel of the present invention is preferably a capacitance type touch panel.

Further, the electronic device of the present invention is a portable apparatus. Examples of the portable apparatus encompass portable apparatuses such as smartphones, tablet-type terminals, notebook computers, and the like.

The present invention is not limited to the description of the embodiments above, but may be altered by a skilled person within the scope of the claims. An embodiment based on a proper combination of technical means disclosed in different embodiments is encompassed in the technical scope of the present invention. Namely, the embodiments above are just examples in all respects, and provide no limitations. The scope of the present invention is indicated by the claims, rather than by the descriptions of the embodiments. Any meanings equivalent to the claims and all modifications made in the scope of the claims are included within the scope of the present invention.

INDUSTRIAL APPLICABILITY

The present invention is applicable to various kinds of electronic devices including touch panels, for example, to televisions, personal computers, mobile phones, digital cameras, portable game devices, electronic photo frames, personal digital assistant's, electronic books, home electronic appliances, ticket vending machines, automatic teller machines, and car navigation systems.

The present invention is applicable to touch panel systems and electronic devices. Specifically, the present invention is applicable to portable electronic devices, such as smartphones, tablet-type terminals, notebook computers, digital cameras, and the like, which have a 20 inch or less display screen, and to touch panel systems provided in the electronic devices.

REFERENCE SIGNS LIST

1 Touch panel system
1a Touch panel system
1b Touch panel system
1c Touch panel system
1d Touch panel system
1e Touch panel system
1f Touch panel system
1g Touch panel system
1h Touch panel system
1i Touch panel system
1j Touch panel system
1k Touch panel system
1m Touch panel system
1n Touch panel system
1o Touch panel system
1p Touch panel system
2 Display device
3 Touch panel
3a Touch panel
3b Touch panel
3c Touch panel
4 Touch panel controller
11 Touch panel
12 Touch panel controller
15 Signal selecting section
19 Touch invalidating section
31 Main sensor (main sensor section)
31a Main sensor group (main sensor section)
31b Main sensor group (sensor section)
32 Sub sensor (sub sensor section)
32a Sub sensor group (sub sensor section)
33 Sense line
34 Sub sense line
35 Drive line
41 Subtracting section
41a Subtracting section
46 Adding section
47 Electric charge integrator (calculation section)
48 Analog-to-digital converting section (first analog-to-digital converting section, second analog-to-digital converting section)
48a Analog-to-digital converting section (third analog-to-digital converting section, fourth analog-to-digital converting section)
49 Differential amplifier
50 Total differential amplifier
58 Decoding section
59 Judging section
61 Non-touch operation information storage section
62 Calibration section
80 Electronic device
86 Screen display section (display device)
89 Touch panel
200 Tablet-type terminal (electronic device)
201 Gravity sensor
204 Region
205 Region
T1 Time
T2 Time

The invention claimed is:

1. A touch panel system comprising,
a touch panel; and
a touch panel controller for processing a signal supplied from the touch panel,
the touch panel including a sensor section, the sensor section being provided with a plurality of sense lines and detecting a touch operation performed with respect to the touch panel,
the touch panel controller including a subtracting section for (i) receiving signals from the sensor section and (ii) finding differences in signal between, among the sense lines, respective pairs of sense lines adjacent to each other,
the touch panel system further comprising:
drive lines provided so as to intersect the sense lines;
a drive line driving circuit for driving the drive lines in parallel; and
capacitances being formed between the sense lines and the drive lines,
the subtracting section receiving output signals from the sense lines, and finding differences between the capacitances on each of the drive lines in a direction in which the each of the drive lines extends, the differences being found as the differences in signal between the respective pairs of the sense lines adjacent to each other,
the touch panel system further comprising:
a decoding section for decoding the values of the differences between the capacitances, which differences are found by the subtracting section, the decoding being carried out in such a manner that an inner product of each of code sequences for driving the drive lines in parallel and each of difference output sequences of the sense lines, which difference output sequences correspond to the code sequences, is calculated; and
a switch for switching a signal to be supplied to the subtracting section so that the subtracting section finds a first difference which is expressed by $(S_{n+1}) S_n$ or a second difference which is expressed by $S_n - (S_{n-1})$, where n is an integer greater than zero,
the first difference corresponding to a difference between (i) a signal of a sense line $S_n$ which is selected from the plurality of sense lines and (ii) a signal of a sense line $S_{n+1}$, which is one of two sense lines adjacent to the sense line $S_n$, the two sense lines being the sense line $S_{n+1}$ and a sense line $S_{n-1}$ each of which is included in the plurality of sense lines,
the second difference corresponding to a difference between (i) the signal of the sense line $S_n$ and (ii) a signal of the sense line $S_{n-1}$, which is the other one of the two sense lines,
the touch panel system further comprising a touch invalidating section which, in a case where a specific point of a touch panel is continuously touched once for a predetermined period of time, invalidates an instruction that is given, in accordance with the one touch, to an electronic device including the touch panel,
the touch invalidating section judging whether or not the touch continues for a touch time threshold value which is a period of time not less than the predetermined period of time, and
in a case where the point is continuously touched for a period of time that is not less than the predetermined period of time, the touch invalidating section invalidating an instruction corresponding to a next touch on the point.

2. The touch panel system as set forth in claim 1, wherein:
the switch includes two terminals, the switch being arranged such that one of the two terminals is selected;
the code sequences for driving the drive lines in parallel are the following code sequences, in which a component is 1 or −1, for driving the first drive line through the Mth drive line in parallel, where M is an integer of 2 or greater, $$d_1 = (d_{11}, d_{12}, \ldots, d_{1N})$$
$$d_2 = (d_{21}, d_{22}, \ldots, d_{2N})$$
$$\vdots$$
$$\vdots$$
$$\vdots$$
$$d_M = (d_{M1}, d_{M2}, \ldots, d_{MN});$$

where N is an integer greater than zero,
difference output sequences $S_{j,P}$ (j=1, . . . , [L/2], P=1,2) (L indicates the number of sense lines, [n]=an integer part of n) of the sense lines, which difference output sequences correspond to the code sequences, are defined as follows,
$S_{j,1}$: an output sequence for $d_1$ through $d_M$ when the switches SW select one of the two terminals
$S_{j,2}$: an output sequence for $d_1$ through $d_M$ when the switches SW select the other one of the two terminals; and
the decoding section calculates an inner product of each of the code sequences for driving the drive lines in parallel and each of the difference output sequences of the sense line, which difference output sequences correspond to the code sequences.

3. The touch panel system as set forth in claim 2, wherein:
the subtracting section includes a third analog-to-digital converting section for converting, into digital signals, analog signals supplied from the sense lines to the subtracting section; and
the subtracting section uses, in order to find the differences in signal between the respective pairs of the sense lines adjacent to each other, the digital signals obtained by the third analog-to-digital converting section.

4. The touch panel system as set forth in claim 2, wherein:
the subtracting section includes a fourth analog-to-digital converting section for converting, into digital signals, analog signals supplied from the sense lines to the subtracting section; and
the fourth analog-to-digital converting section converts, into digital signals, the differences in signal between the respective pairs of the sense lines adjacent to each other, the differences being found by the subtracting section with use of the analog signals.

5. The touch panel system as set forth in claim 4, wherein:
the subtracting section includes a total differential amplifier for finding, with use of the analog signals, the differences in signal between the respective pairs of the sense lines adjacent to each other.

6. The touch panel system as set forth in claim 4, further comprising:
a judging section for determining the presence or absence of a touch operation based on a comparison of (i) the differences in signal between the respective pairs of the sense lines adjacent to each other, wherein said differences in signal between the respective adjacent pairs of the sense lines are found by the subtracting section and (ii) positive and negative threshold values.

7. The touch panel system as set forth in claim 2, further comprising:
a non-touch operation information storage section for storing a first distribution of differences between the capacitances, wherein said differences between the capacitances are decoded by the decoding section when no touch operation is performed; and
a calibration section for subtracting (i) the first distribution stored in the non-touch operation information storage section from (ii) a second distribution of differences between the capacitances, wherein said differences between the capacitances are decoded by the decoding section when a touch operation is performed, so as to calibrate the second distribution.

8. The touch panel system as set forth in claim 1, wherein:
the subtracting section includes a fourth analog-to-digital converting section for converting, into digital signals, analog signals supplied from the sense lines to the subtracting section; and
the fourth analog-to-digital converting section converts, into digital signals, the differences in signal between the respective pairs of the sense lines adjacent to each other, the differences being found by the subtracting section with use of the analog signals.

9. The touch panel system as set forth in claim 8, wherein:
the subtracting section includes a total differential amplifier for finding, with use of the analog signals, the differences in signal between the respective pairs of the sense lines adjacent to each other.

10. The touch panel system as set forth in claim 8, further comprising:
a judging section for determining the presence or absence of a touch operation based on a comparison of (i) the differences in signal between the respective pairs of the sense lines adjacent to each other which differences are found by the subtracting section and (ii) positive and negative threshold values.

11. The touch panel system as set forth in claim 10, wherein:
the judging section creates, based on the comparison of (i) the differences in signal between the respective pairs of the sense lines adjacent to each other which differences are found by the subtracting section and (ii) the positive and negative threshold values, an increase and decrease table which indicates, in ternary, a distribution of differences between signals of the sense lines, and the judging section converts the increase and decrease table into a binary image, so as to extract touch information therefrom.

12. An electronic device comprising:
a touch panel system as set forth in claim 2.

13. The touch panel system as set forth in claim 1, further comprising:
a non-touch operation information storage section for storing a first distribution of differences between the capacitances, wherein said differences between the capacitances are decoded by the decoding section when no touch operation is performed; and
a calibration section for subtracting (i) the first distribution stored in the non-touch operation information storage section from (ii) a second distribution of differences between the capacitances, wherein said differences between the capacitances are decoded by the decoding section when a touch operation is performed, so as to calibrate the second distribution.

14. The touch panel system as set forth in claim 1, further comprising:
a display device,
the touch panel being provided to a front surface of the display device.

15. The touch panel system as set forth in claim 14, wherein:
the display device is a liquid crystal display, a plasma display, an organic electroluminescence display, or a field emission display.

16. An electronic device comprising:
a touch panel system as set forth in claim 1.

17. The touch panel system as set forth in claim 1, wherein:
the touch invalidating section judges that the point is being touched, in a case where a level of a signal indicative of a degree of contact of an object with the point is not less than a touch threshold value, which is a standard for the level, or in a case where the level is above the touch threshold value; and
in a case where the point is continuously touched for the predetermined period of time, the touch invalidating section increases the touch threshold value so that the level of the signal of the touch becomes not more than the touch threshold value which has been increased.

18. A touch panel system comprising,
a touch panel; and
a touch panel controller for processing a signal supplied from the touch panel,
the touch panel including a sensor section, the sensor section being provided with a plurality of sense lines and detecting a touch operation performed with respect to the touch panel,
the touch panel controller including a subtracting section for (i) receiving signals from the sensor section and (ii) finding differences in signal between, among the sense lines, respective pairs of sense lines adjacent to each other,
the touch panel system further comprising:
drive lines provided so as to intersect the sense lines;
a drive line driving circuit for driving the drive lines in parallel; and
capacitances being formed between the sense lines and the drive lines,
the subtracting section receiving output signals from the sense lines, and finding differences between the capacitances on each of the drive lines in a direction in which the each of the drive lines extends, the differences being found as the differences in signal between the respective pairs of the sense lines adjacent to each other,
the touch panel system further comprising:
a decoding section for decoding the values of the differences between the capacitances, which differences are found by the subtracting section, the decoding being carried out in such a manner that an inner product of each of code sequences for driving the drive lines in parallel and each of difference output sequences of the sense lines, which difference output sequences correspond to the code sequences, is calculated,
the touch panel system further comprising a touch invalidating section which, in a case where a specific point of a touch panel is continuously touched once for a predetermined period of time, invalidates an instruction that is given, in accordance with the one touch, to an electronic device including the touch panel,
the touch invalidating section judging whether or not the touch continues for a touch time threshold value which is a period of time not less than the predetermined period of time, and
in a case where the point is continuously touched for a period of time not less than the predetermined period of time, the touch invalidating section invalidating an instruction corresponding to a next touch on the point.

19. The touch panel system as set forth in claim 18, wherein:
the subtracting section finds a first difference which is expressed by $(S_{n+1})S_n$ and a second difference which is expressed by $S_n-(S_{n-1})$, where n is an integer greater than zero,
the first difference corresponding to a difference between (i) a signal of a sense line $S_n$ which is selected from the plurality of sense lines and (ii) a signal of a sense line $S_{n+1}$, which is one of two sense lines adjacent to the sense line $S_n$, the two sense lines being the sense line $S_{n+1}$ and a sense line $S_{n-1}$ each of which is included in the plurality of sense lines,
the second difference corresponding to a difference between (i) the signal of the sense line $S_n$ and (ii) a signal of the sense line $S_{n-1}$, which is the other one of the two sense lines.

20. The touch panel system as set forth in claim 18, wherein:
the code sequences are orthogonal sequences or a Maximum-length sequence.

21. The touch panel system as set forth in claim 18, wherein:
the touch invalidating section judges that the point is being touched, in a case where a level of a signal indicative of a degree of contact of an object with the point is not less than a touch threshold value, which is a standard for the level, or in a case where the level is above the touch threshold value; and
in a case where the point is continuously touched for the predetermined period of time, the touch invalidating section increases the touch threshold value so that the level of the signal of the touch becomes not more than the touch threshold value which has been increased.

\* \* \* \* \*